United States Patent
Yamada et al.

(10) Patent No.: US 9,214,128 B2
(45) Date of Patent: Dec. 15, 2015

(54) INFORMATION DISPLAY DEVICE

(75) Inventors: Kazunori Yamada, Hyogo (JP); Shohji Ohtsubo, Osaka (JP); Tsutomu Mukai, Osaka (JP); Mizuho Sakakibara, Tokyo (JP); Mitsuaki Oshima, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 13/549,772

(22) Filed: Jul. 16, 2012

(65) Prior Publication Data

US 2013/0038634 A1    Feb. 14, 2013

Related U.S. Application Data

(60) Provisional application No. 61/521,813, filed on Aug. 10, 2011.

(51) Int. Cl.
| | |
|---|---|
| *G09G 5/00* | (2006.01) |
| *G06F 1/16* | (2006.01) |
| *G06F 3/0488* | (2013.01) |
| *G06F 3/0481* | (2013.01) |

(52) U.S. Cl.
CPC ................. *G09G 5/00* (2013.01); *G06F 1/1601* (2013.01); *G06F 3/04817* (2013.01); *G06F 3/04886* (2013.01); *G06F 2200/1614* (2013.01); *G09G 2330/021* (2013.01); *G09G 2340/0442* (2013.01); *G09G 2340/0492* (2013.01)

(58) Field of Classification Search
CPC .................. G09G 2340/0492; G05B 19/40935
USPC .......................... 345/649, 659, 689
See application file for complete search history.

(56) References Cited

U.S. PATENT DOCUMENTS

| | | |
|---|---|---|
| 7,139,562 B2 | 11/2006 | Matsui |
| 7,932,882 B2 | 4/2011 | Shimotono et al. |
| 8,214,459 B2 | 7/2012 | Matsubara et al. |
| 8,510,039 B1 * | 8/2013 | Troy et al. ...................... 701/436 |
| 8,549,109 B2 | 10/2013 | Matsubara et al. |
| 8,892,688 B2 | 11/2014 | Matsubara et al. |

(Continued)

FOREIGN PATENT DOCUMENTS

| | | |
|---|---|---|
| JP | 2000-250434 | 9/2000 |
| JP | 2003-296273 | 10/2003 |

(Continued)

*Primary Examiner* — Phi Hoang
*Assistant Examiner* — Yi Yang
(74) *Attorney, Agent, or Firm* — Wenderoth, Lind & Ponack, L.L.P.

(57) ABSTRACT

An information display device includes: an image display unit that displays an image according to an orientation of a display screen; a terminal posture detection unit that detects a posture of the device using an acceleration sensor, an angular velocity sensor, and a geomagnetic sensor; and a display direction determination unit that determines whether or not the posture of the device changes, and determines the orientation of the display screen. In the case where the display screen is substantially horizontal and the posture of the device changes, the orientation of the display screen is determined so that, when the device moves by a predetermined angle or more with respect to the orientation (reference orientation) of the display screen before the determination of the posture change, a side of the device at the predetermined angle or more from the reference orientation corresponds to the top of the display screen.

9 Claims, 72 Drawing Sheets

(56) References Cited

U.S. PATENT DOCUMENTS

| | | |
|---|---|---|
| 2001/0029430 A1* | 10/2001 | Tamura .................. 701/213 |
| 2003/0187922 A1 | 10/2003 | Ohara |
| 2004/0121725 A1 | 6/2004 | Matsui |
| 2006/0238517 A1* | 10/2006 | King et al. ............... 345/173 |
| 2008/0129666 A1* | 6/2008 | Shimotono et al. ........ 345/87 |
| 2009/0081950 A1 | 3/2009 | Matsubara et al. |
| 2009/0262074 A1* | 10/2009 | Nasiri et al. ............. 345/158 |
| 2010/0002015 A1* | 1/2010 | Handa .................... 345/650 |
| 2010/0085382 A1* | 4/2010 | Lundqvist et al. ........ 345/659 |
| 2010/0145612 A1* | 6/2010 | Duan et al. ............... 701/208 |
| 2010/0205190 A1* | 8/2010 | Morris et al. ............. 707/758 |
| 2011/0187660 A1 | 8/2011 | Hirata et al. |
| 2011/0227952 A1* | 9/2011 | Hamaguchi .............. 345/672 |
| 2012/0108293 A1* | 5/2012 | Law et al. ................ 455/557 |
| 2012/0246687 A1 | 9/2012 | Matsubara et al. |
| 2014/0020032 A1 | 1/2014 | Matsubara et al. |
| 2015/0019970 A1 | 1/2015 | Matsubara et al. |

FOREIGN PATENT DOCUMENTS

| | | |
|---|---|---|
| JP | 2004-048132 | 2/2004 |
| JP | 2004-166193 | 6/2004 |
| JP | 2004-297334 | 10/2004 |
| JP | 2006-099540 | 4/2006 |
| JP | 2006-146753 | 6/2006 |
| JP | 2007-43316 | 2/2007 |
| JP | 2007-264923 | 10/2007 |
| JP | 2007-304787 | 11/2007 |
| JP | 2008-70884 | 3/2008 |
| JP | 2008-139711 | 6/2008 |
| JP | 2008-306667 | 12/2008 |
| JP | 2009-080593 | 4/2009 |
| JP | 2010-26064 | 2/2010 |
| JP | 2010-113503 | 5/2010 |
| JP | 4489719 | 6/2010 |
| WO | 2006/123413 | 11/2006 |
| WO | 2007/069323 | 6/2007 |

* cited by examiner

Title: Functional block diagram of processing unit that determines screen display orientation of mobile device (display position determination by posture detection)

(Display position determination by posture detection)

Title: Functional block diagram of centrifugal force display orientation mobile device Title: Display orientation setting from centrifugal force Correction of output of sensor in X, Y, and Z directions using direction identified from actual vertical direction Title: Setting direction with large shaking width as front direction

FIG. 14

Title: Example of position DB

| ID | Target name | Coordinates | Reference point accuracy information | Update time |
|---|---|---|---|---|
| ID-001 | TV | X2, Y2, Z2 | 60% | 20000202:22:10:05 |
| ID-002 | Vase | X3, Y3, Z3 | 80% | 20030303:23:13:03 |

1301

Icon variations always indicating normal position of terminal (one direction only)

(A): Picture of deformed terminal

FIG. 19  Icon variations always indicating normal position of terminal (one direction only)
(B): Picture of terminal + letter
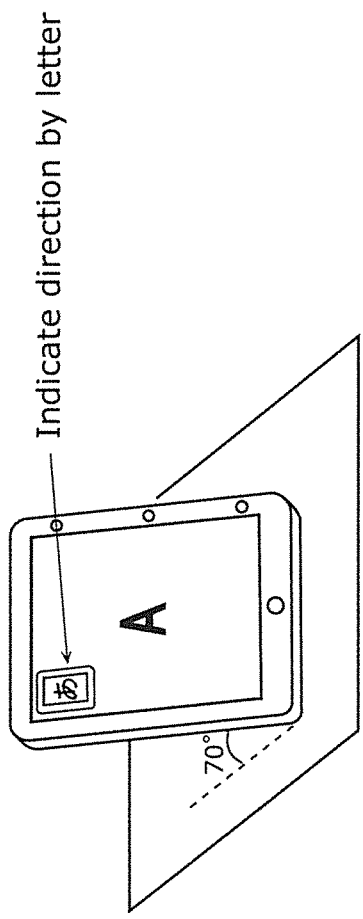
Indicate direction by letter
(C): Picture of terminal + Face personifying terminal
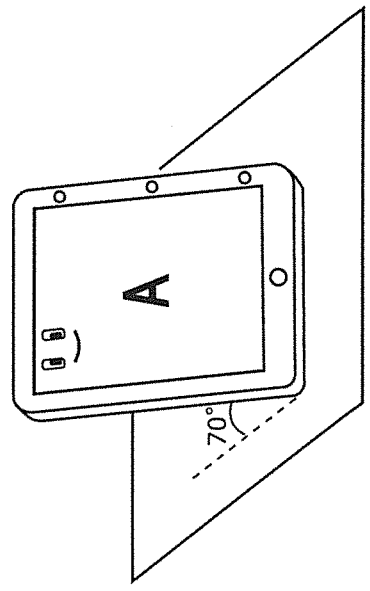
Indicate direction by face
(C'): Picture of face only
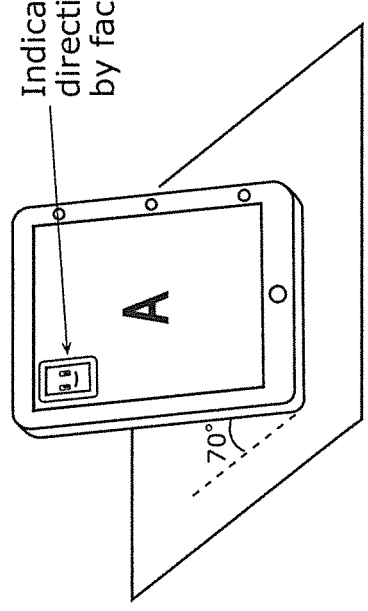

FIG. 20  Icon variations always indicating normal position of terminal (one direction only)
(D): Picture of terminal + picture of object    (D'): Picture of object only
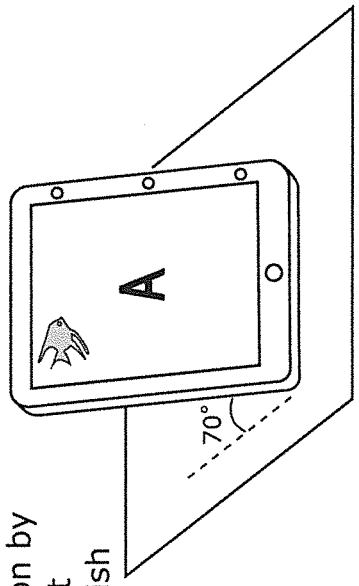 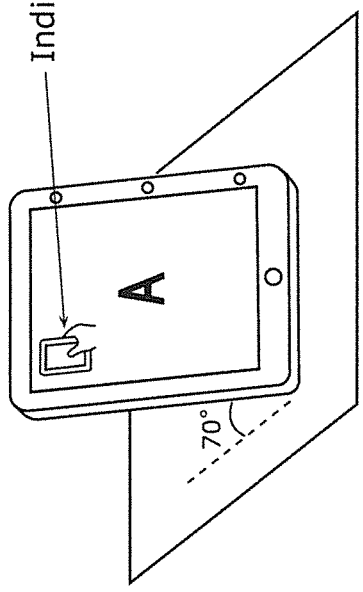
Indicate direction by picture of object e.g. picture of fish
(E): Picture of terminal + picture of hand when holding in normal direction
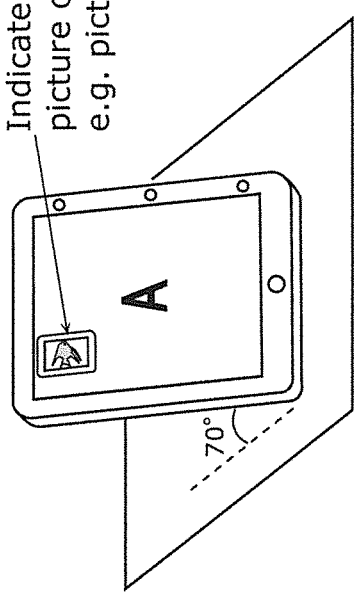
Indicate direction by picture of hand FIG. 21
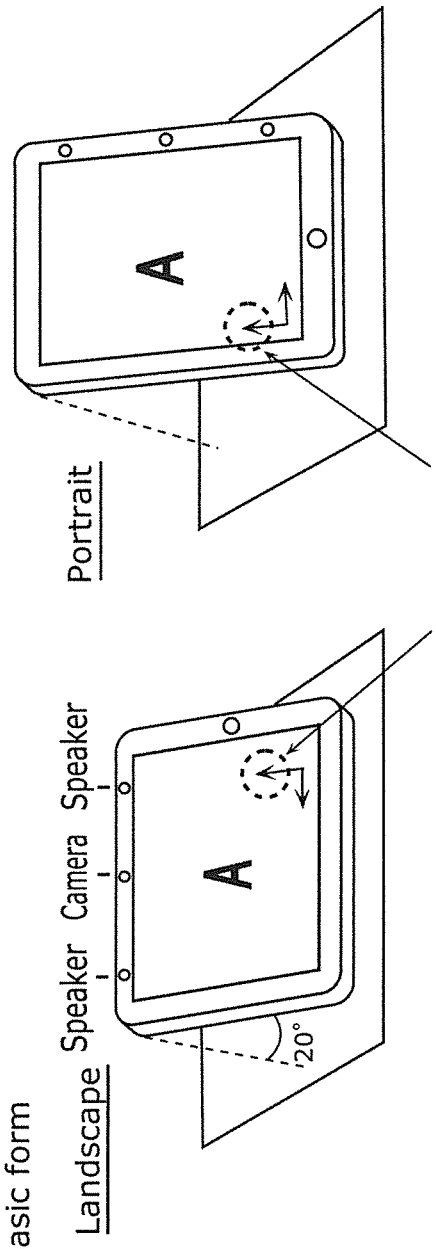
Icon variations indicating two normal positions
Basic form
Landscape / Speaker Camera Speaker / Portrait
Indicate top direction (= normal position) using two arrows as one icon
(A): Letter combination readable even when changed in angle by 90°
A-1: Arrangement in different letter size
Landscape     Portrait     ※Letter is not easily readable at other angles
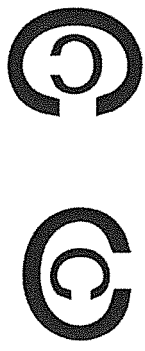

FIG. 22

Icon variations indicating two normal positions (A): Letter combination readable even when changed in angle by 90°

A-2: Arrangement of italic letter for stereoscopic effect

| Landscape | Portrait |
|---|---|

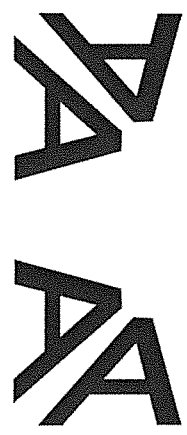

※Letter is not easily readable at other angles

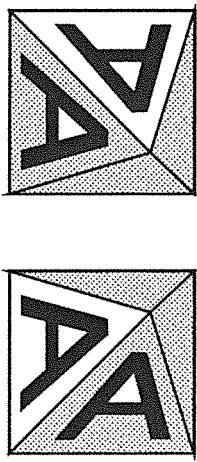

---

(A): Letter combination readable even when changed in angle by 90°

A-3: Arrangement in combination with graphics to enhance stereoscopic effect

| Landscape | Portrait |
|---|---|

※Letter is not easily readable at other angles

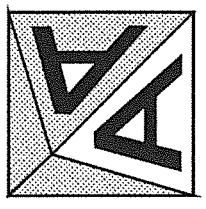

FIG. 23

Icon variations indicating two normal positions (B): Object viewable even when changed in angle by 90°

B-1: Object representing body viewed in obliquely downward direction (e.g. person)

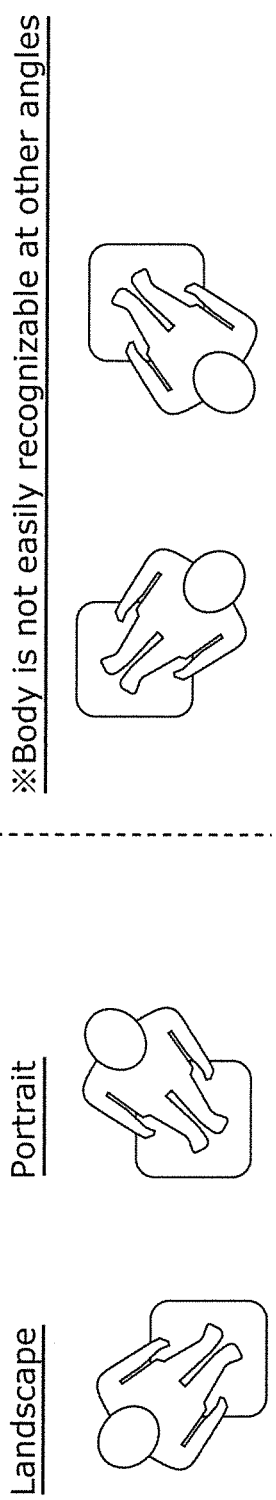

Landscape　　Portrait

─────────────────

※Body is not easily recognizable at other angles (B): Object viewable even when angle is changed by 90°

B-2: Object representing body viewed in obliquely downward direction (e.g. house)

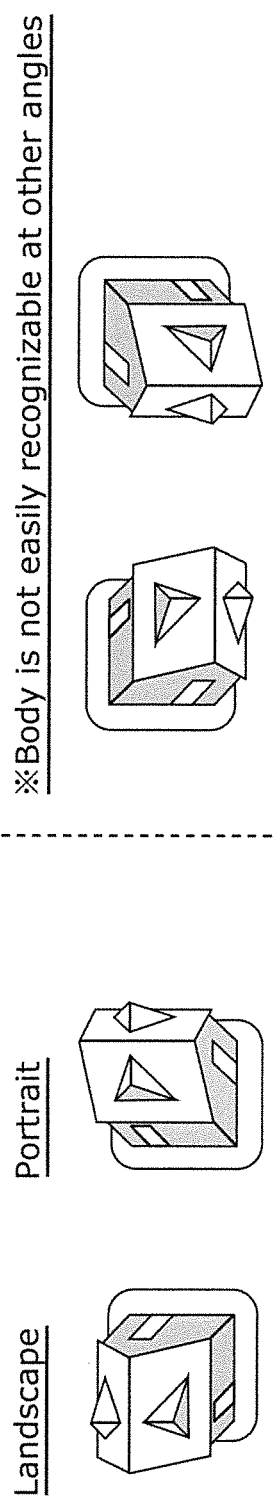

Landscape　　Portrait

─────────────────

※Body is not easily recognizable at other angles

FIG. 24 Icon variations indicating two normal positions (B): Object viewable even when changed in angle by 90°

B-3: Object representing body viewed in obliquely downward direction (e.g. staircase)

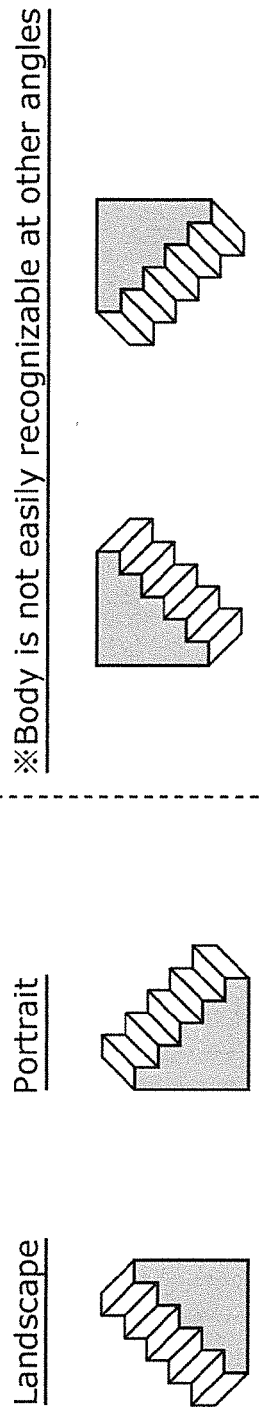

Landscape / Portrait

※Body is not easily recognizable at other angles

Appear not to be known body which is staircase (B): Object viewable even when angle is changed by 90°

B-4: Object representing body viewed in obliquely downward direction (e.g. plate and sphere)

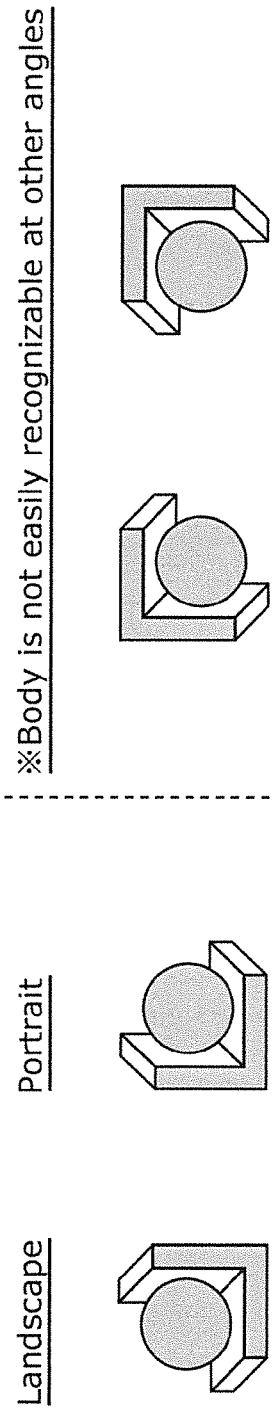

Landscape / Portrait

※Body is not easily recognizable at other angles

Sphere appears to adhere to plate despite gravity

FIG. 25

Icon variations indicating two normal positions
(B): Object viewable even when changed in angle by 90°

B-5: Object representing body viewed in obliquely downward direction + letter (e.g. book)

| Landscape | Portrait | | |
|---|---|---|---|
| 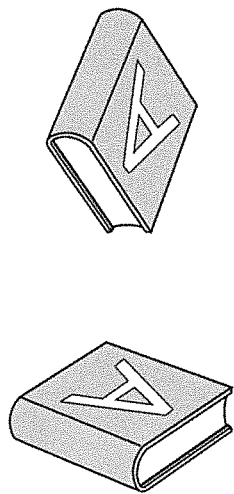 | | | |
| Letter is readable  Laid on desk | | Letter is upside down  Appear to float in air |

※Body is not easily recognizable at other angles

---

B-6: Object representing body viewed in obliquely downward direction + face (e.g. book)

| Landscape | Portrait | | |
|---|---|---|---|
| 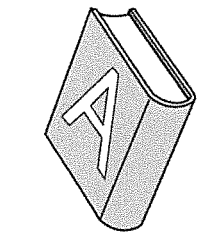 | 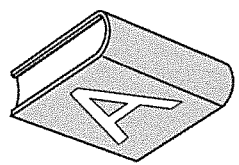 | 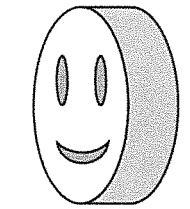 | 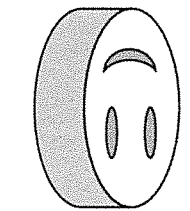 |
| Face is recognizable | Laid on desk | Face is upside down | Appear to adhere to ceiling |

※Body is not easily recognizable at other angles

FIG. 26

Icon variations indicating two normal positions (C): Object viewable as another body when changed in angle by 90°

C-1: Picture having two meanings (e.g. bird and rabbit)

| Landscape | Portrait | | |
|---|---|---|---|

※Body is not easily recognizable at other angles

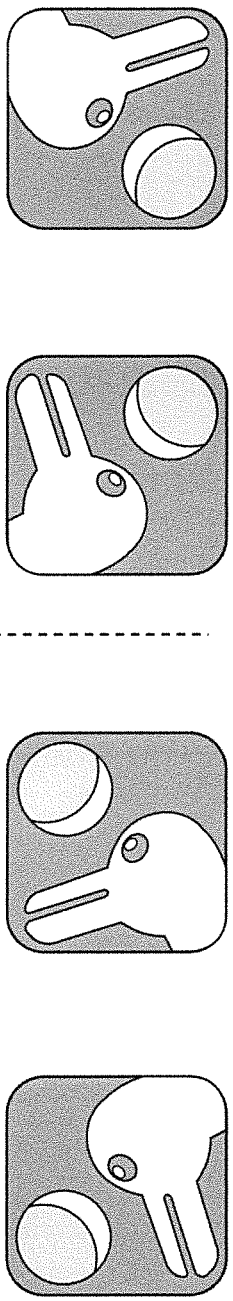

(C): Object viewable as another body when angle is changed by 90°

C-2: Picture having two meanings (e.g. penguin and sunfish)

| Landscape | Portrait | | |
|---|---|---|---|

※Body is not easily recognizable at other angles

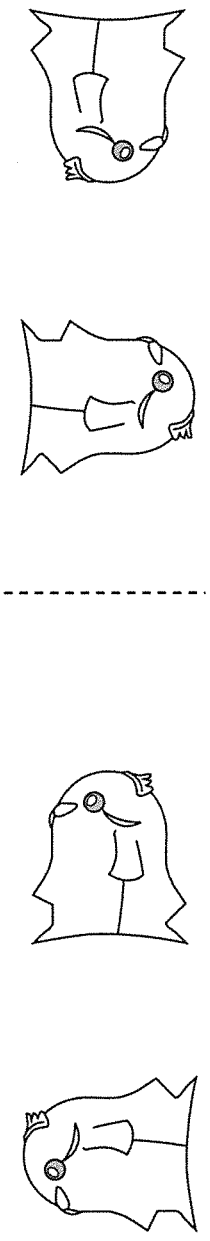

FIG. 27
Icon variations indicating two normal positions
(C): Object viewable as another body when changed in angle by 90°
C-1: Picture having two meanings (e.g. mug and overnight bag)
Landscape
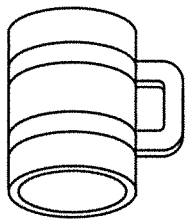
Portrait
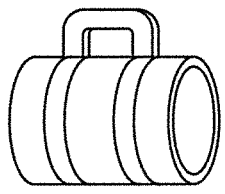
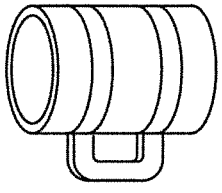
※Body is not easily recognizable at other angles

FIG. 42

| | Vertical rotation | Horizontal rotation |
|---|---|---|
| TV remote control mode | Yes | Yes |
| General-purpose remote control mode | Yes | No |

Display screen direction detection method(1010e)

FIG. 64

Screen display direction change table

| Rotation angle | Transition of rotation display direction |
|---|---|
| -45° ~ 45° | Advance 0 step |
| 45° ~ 135° | Advance 1 step |
| 135° ~ 225° | Advance 2 steps |
| 225° ~ 315° | Advance 3 steps |

Screen display direction transition diagram

FIG. 67
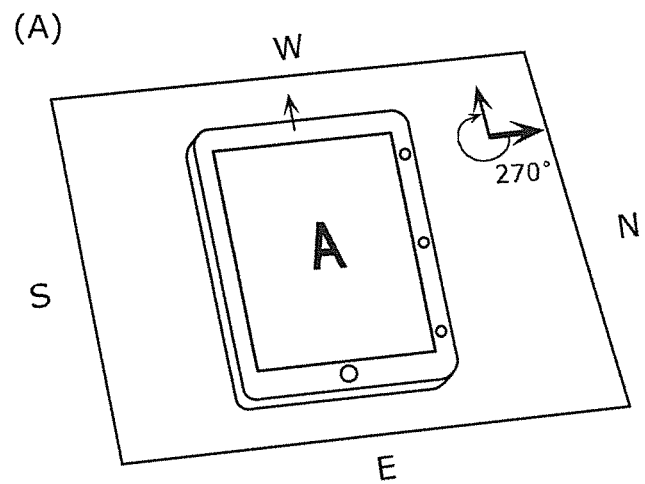
(A)
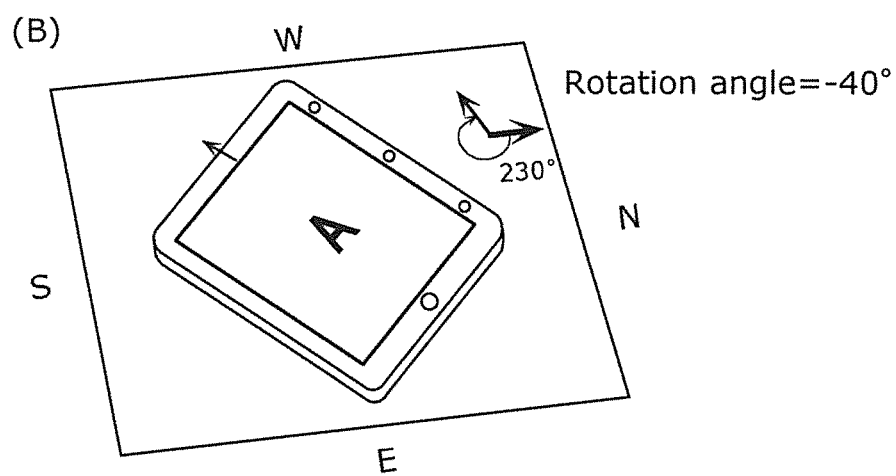
(B)
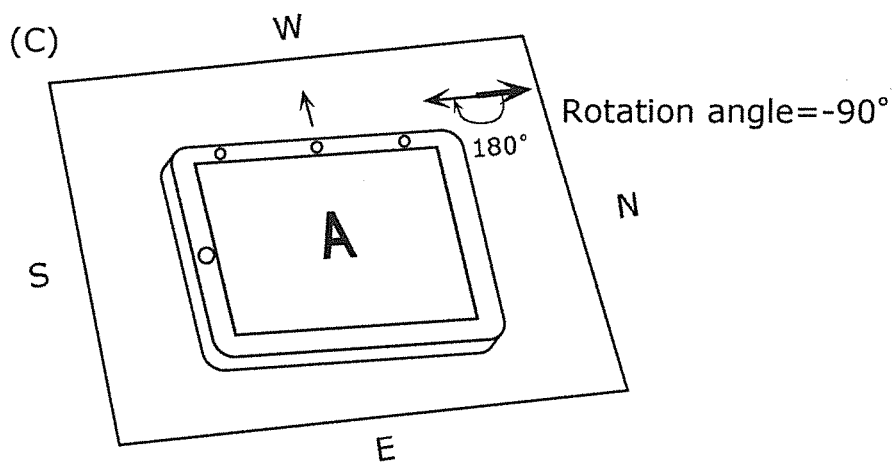
(C)

FIG. 68
(A-1)  (B-1)  (C-1)
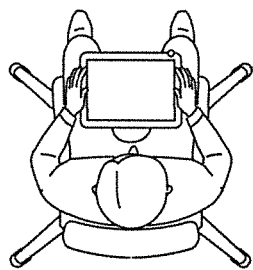 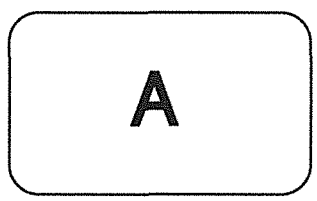 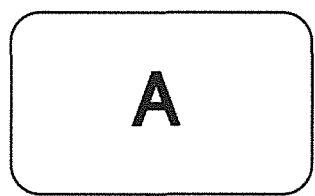
(A-2)  (B-2)  (C-2)
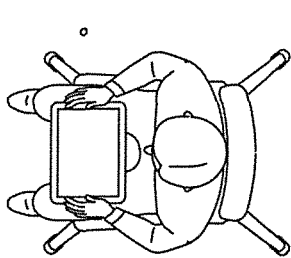 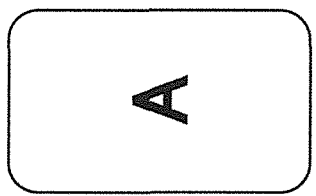 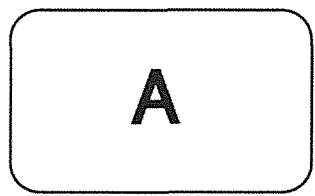
(A-3)  (B-3)  (C-3)
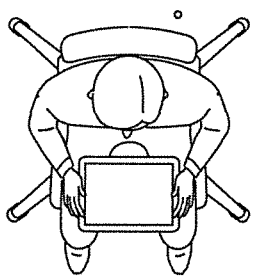 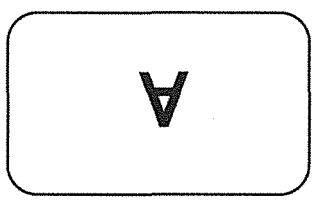 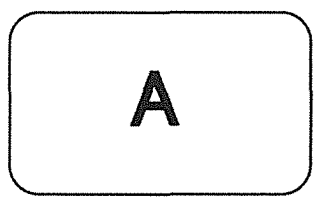

Flow when person rotates while holding tablet

Reference direction update method(S1140b)

INFORMATION DISPLAY DEVICE

CROSS REFERENCE TO RELATED APPLICATION(S)

The present application claims the benefit of U.S. Provisional Patent Application No. 61/521,813 filed on Aug. 10, 2011. The entire disclosure of the above-identified application including the specification, drawings and claims is incorporated herein by reference in its entirety.

TECHNICAL FIELD

The present invention relates to a mobile information display device such as a smartphone and a tablet, and in particular relates to a GUI display method of a terminal.

BACKGROUND ART

In recent years, high-performance mobile information display terminals (hereafter referred to as mobile devices) such as smartphones have been introduced and used for various applications. One of such applications is the use of a mobile device to control a home appliance. As compared to a laptop computer, a smartphone, a tablet, or the like has a form that does not need to coincide with a posture of its housing, and can be held freely in any of the orientations including portrait, landscape, and upside-down. This raises the need to display a GUI in an orientation required by a user.

There is a mobile device product that is implemented to detect a gravity direction and display a GUI so that a side situated uppermost in a vertical direction with respect to the ground corresponds to the top of the GUI. However, since the user holds the mobile device in various ways, this technique cannot be applied to cases such as when the user rotates the mobile device while holding it in a horizontal position.

A method for solving this problem is disclosed in Patent Literature (PTL) 1. PTL 1 discloses a method of detecting, based on a pressure sensed by a touch sensor, whether the mobile device is held with a single hand or both hands, and changing the screen display depending on the detection result.

CITATION LIST

Patent Literature

[PTL 1] Japanese Patent No. 4489719

SUMMARY OF INVENTION

Technical Problem

However, the technique disclosed in PTL 1 cannot be applied to cases such as when the user holds the mobile device in a way different from usual and when the user holds the mobile device in a different orientation.

The present invention has been made in view of the problem stated above, and has an object of providing an information display device that is capable of displaying a GUI in an orientation easily viewable by a user even when the user holds the information display device in various ways by, for example, changing its orientation.

Solution to Problem

To solve the problem stated above, an information display device according to one aspect of the present invention determines, by a posture sensor for detecting a posture of the mobile device using various sensors such as an acceleration sensor, an angular velocity sensor, a geomagnetic sensor, and a pressure sensor, a state of the mobile device and estimates a position relationship between a user and the mobile device and the posture of the mobile device, to display a GUI in an orientation easily viewable by the user.

Advantageous Effects of Invention

According to the present invention, it is possible to realize an information display device that is capable of displaying a GUI in an orientation easily viewable by a user even when the user holds the information display device in various ways. This enables the user to easily operate the mobile device even when holding the mobile device in various ways.

BRIEF DESCRIPTION OF DRAWINGS

These and other objects, advantages and features of the invention will become apparent from the following description thereof taken in conjunction with the accompanying drawings that illustrate a specific embodiment of the present invention. In the drawings:

FIG. 14 is a diagram showing an example of pointing target information stored in a position DB;

FIG. 19 is a diagram showing icon variations indicating a normal position in the information display device (mobile device) in Embodiment 4 of the present invention;

FIG. 20 is a diagram showing icon variations indicating the normal position in the information display device (mobile device) in Embodiment 4 of the present invention;

FIG. 21 is a diagram showing icon variations indicating the normal position in the information display device (mobile device) in Embodiment 4 of the present invention;

FIG. 22 is a diagram showing icon variations indicating the normal position in the information display device (mobile device) in Embodiment 4 of the present invention;

FIG. 23 is a diagram showing icon variations indicating the normal position in the information display device (mobile device) in Embodiment 4 of the present invention;

FIG. 24 is a diagram showing icon variations indicating the normal position in the information display device (mobile device) in Embodiment 4 of the present invention;

FIG. 25 is a diagram showing icon variations indicating the normal position in the information display device (mobile device) in Embodiment 4 of the present invention;

FIG. 26 is a diagram showing icon variations indicating the normal position in the information display device (mobile device) in Embodiment 4 of the present invention;

FIG. 27 is a diagram showing icon variations indicating the normal position in the information display device (mobile device) in Embodiment 4 of the present invention;

FIG. 42 is a diagram showing a use case example in the case of operating the mobile terminal in Embodiment 5 of the present invention as a TV remote control;

FIG. 64 is a diagram showing a screen display direction change table of the mobile device in Embodiment 5 of the present invention;

FIG. 67 is a diagram showing a direction of the mobile device in the case of rotating the mobile device in Embodiment 5 of the present invention;

FIG. 68 is a diagram showing display of the mobile device in the case where a person views the mobile device in Embodiment 5 of the present invention;

DESCRIPTION OF EMBODIMENTS

The following describes embodiments of the present invention with reference to drawings.

Embodiment 1

Embodiment 1 describes flow of a process of detecting a centrifugal force or a user's operation of shaking a mobile device and changing a screen display orientation so that a GUI is displayed in an orientation easily viewable by the user.

Figure 1:
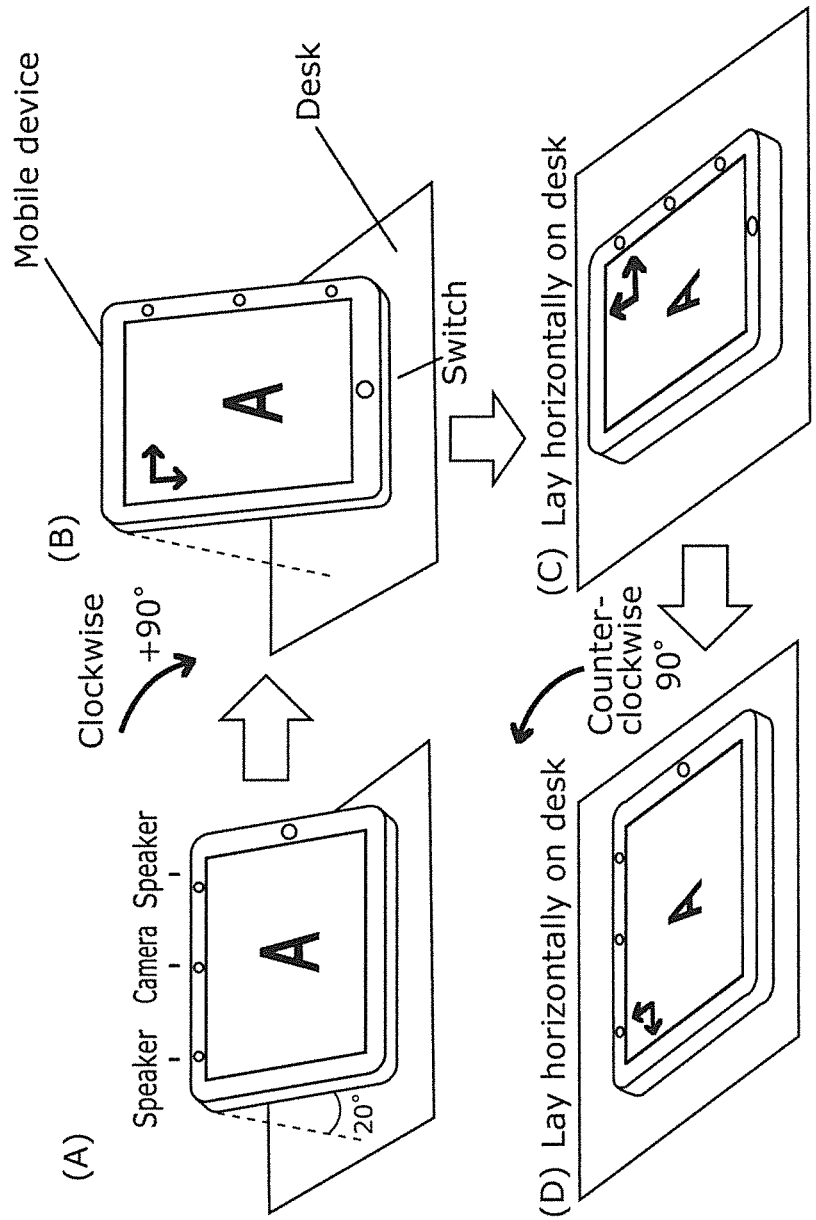
FIG. 1 is a diagram showing a relationship between a posture and a screen display orientation of an information display device in Embodiment 1 of the present invention.

FIG. 1 is a diagram showing a relationship between a posture and a screen display orientation of an information display device in Embodiment 1 of the present invention. As shown in FIG. 1, an initial state of a state in which the user is viewing the mobile device is set as (A). In (A), the mobile device is in a state in which its screen is displaced at 20° from a vertical direction with respect to a desk which is a horizontal plane. Rotating the mobile device 90° clockwise from this state results in (B) in which the mobile device is in a state of being portrait-oriented and the GUI is displayed so that a top side in the vertical direction corresponds to the top.

Thus, when the screen display unit of the mobile device is not in a horizontal position, the GUI can be displayed so that the top side in the vertical direction corresponds to the top, by detecting gravity using an acceleration sensor or the like.

When the mobile device is then laid horizontally as shown in (C), the display in (B) is maintained. After this, when the orientation of the mobile device is changed counterclockwise on the horizontal plane, the GUI is displayed in a direction that has been the top direction in (C), as shown in (D). Though the desk is used here to represent the horizontal plane, the mobile device may be placed on a floor or a ceiling, held with one hand or both hands, and the like.

Figure 2:
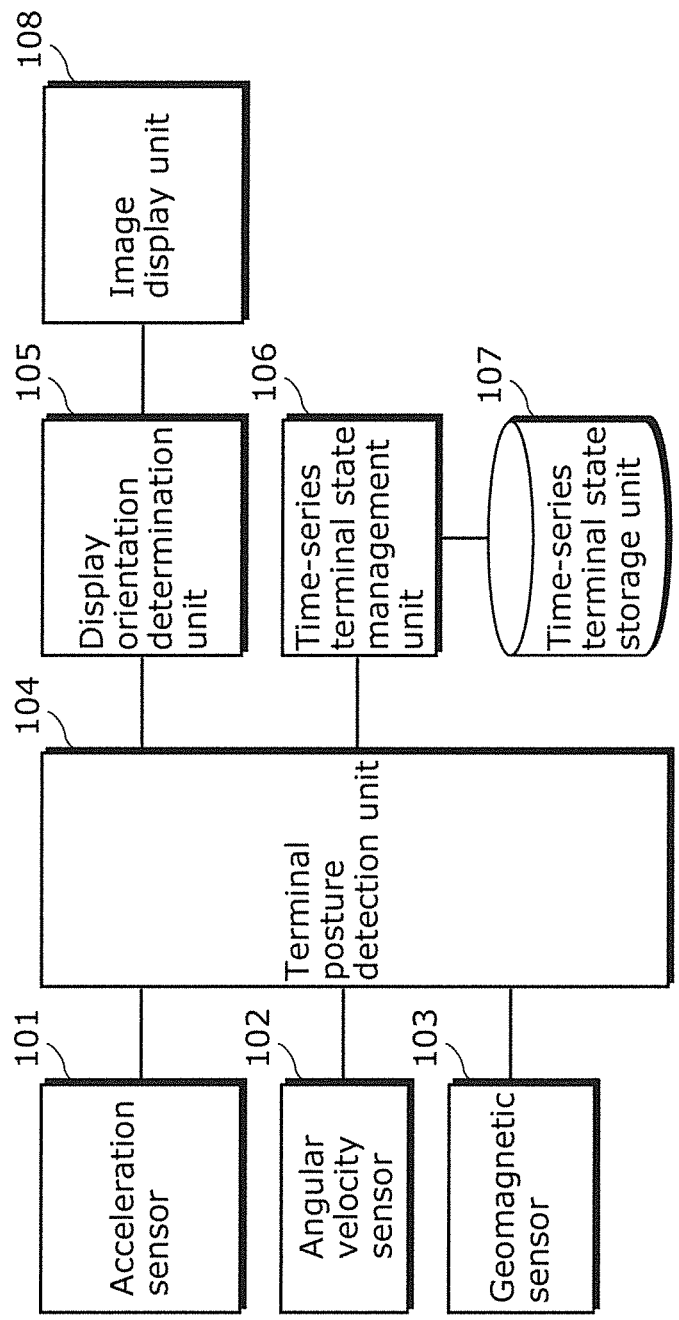
FIG. 2 is a diagram showing an internal structure of a processing unit that determines the screen display orientation of the information display device in Embodiment 1 of the present invention.

A method of determining the display orientation when the terminal posture is changed to each of (C) and (D) from the detected state such as (A) or (B) is described in more detail below, with reference to FIG. 2. FIG. 2 is a diagram showing an internal structure of a processing unit that determines the screen display orientation of the information display device in Embodiment 1 of the present invention.

As shown in FIG. 2, the mobile device according to the present invention includes: an acceleration sensor 101; an angular velocity sensor 102; a geomagnetic sensor 103; a terminal posture detection unit 104 that detects, based on information from these sensors, terminal posture information such as the angle of the mobile device with respect to the horizontal plane and the orientation of the mobile device on the horizontal plane; a display orientation determination unit 105 that determines the display orientation of the GUI displayed on the screen of the mobile device based on the terminal posture information and the like; a time-series terminal state management unit 106 that stores, in a time-series terminal state storage unit 107, and manages the terminal posture information and the GUI display orientation as a past state of the terminal; and an image display unit 108.

Figure 3:
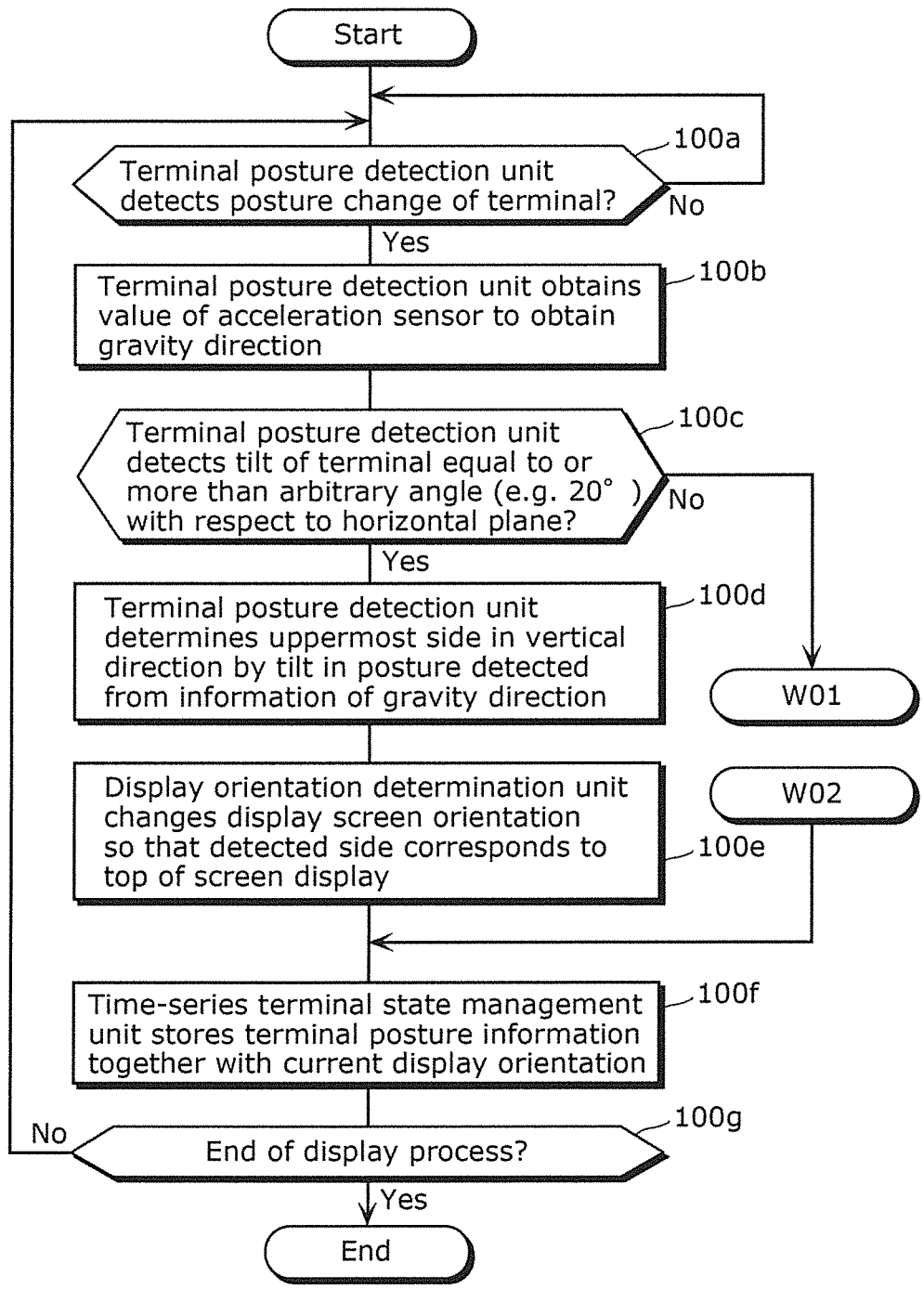
FIG. 3 is a diagram showing process flow of the information display device in Embodiment 1 of the present invention.

The following describes process flow with reference to FIG. 3. FIG. 3 is a diagram showing process flow of the information display device in Embodiment 1 of the present invention.

First, in Step 100a, the terminal posture detection unit 104 determines whether or not a posture change of the terminal is detected from the various sensors. In the case where the posture change of the terminal is not detected, the process returns to Step 100a.

In the case where the posture change of the terminal is detected, the terminal posture detection unit 104 obtains the value of the acceleration sensor 101 to obtain the gravity direction in Step 100b.

Next, in Step 100c, the terminal posture detection unit 104 determines whether or not a tilt of the terminal equal to or more than an arbitrary angle (e.g. 20°) with respect to the horizontal plane is detected.

In the case where the determination in Step 100c results in Yes, the process goes to Step 100d in which the terminal posture detection unit 104 determines an uppermost side in the vertical direction by the tilt in the posture detected from the information of the gravity information.

Next, in Step 100e, the display orientation determination unit 105 changes the display screen orientation so that the detected side corresponds to the top of the screen display. Following this, in Step 100f, the time-series terminal state management unit 106 stores the terminal posture information together with the current display orientation.

Next, in Step 100g, it is determined whether or not the display process ends. In the case where the determination results in Yes, the process ends. In the case where the display process does not end (the determination results in No), the process returns to Step 100a.

Figure 4:
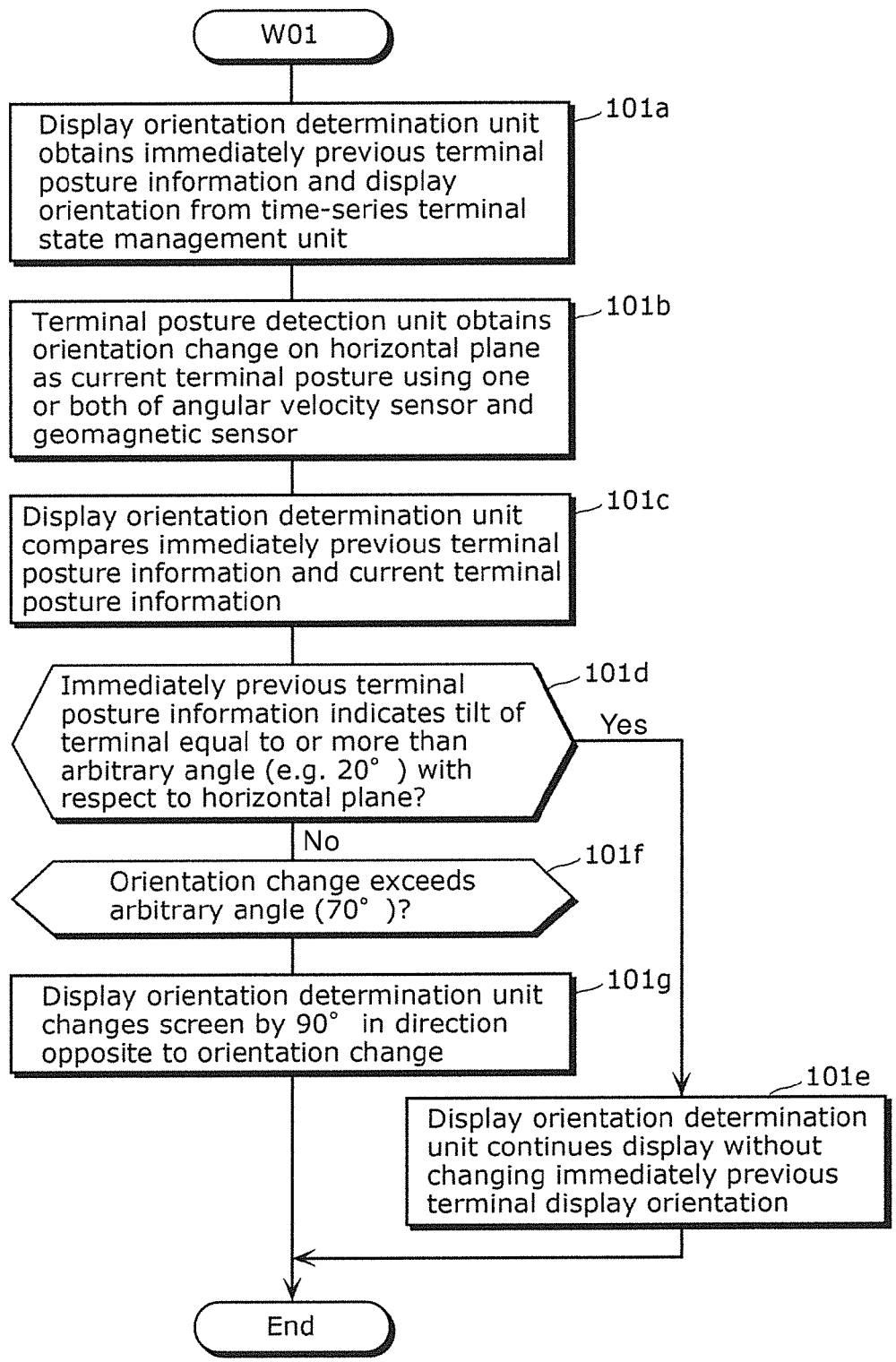
FIG. 4 is a diagram showing process flow of the information display device in Embodiment 1 of the present invention.

In the case where the determination in Step 100c results in No, the process goes to W01 in FIG. 4.

The following describes process flow with reference to FIG. 4. FIG. 4 is a diagram showing process flow of the information display device in Embodiment 1 of the present invention.

First, in Step 101a, the display orientation determination unit 105 obtains immediately previous terminal posture information and display orientation from the time-series terminal state management unit 106.

Next, in Step 101b, the terminal posture detection unit 104 obtains an orientation change on the horizontal plane as the current terminal posture using one or both of the angular velocity sensor and the geomagnetic sensor.

Next, in Step 101c, the display orientation determination unit 105 compares the immediately previous terminal posture information and the current terminal posture information.

Next, in Step 101d, the display orientation determination unit 105 determines whether or not the immediately previous terminal posture information indicates the tilt of the terminal equal to or more than the arbitrary angle (e.g. 20°) with respect to the horizontal plane.

In the case where the determination results in Yes, the process goes to Step 101e in which the display orientation determination unit 105 continues the display without changing the immediately previous terminal display orientation. The process then returns to W02 in FIG. 3.

In the case where the determination results in No, the process goes to Step 101f in which the display orientation determination unit 105 determines whether or not the orientation change exceeds an arbitrary angle (70°).

Next, in Step 101g, the display orientation determination unit 105 changes the screen by 90° in a direction opposite to the orientation change. The process then returns to W02 in FIG. 3.

Thus, the information display device (mobile device) in this embodiment can display the GUI in the orientation easily viewable by the user.

Embodiment 2

Embodiment 2 discloses a method of setting an orientation using a centrifugal force and also setting an orientation using a shaking width of a housing of a mobile device in consideration of a state in which the mobile device is held with the user's hand(s).

Figure 5:
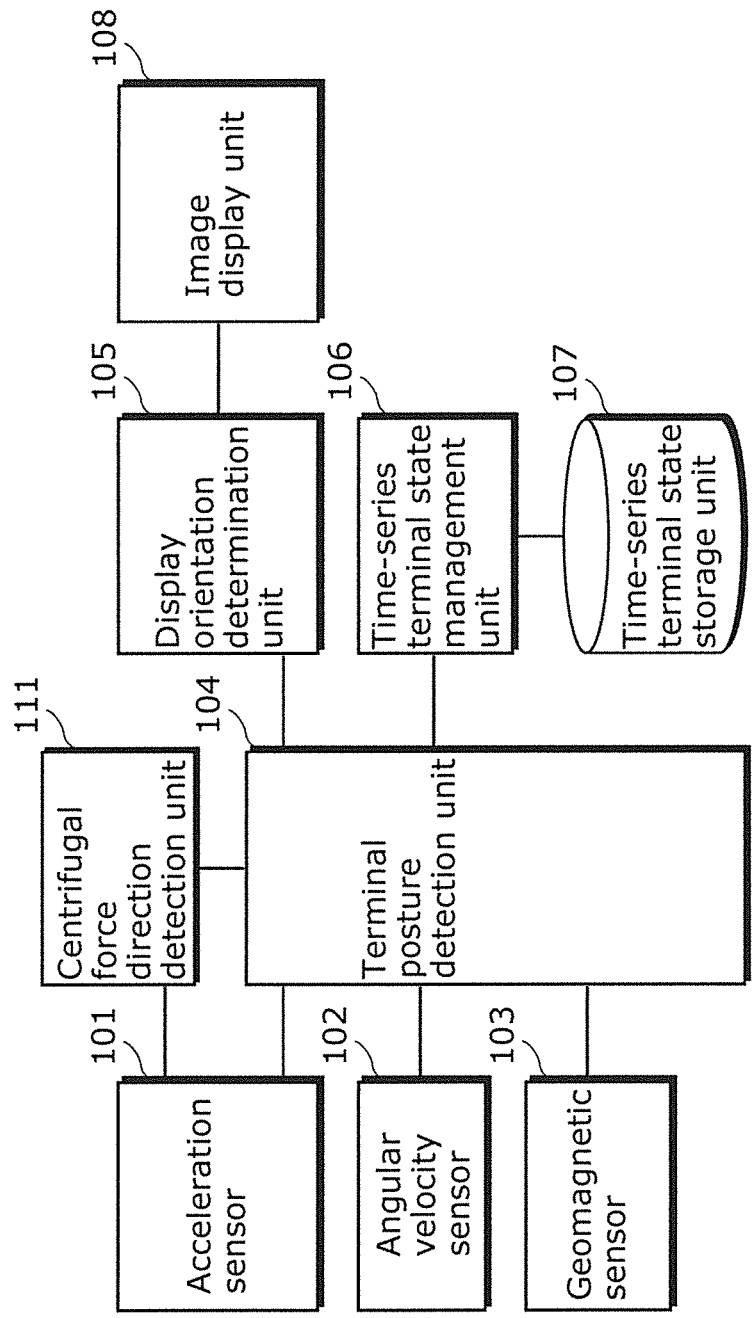
FIG. 5 is a diagram showing an internal structure of a processing unit that sets an orientation of an information display device in Embodiment 2 of the present invention.

FIG. 5 is a diagram showing an internal structure of a processing unit that sets an orientation of an information display device in Embodiment 2 of the present invention. The structure shown in FIG. 5 differs from the structure in Embodiment 1 in that a centrifugal force direction detection unit 111 is added.

Figure 6:
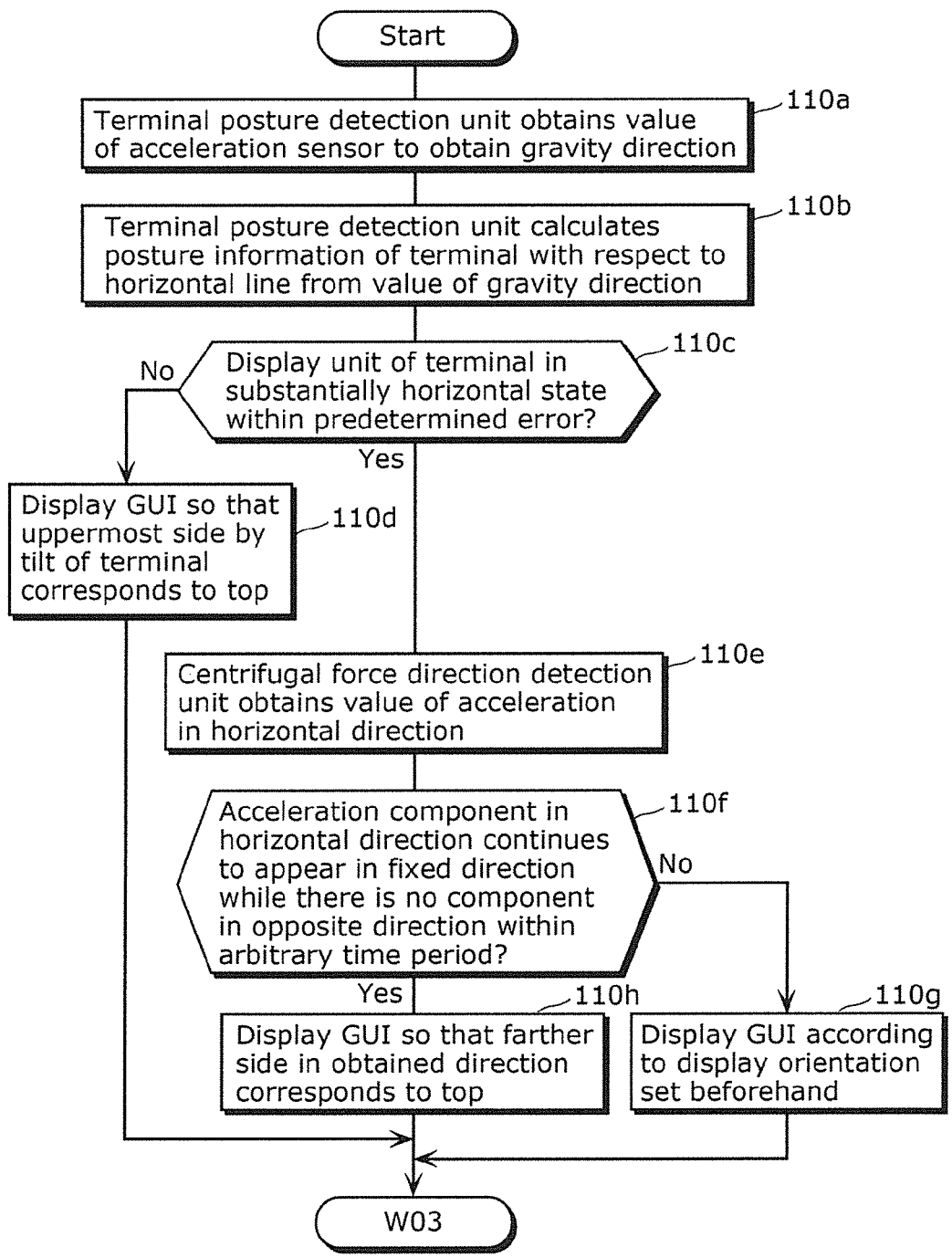
FIG. 6 is a diagram showing process flow of the information display device in Embodiment 2 of the present invention.

The following describes process flow with reference to FIG. 6. FIG. 6 is a diagram showing process flow of the information display device in Embodiment 2 of the present invention.

First, in Step 110a, the terminal posture detection unit 104 obtains the value of the acceleration sensor 101 to obtain the gravity direction.

Next, in Step 110b, the terminal posture detection unit 104 calculates posture information of the terminal with respect to a horizontal line from the value of the gravity direction.

Next, in Step 110c, the terminal posture detection unit 104 determines whether or not the display unit of the terminal is in a substantially horizontal state within a predetermined error.

In the case where the determination results in Yes, the process goes to Step 110e in which the centrifugal force direction detection unit 111 obtains a value of acceleration in the horizontal direction.

Next, in Step 110f, the centrifugal force direction detection unit 111 determines whether or not the acceleration component in the horizontal direction continues to appear in a fixed direction while there is no component in the opposite direction within an arbitrary time period.

In the case where the determination results in Yes, the process goes to Step 110h to display a GUI so that a farther side in the obtained direction corresponds to the top. The process then goes to W03 in FIG. 7.

In the case where the determination results in No, the process goes to Step 110g to display the GUI according to the display orientation set beforehand. The process then goes to W03 in FIG. 7.

In the case where the determination in Step 110c results in No, the GUI is displayed so that the uppermost side by the tilt of the terminal corresponds to the top. The process then goes to W03 in FIG. 7.

Figure 7:
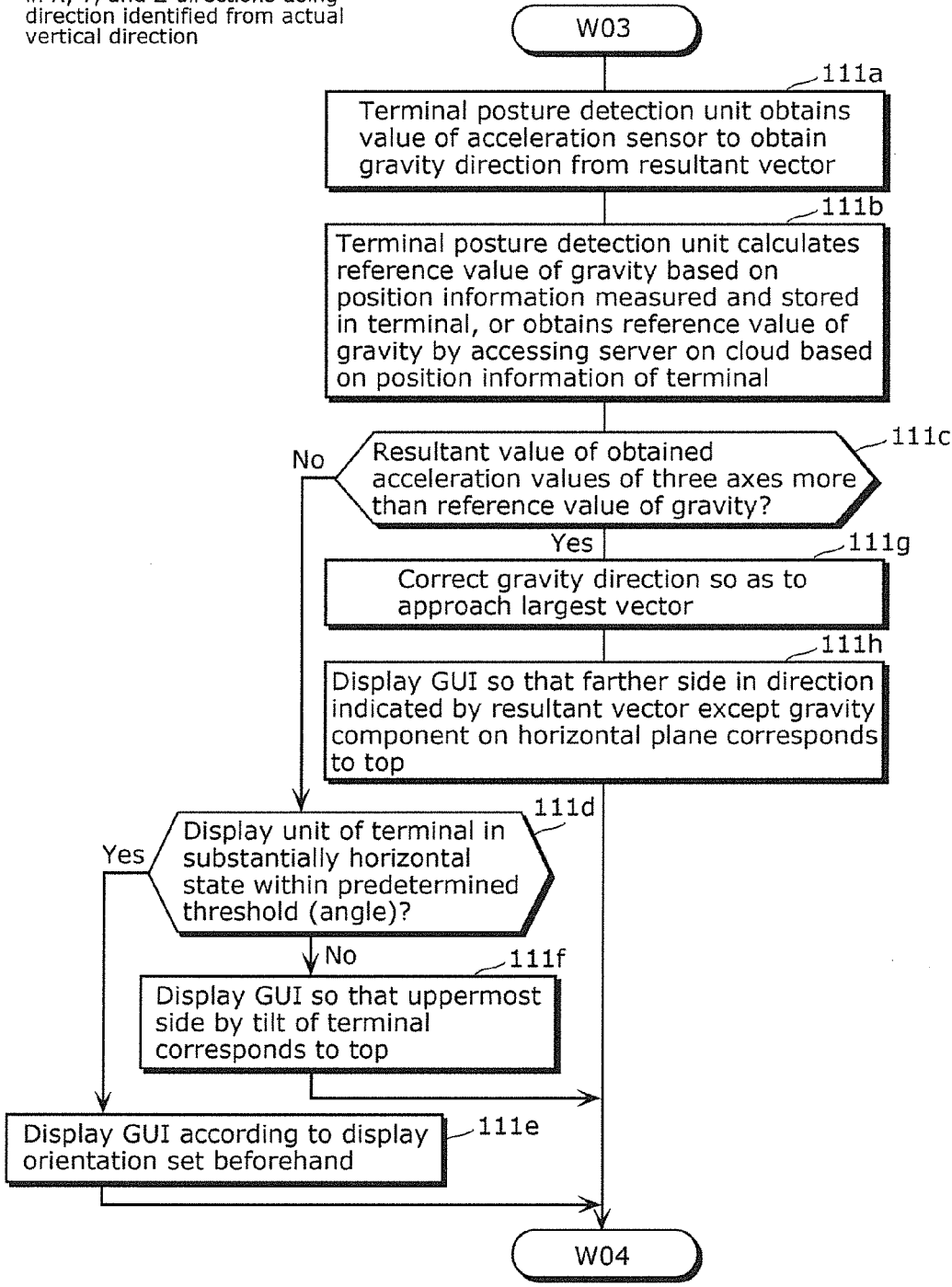
FIG. 7 is a diagram showing process flow of the information display device in Embodiment 2 of the present invention.

The following describes process flow with reference to FIG. 7. FIG. 7 is a diagram showing process flow of the information display device in Embodiment 2 of the present invention.

First, in Step 111a, the terminal posture detection unit 104 obtains the value of the acceleration sensor 101 to obtain the gravity direction from a resultant vector.

Next, in Step 111b, the terminal posture detection unit 104 calculates a reference value of gravity based on position information measured and stored in the terminal. Alternatively, the terminal posture detection unit 104 obtains the reference value of gravity by accessing a server on a cloud based on the position information of the terminal.

Next, in Step 111c, the terminal posture detection unit 104 compares a resultant value of the obtained acceleration values of the three axes with the reference value of gravity, to determine whether or not the resultant value is more than the reference value of gravity.

In the case where the determination results in Yes, the process goes to Step 111g to correct the gravity direction so as to approach a largest vector.

Next, in Step 111h, the GUI is displayed so that a farther side in a direction indicated by the resultant vector except the gravity component on the horizontal plane corresponds to the top. The process then goes to W04 in FIG. 8.

In the case where the determination in Step 111c results in No, the process goes to Step 111d to determine whether or not the display unit of the terminal is in a substantially horizontal state within a predetermined threshold (angle).

In the case where the determination results in Yes, the process goes to Step 111e to display the GUI according to the display orientation set beforehand. The process then goes to W04 in FIG. 8.

In the case where the determination results in No, the process goes to Step 111f to display the GUI so that the uppermost side by the tilt of the terminal corresponds to the top. The process then goes to W04 in FIG. 8.

Figure 8:
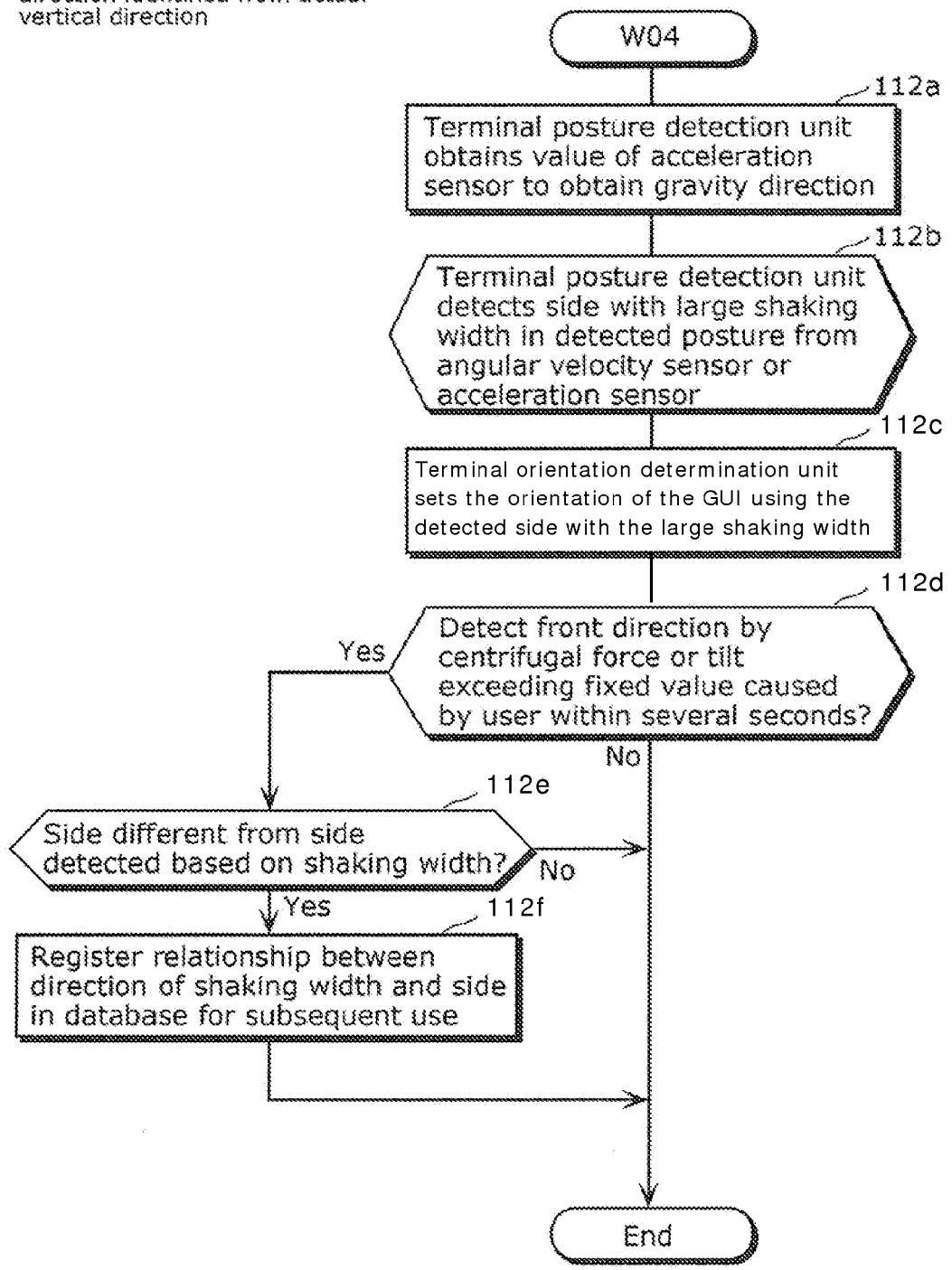
FIG. 8 is a diagram showing process flow of the information display device in Embodiment 2 of the present invention.

The following describes process flow with reference to FIG. 8. FIG. 8 is a diagram showing process flow of the information display device in Embodiment 2 of the present invention.

First, in Step 112a, the terminal posture detection unit 104 obtains the value of the acceleration sensor 101 to obtain the gravity direction.

Next, in Step 112b, the terminal posture detection unit 104 detects a side with a large shaking width in the detected posture from the angular velocity sensor 102 or the acceleration sensor 101.

Next, in Step 112c, the terminal orientation determination unit 105 sets the orientation of the GUI, using the detected side with the large shaking width and information set beforehand or stored previously and indicating a relationship between the side with the large shaking width and a front direction.

Next, in Step 112d, it is determined whether or not the terminal detects the front direction by a centrifugal force or a tilt exceeding a fixed value caused by the user within an arbitrary time period (e.g. 5 seconds).

In the case where the determination results in No, the process ends.

In the case where the determination results in Yes, the process goes to Step 112e to determine whether or not the side is different from the side detected based on the shaking width. In the case where the determination results in No, the process ends. In the case where the determination results in Yes, the process goes to Step 112f in which the terminal orientation determination unit 105 stores a relationship between the side with the large shaking width and the side detected by the user as the front direction within the subsequent fixed time period. The process then ends.

Thus, the information display device (mobile device) in this embodiment can display the GUI in the orientation easily viewable by the user, by setting the orientation using the centrifugal force and also setting the orientation using the shaking width of the housing of the mobile device in consideration of the state in which the mobile device is held with the user's hand(s).

Embodiment 3

This embodiment describes a method whereby a mobile device obtains position information of the mobile device itself by autonomous navigation using built-in sensors. This embodiment also describes a method of determining a screen orientation in the case where the mobile device displays a GUI or an application, using information of a periphery environment such as a peripheral device or entity whose position is registered beforehand or virtual tag information having position information.

Figure 9:
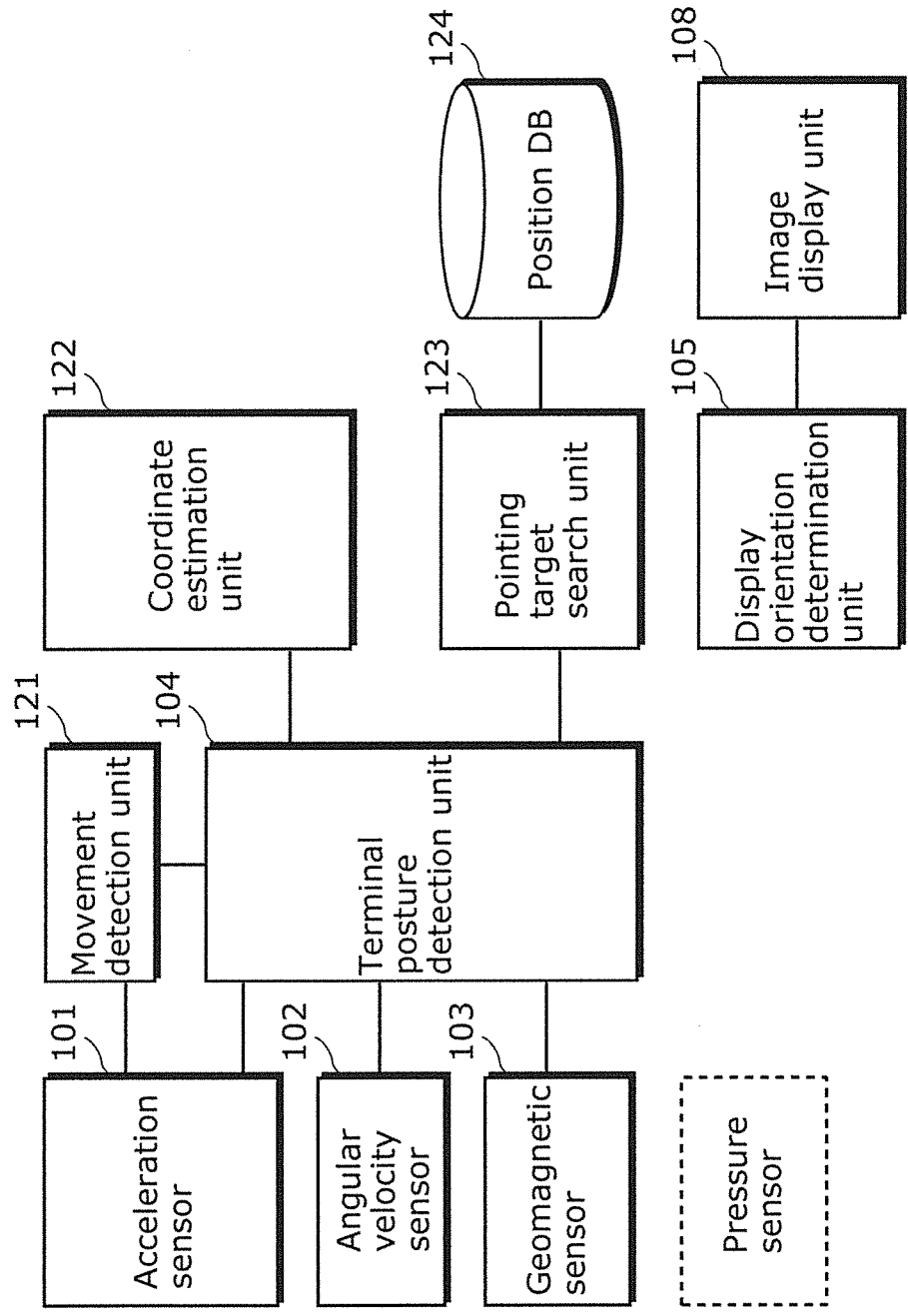
FIG. 9 is a diagram showing a structure of an information display device in Embodiment 3 of the present invention.

FIG. 9 is a diagram showing a structure of an information display device in Embodiment 3 of the present invention.

The structure shown in FIG. 9 differs from the structure in Embodiment 1 in that a movement detection unit 121 that detects the amount of movement of the mobile device from information which the mobile device obtains from the built-in sensors, a coordinate estimation unit 122 that estimates coordinates of the current position of the mobile device, a pointing target search unit 123 that searches for peripheral environment information as a pointing target, and a position DB 124 which is a database for registering, as position information, a list of peripheral devices and entities as pointing targets and virtual tag information having position information.

Note that any sensor useful for specifying a position, such as a pressure sensor for detecting a height, can be used as a built-in sensor.

The position DB 124 may be provided in the terminal or on the cloud. That is, the position DB 124 is not limited to a particular storage location.

Figure 10:
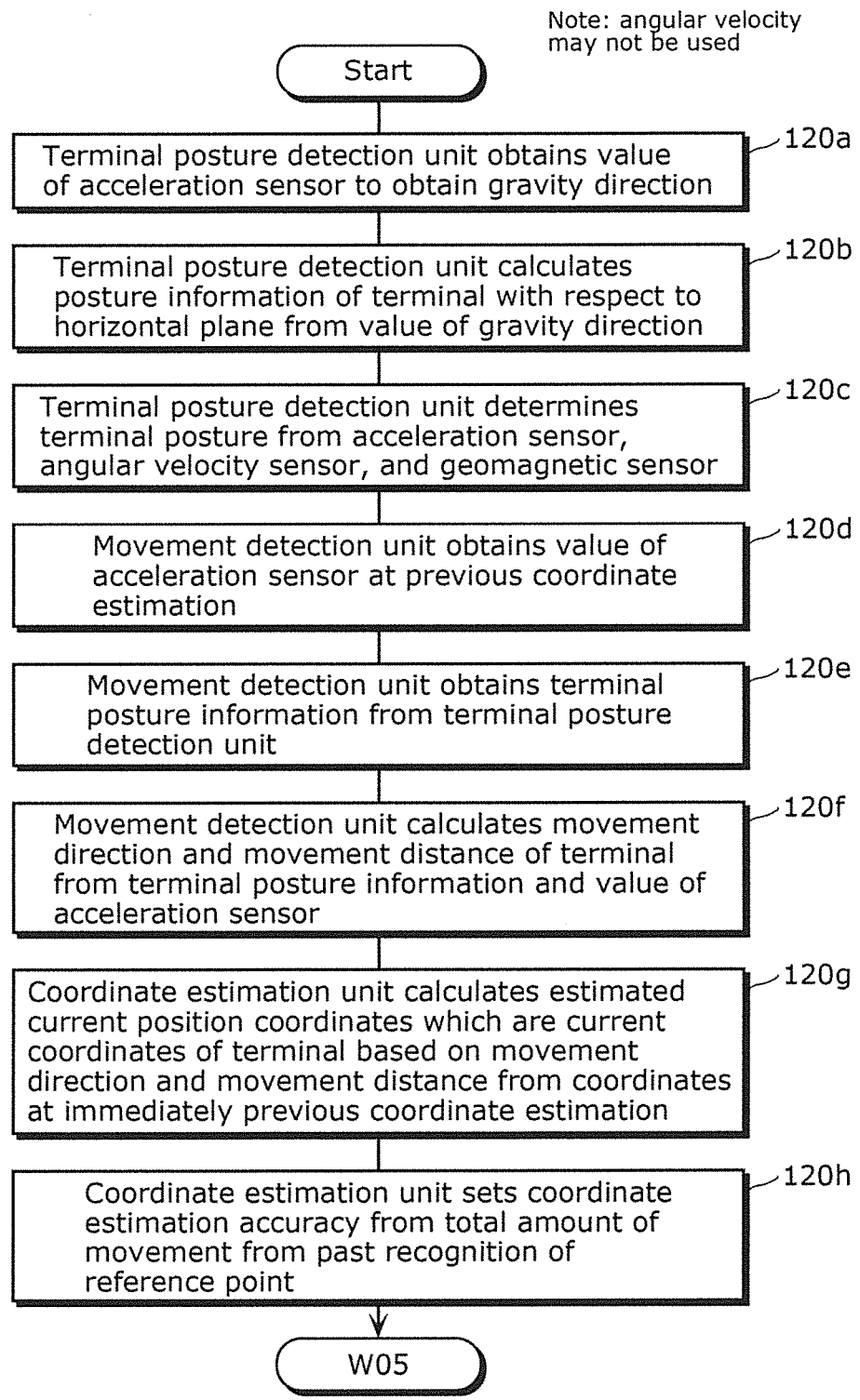
FIG. 10 is a diagram showing process flow of the information display device in Embodiment 3 of the present invention.

The following describes process flow with reference to FIG. 10. FIG. 10 is a diagram showing process flow of the information display device in Embodiment 3 of the present invention.

First, in Step 120a, the terminal posture detection unit 104 obtains the value of the acceleration sensor 101 to obtain the gravity direction.

Next, in Step 120b, the terminal posture detection unit 104 calculates posture information of the terminal with respect to the horizontal plane, from the value of the gravity direction.

Next, in Step 120c, the terminal posture detection unit 104 determines the terminal posture from the acceleration sensor 101, the angular velocity sensor 102, and the geomagnetic sensor 103.

Next, in Step 120d, the movement detection unit 121 obtains the value of the acceleration sensor 101 at the time of previous coordinate estimation.

Next, in Step 120e, the movement detection unit 121 obtains the terminal posture information from the terminal posture detection unit 104.

Next, in Step 120f, the movement detection unit 121 calculates a movement direction and a movement distance of the terminal, from the terminal posture information and the value of the acceleration sensor 101.

Next, in Step 120g, the coordinate estimation unit 122 calculates estimated current position coordinates which are current coordinates of the terminal, based on the movement direction and the movement distance from coordinates at immediately previous coordinate estimation.

Next, in Step 120h, the coordinate estimation unit 122 sets a coordinate estimation accuracy from a total amount of movement from past recognition of a reference point. The process then goes to W05 in FIG. 11.

Figure 11:
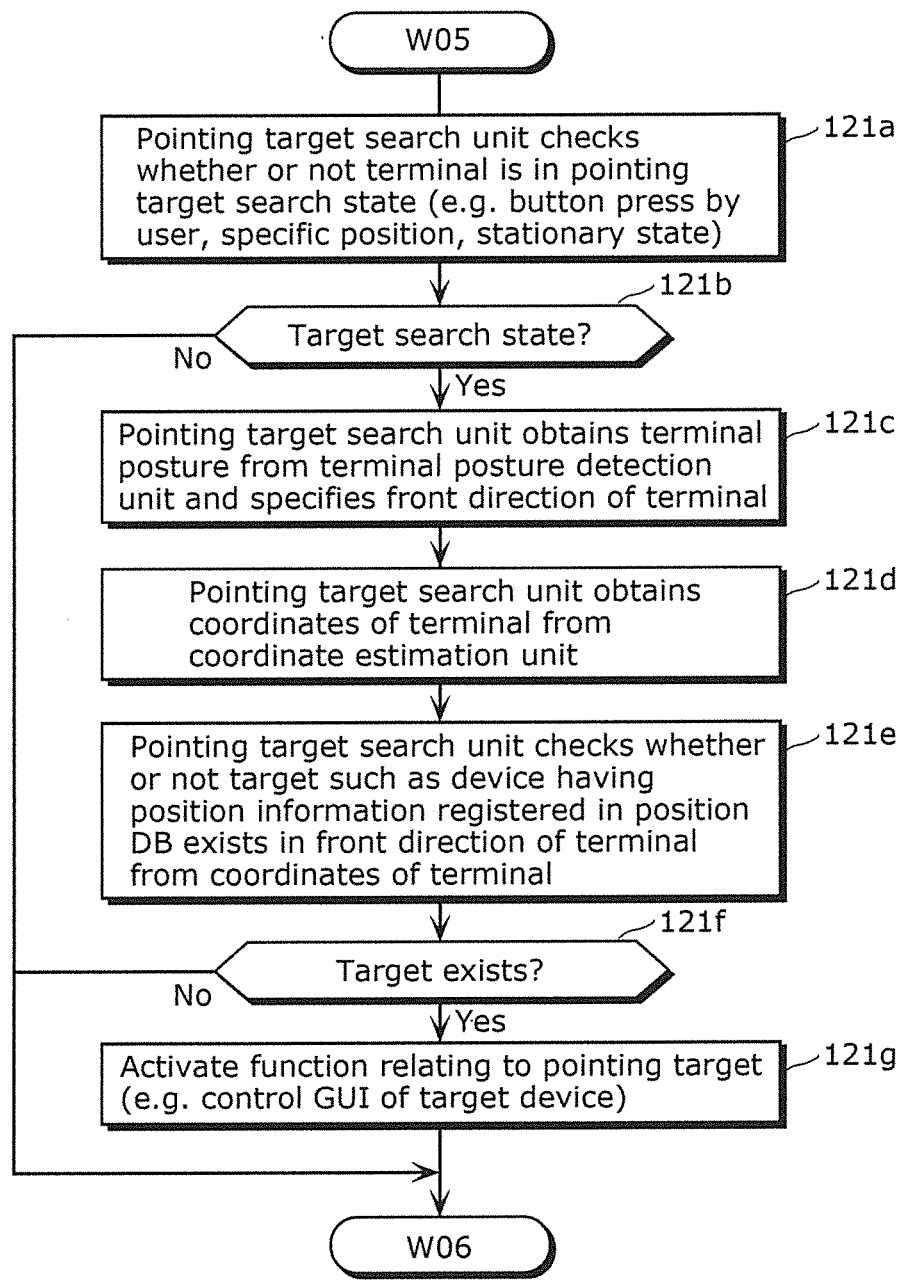
FIG. 11 is a diagram showing process flow of the information display device in Embodiment 3 of the present invention.

The following describes process flow with reference to FIG. 11. FIG. 11 is a diagram showing process flow of the information display device in Embodiment 3 of the present invention.

First, in Step 121a, the pointing target search unit 123 checks whether or not the terminal is in a pointing target search state (e.g. a button press by the user, a specific position, a stationary state).

Next, in Step 121b, the pointing target search unit 123 determines whether or not the terminal is in the target search state.

Figure 12:
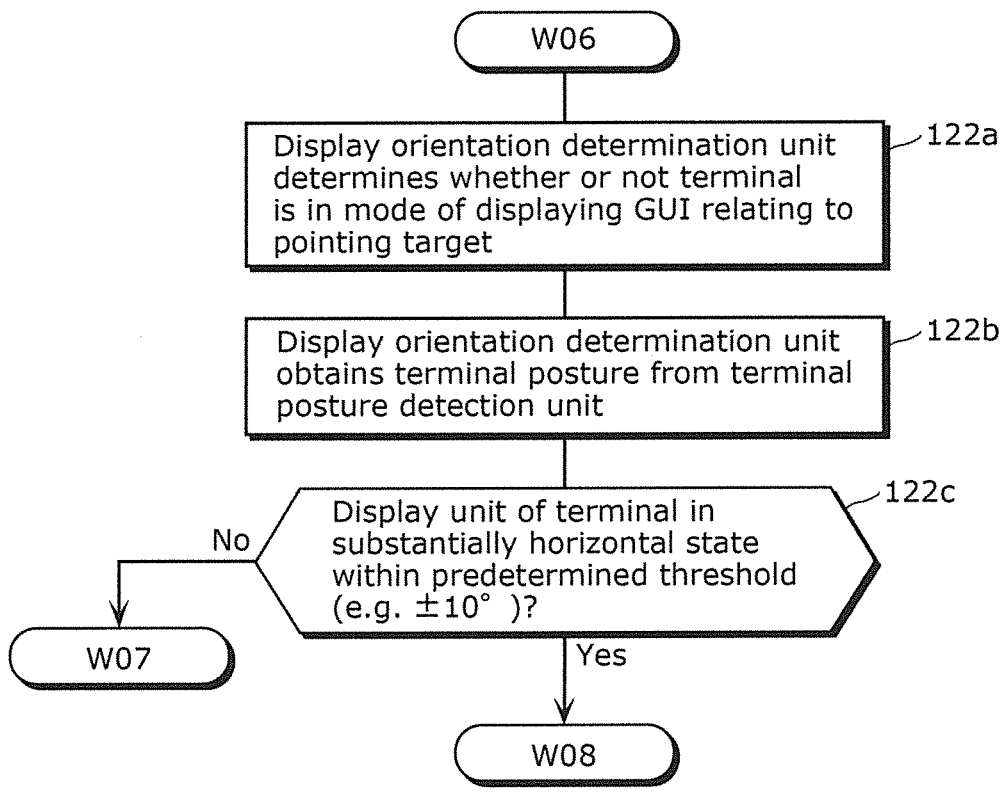
FIG. 12 is a diagram showing process flow of the information display device in Embodiment 3 of the present invention.

In the case where the determination results in No, the process goes to W06 in FIG. 12. In the case where the determination results in Yes, the process goes to Step 121c in which the pointing target search unit 123 obtains the terminal posture from the terminal posture detection unit 104 and specifies the front direction of the terminal.

Next, in Step 121d, the pointing target search unit 123 obtains the coordinates of the terminal from the coordinate estimation unit 122.

Next, in Step 121e, the pointing target search unit 123 checks whether or not a target such as a device having position information registered in the position DB 124 exists in the front direction of the terminal from the coordinates of the terminal.

Next, in Step 121f, the pointing target search unit 123 determines whether or not the target exists.

In the case where the determination results in No, the process goes to W06 in FIG. 12. In the case where the determination results in Yes, the process goes to Step 121g to activate a function relating to the pointing target (e.g. control GUI of the target device). The process then goes to W06 in FIG. 12.

The following describes process flow with reference to FIG. 12. FIG. 12 is a diagram showing process flow of the information display device in Embodiment 3 of the present invention.

First, in Step 122a, the display orientation determination unit 105 determines whether or not the terminal is in a mode of displaying a GUI relating to the pointing target.

Next, in Step 122b, the display orientation determination unit 105 obtains the terminal posture from the terminal posture detection unit 104.

Next, in Step 122c, the display orientation determination unit 105 determines whether or not the display unit of the terminal is in a substantially horizontal state within a predetermined threshold (e.g. ±10°).

Figure 13:
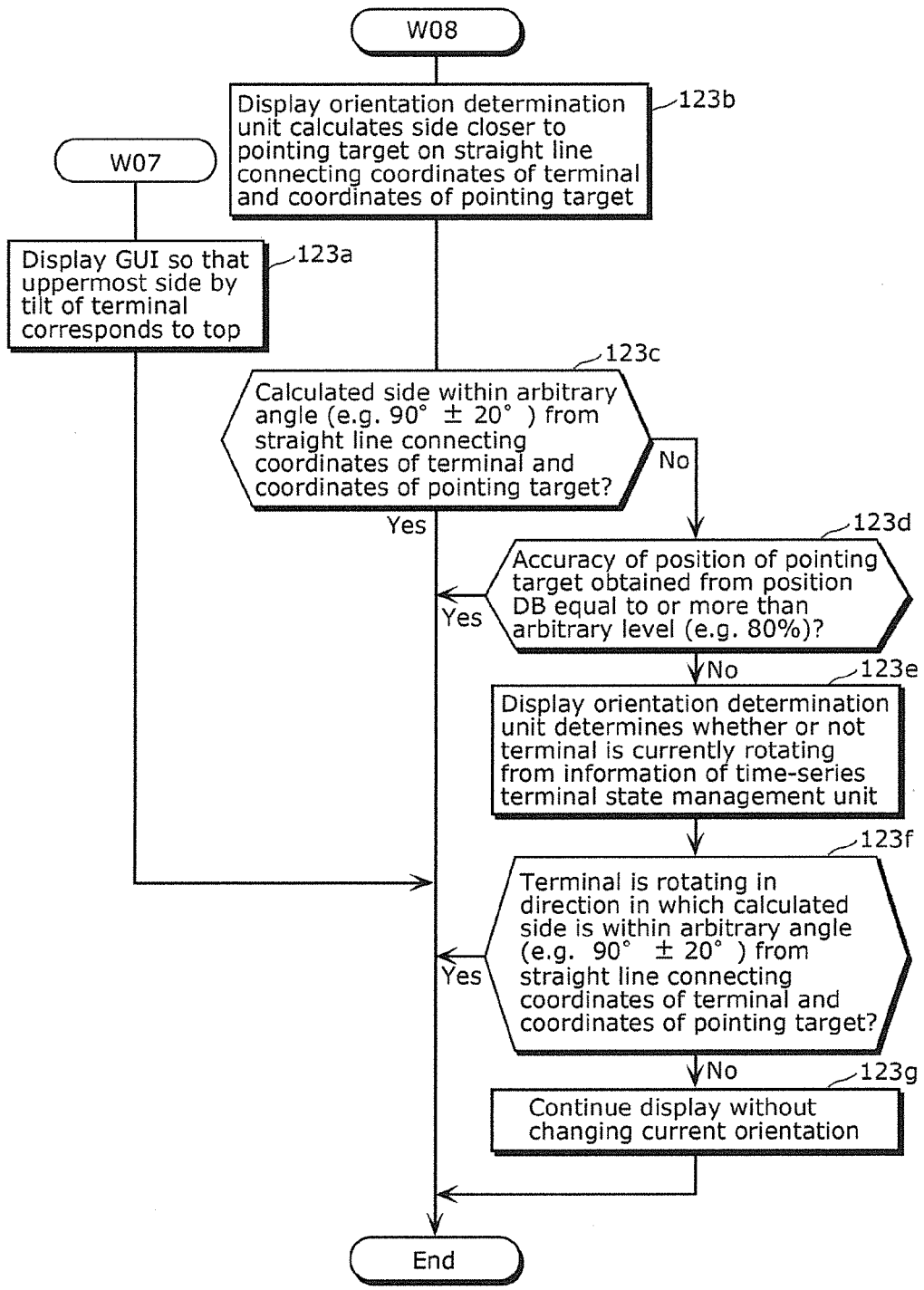
FIG. 13 is a diagram showing process flow of the information display device in Embodiment 3 of the present invention.
Figure 15:
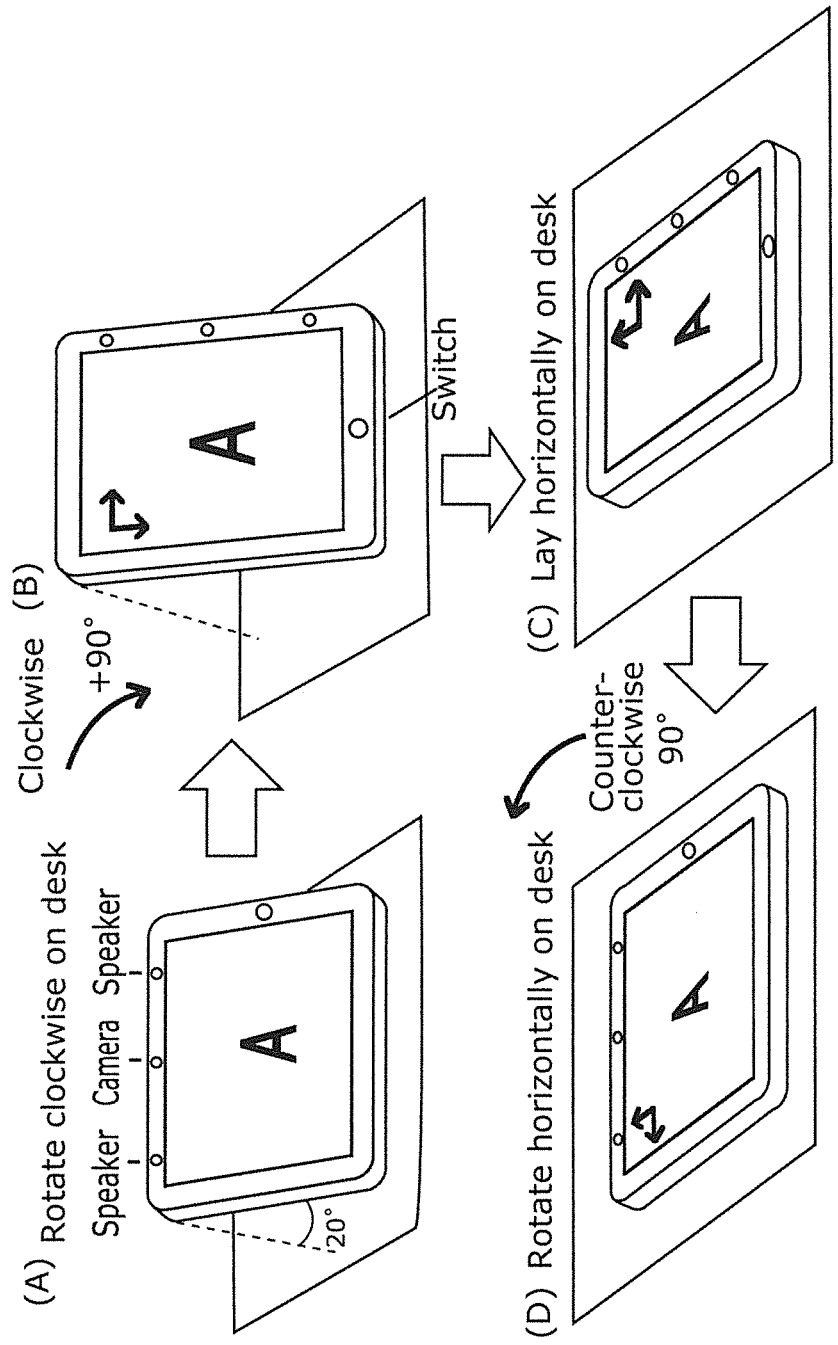
FIG. 15 is a diagram showing another example of the relationship between the posture and the screen display orientation of the information display device according to the present invention.
Figure 16:
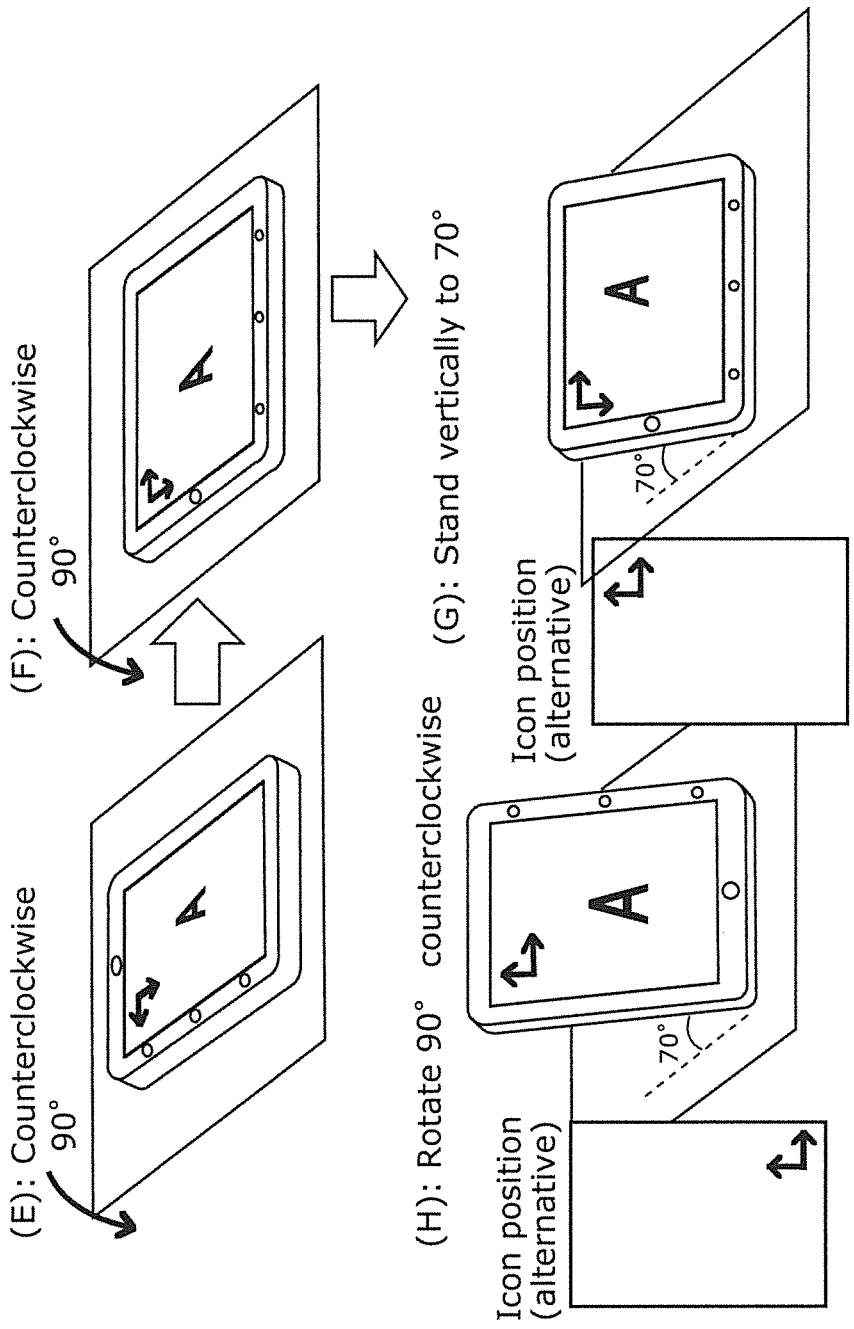
FIG. 16 is a diagram showing another example of the relationship between the posture and the screen display orientation of the information display device according to the present invention.
Figure 17:
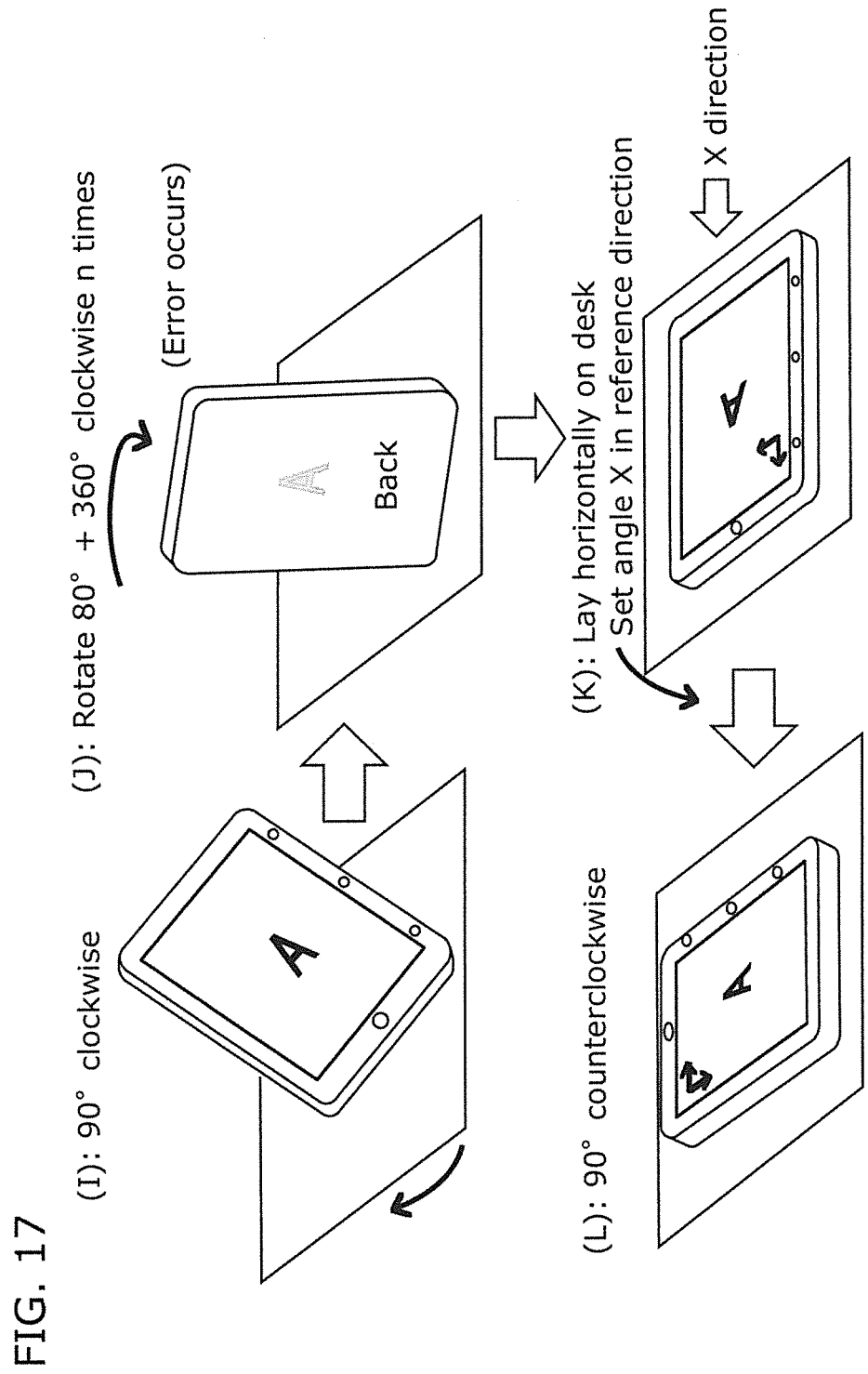
FIG. 17 is a diagram showing another example of the relationship between the posture and the screen display orientation of the information display device according to the present invention.

In the case where the determination results in Yes, the process goes to W08 in FIG. 13. In the case where the determination results in No, the process goes to W07 in FIG. 13.

The following describes process flow with reference to FIG. 13. FIG. 13 is a diagram showing process flow of the information display device in Embodiment 3 of the present invention.

In Step 123a from W07, the GUI is displayed so that the uppermost side by the tilt of the terminal corresponds to the top. The process then ends.

In Step 123b from W08, the display orientation determination unit 105 calculates a side closer to the pointing target on a straight line connecting the coordinates of the terminal and the coordinates of the pointing target.

Next, in Step 123c, the display orientation determination unit 105 determines whether or not the calculated side is within an arbitrary angle (e.g. 90°±20°) from the straight line connecting the coordinates of the terminal and the coordinates of the pointing target.

In the case where the determination results in Yes, the process ends. In the case where the determination results in No, the process goes to Step 123d to determine whether or not the accuracy of the position of the pointing target obtained from the position DB 124 is equal to or more than an arbitrary level (e.g. 80%). In the case where the determination results in Yes, the process ends. In the case where the determination results in No, the process goes to Step 123e in which the display orientation determination unit 105 determines whether or not the terminal is currently rotating, from information of the time-series terminal state management unit 106.

Next, in Step 123f, the display orientation determination unit 105 determines whether or not the terminal is rotating in a direction in which the calculated side is within the arbitrary angle (e.g. 90°±20°) from the straight line connecting the coordinates of the terminal and the coordinates of the pointing target.

In the case where the determination results in Yes, the process ends. In the case where the determination results in No, the process goes to Step 123g to continue the display without changing the current orientation. The process then ends.

FIG. 14 is a diagram showing an example of pointing target information stored in the position DB 124. As shown in FIG. 14, each target has absolute coordinates on a three-dimensional space or relative coordinates relative to a reference point used by the mobile device to specify the position. Each target may also have reference point accuracy information indicating accuracy of coordinates in the case where the target itself is regarded as a reference point. Each target may also have update time information in the case of updating the coordinates or the reference point accuracy information of the target.

Thus, the information display device in this embodiment can display the GUI so that the user can easily operate the mobile device even when the user holds the mobile device in various ways, in a situation where the user is aware of the target to be pointed.

Embodiment 4

A method of realizing display which is more user friendly by displaying an icon is described below. For example, an icon indicating a current posture of a mobile device is displayed to prevent a user from being confused about a relationship between a posture of a housing of the mobile device and a screen orientation of the mobile device in the case where the user changes the screen orientation of the mobile device.

Figure 18:
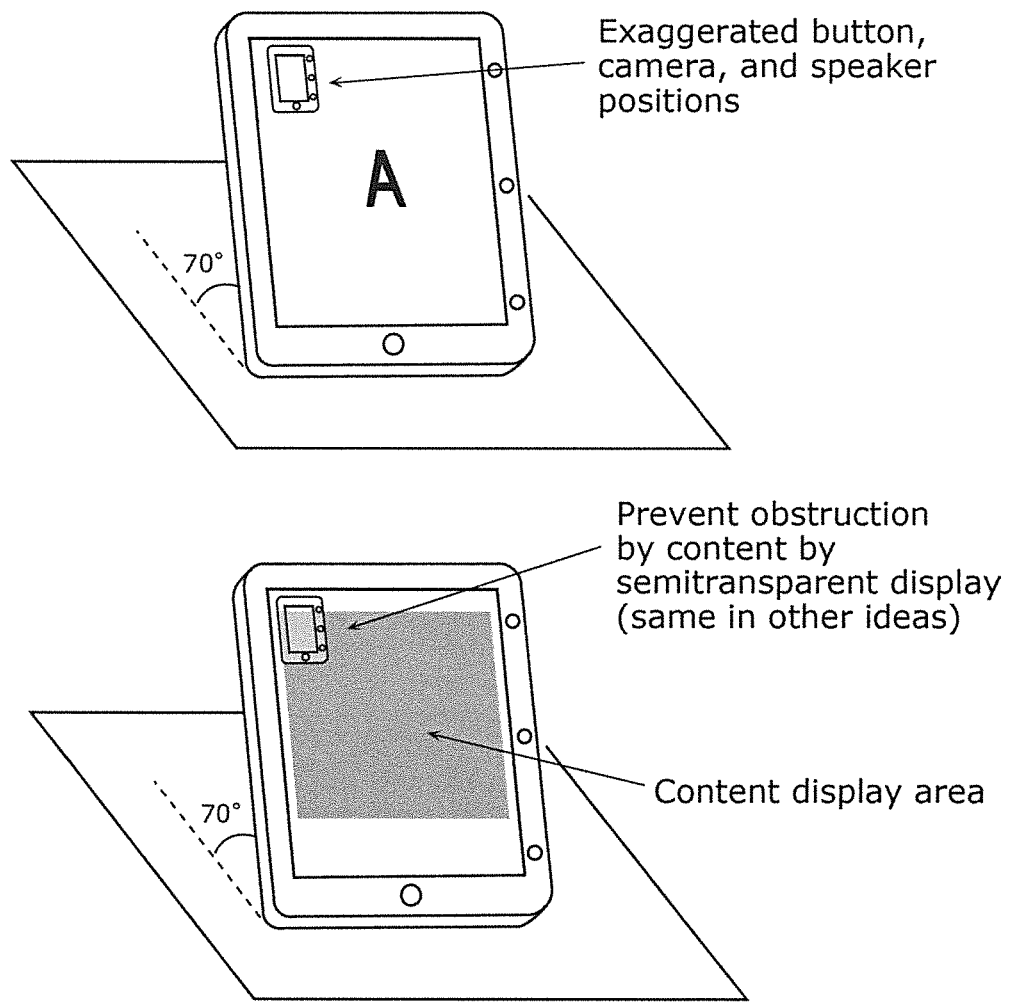
FIG. 18 is a diagram showing a method of displaying an icon indicating an orientation of an information display device itself in Embodiment 4 of the present invention.

The following describes a method of displaying an icon indicating an orientation of an information display device (mobile device) in Embodiment 4 of the present invention, with reference to drawings. FIG. 18 is a diagram showing icon variations always indicating a normal position of the terminal in the information display device (mobile device) in Embodiment 4 of the present invention. FIGS. 19 to 27 are each a diagram showing icon variations indicating the normal position in the information display device (mobile device) in Embodiment 4 of the present invention.

In FIG. 18, a top left icon on the screen of the mobile device is a reduced picture of the mobile device itself in which the button, camera, and speaker positions are exaggerated. This icon continues to be displayed always at an easily viewable position even when the screen orientation changes, to indicate the orientation of the terminal. In detail, the current position of the mobile terminal is displayed in the top left corner, regardless of whether the mobile terminal is portrait-oriented or landscape-oriented. Here, whichever orientation the housing of the mobile device is in, the orientation of the icon with respect to the housing is unchanged. That is, even when other content on the screen is changed in orientation, the icon is displayed in the same orientation as the housing.

The icon may be displayed in the bottom right corner or the bottom left corner as shown in FIG. 21. The icon may also be displayed in the top right corner. Thus, the display position of the icon on the screen is not particularly limited. Though the picture tilted at 70° from the horizontal plane is used here, this is merely an example, and the angle is not limited to such.

FIGS. 19 and 20 each show icon variations, too. FIGS. 21(A) to 27 each disclose an icon in the case where only one of left and right pictures or only one of upper and lower pictures is displayed in each of the landscape orientation and the portrait orientation. Depending on the mobile device, there is a proper position (normal position) based on, for example, a requirement that the camera is located above in the portrait position and the landscape position such as when the camera and the speaker are front-mounted, as shown in FIG. 21. In such a case, only two types of icons need to be displayed to the user, to indicate the normal position in the portrait orientation and the normal position in the landscape orientation.

FIGS. 28 to 34 are each a diagram showing an icon for calling the user's attention to the normal position in the information display device in Embodiment 4 of the present invention.

Figure 28:
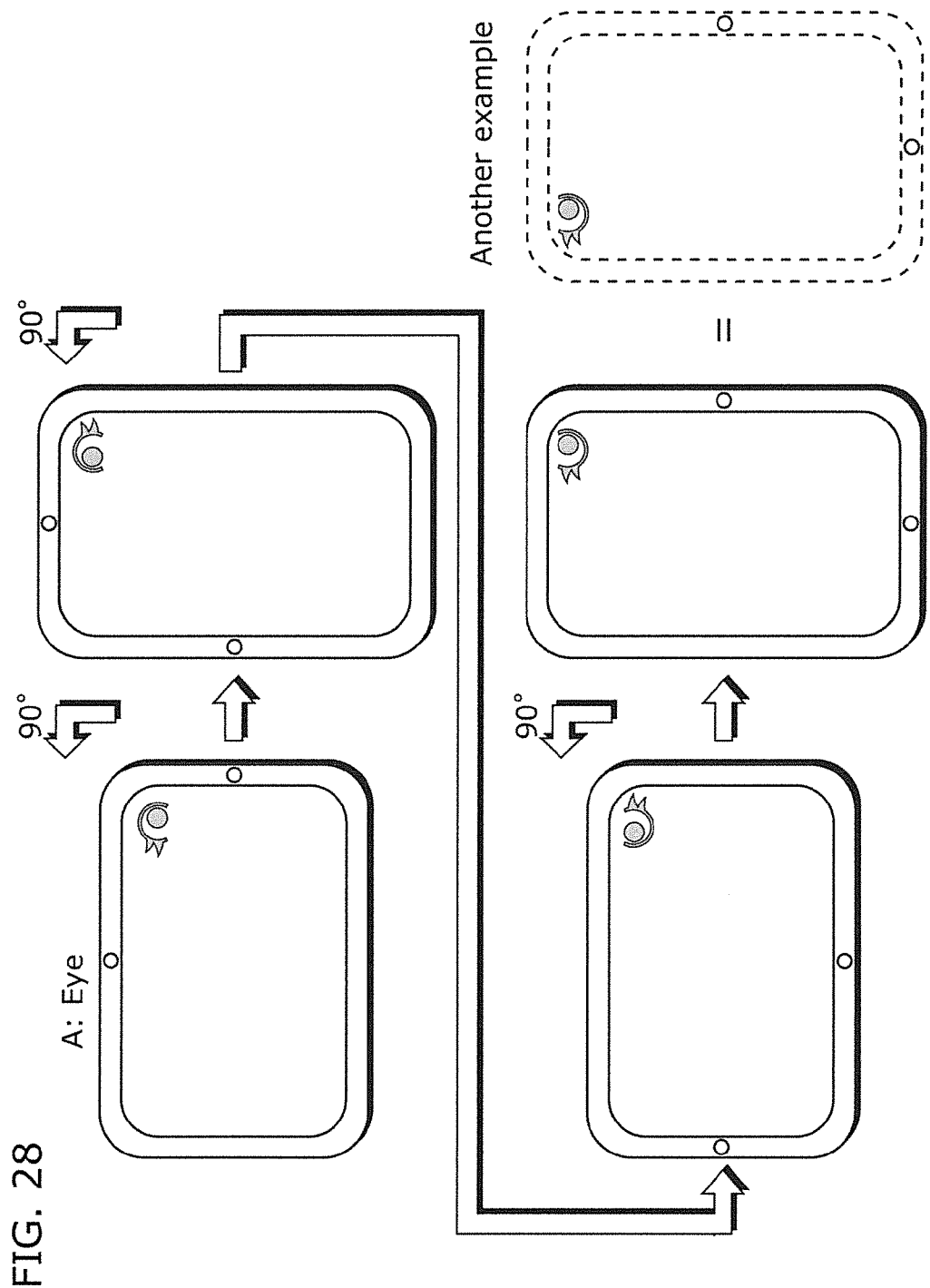
FIG. 28 is a diagram showing an icon for calling the user's attention to the normal position in the information display device in Embodiment 4 of the present invention.
Figure 29:
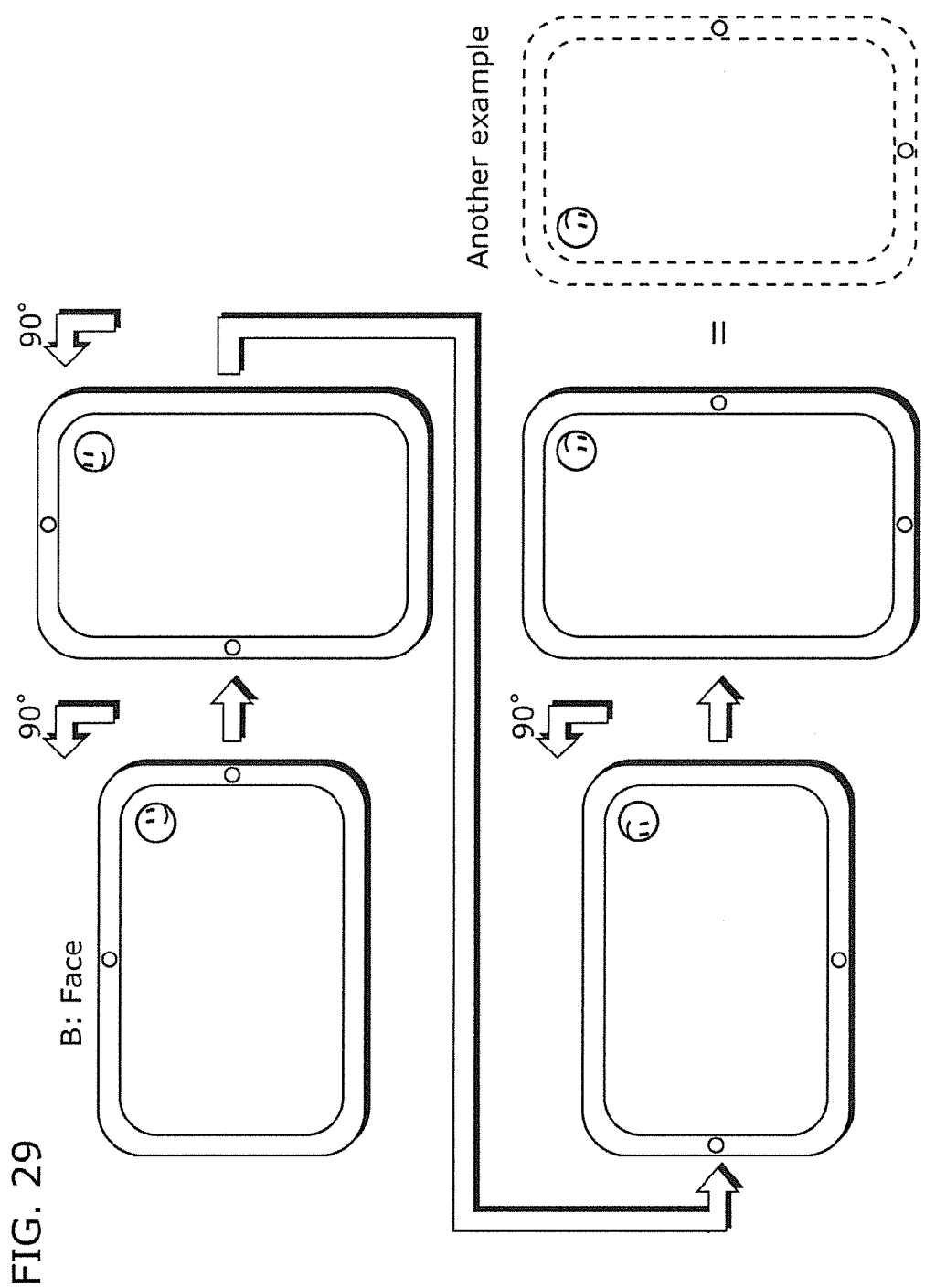
FIG. 29 is a diagram showing an icon for calling the user's attention to the normal position in the information display device in Embodiment 4 of the present invention.
Figure 30:
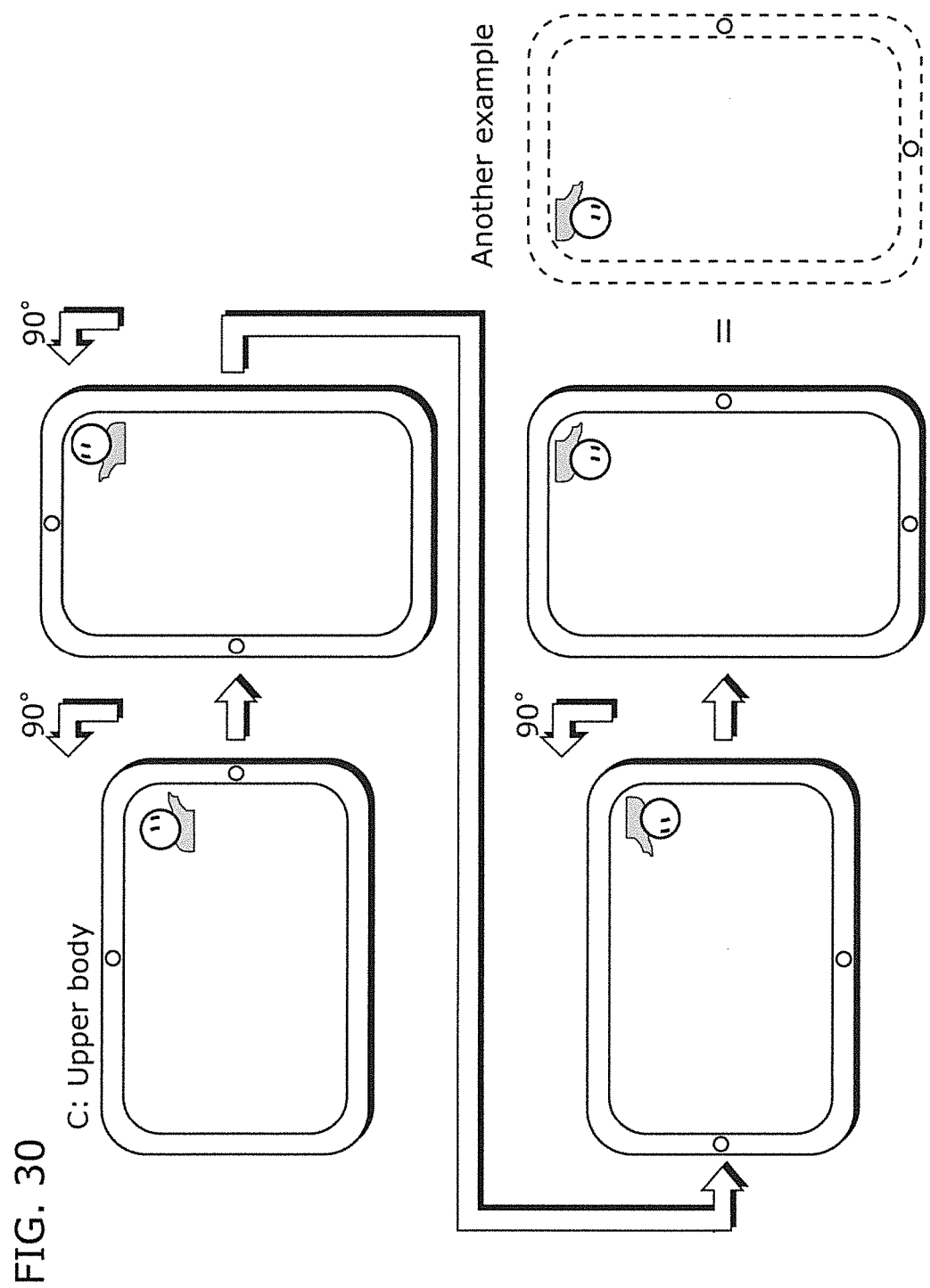
FIG. 30 is a diagram showing an icon for calling the user's attention to the normal position in the information display device in Embodiment 4 of the present invention.
Figure 31:
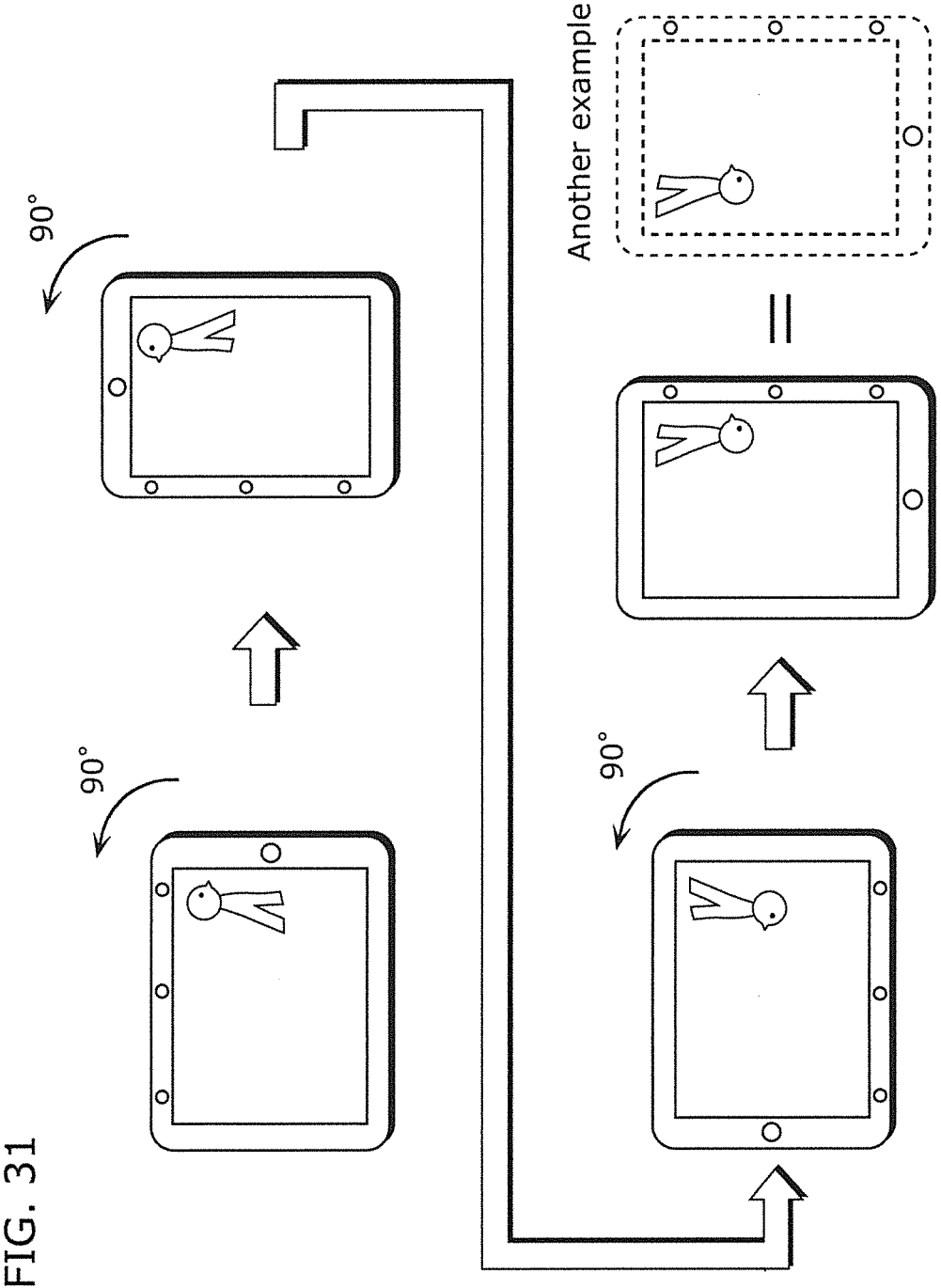
FIG. 31 is a diagram showing an icon for calling the user's attention to the normal position in the information display device in Embodiment 4 of the present invention.
Figure 32:
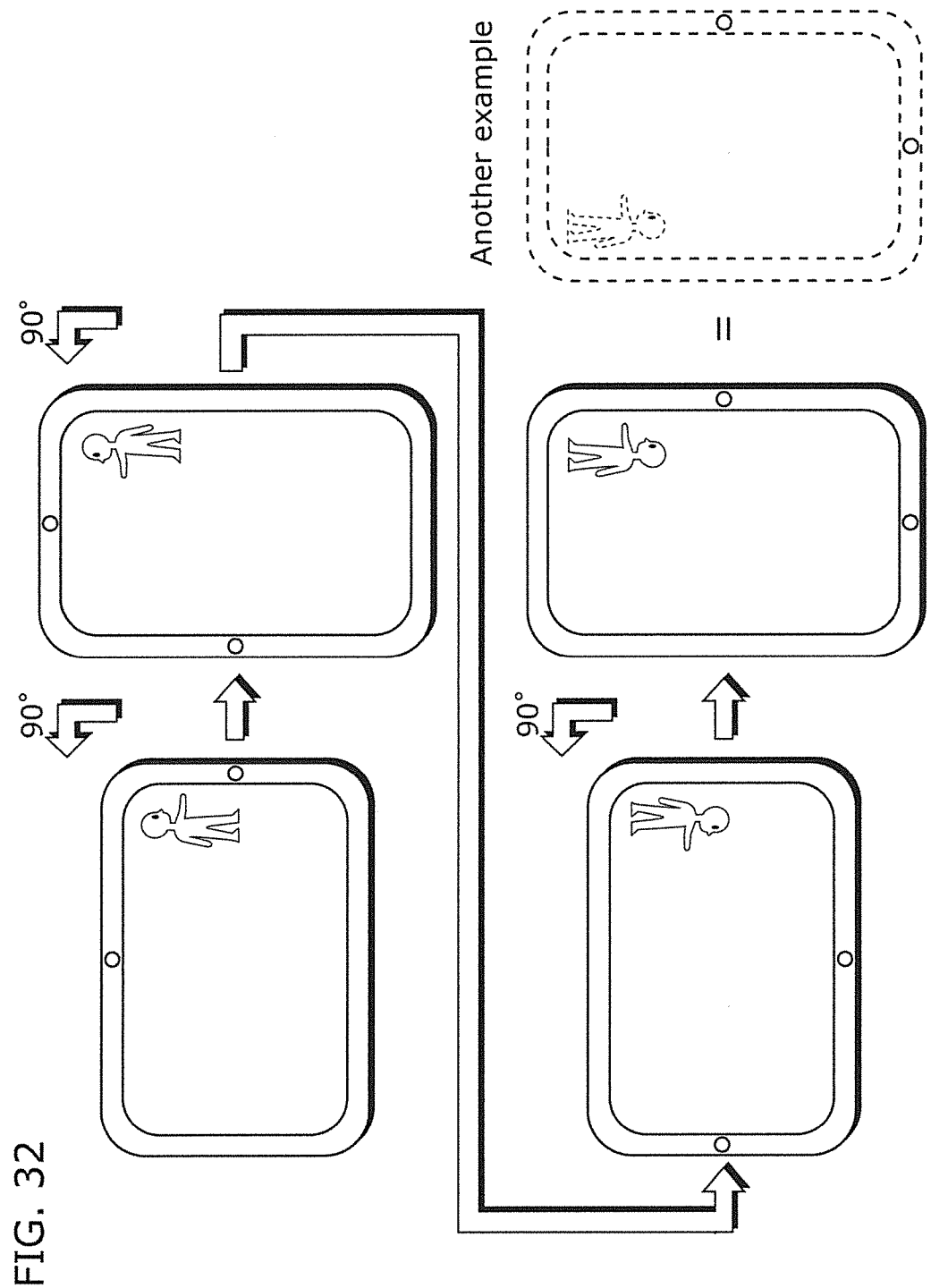
FIG. 32 is a diagram showing an icon for calling the user's attention to the normal position in the information display device in Embodiment 4 of the present invention.
Figure 33:
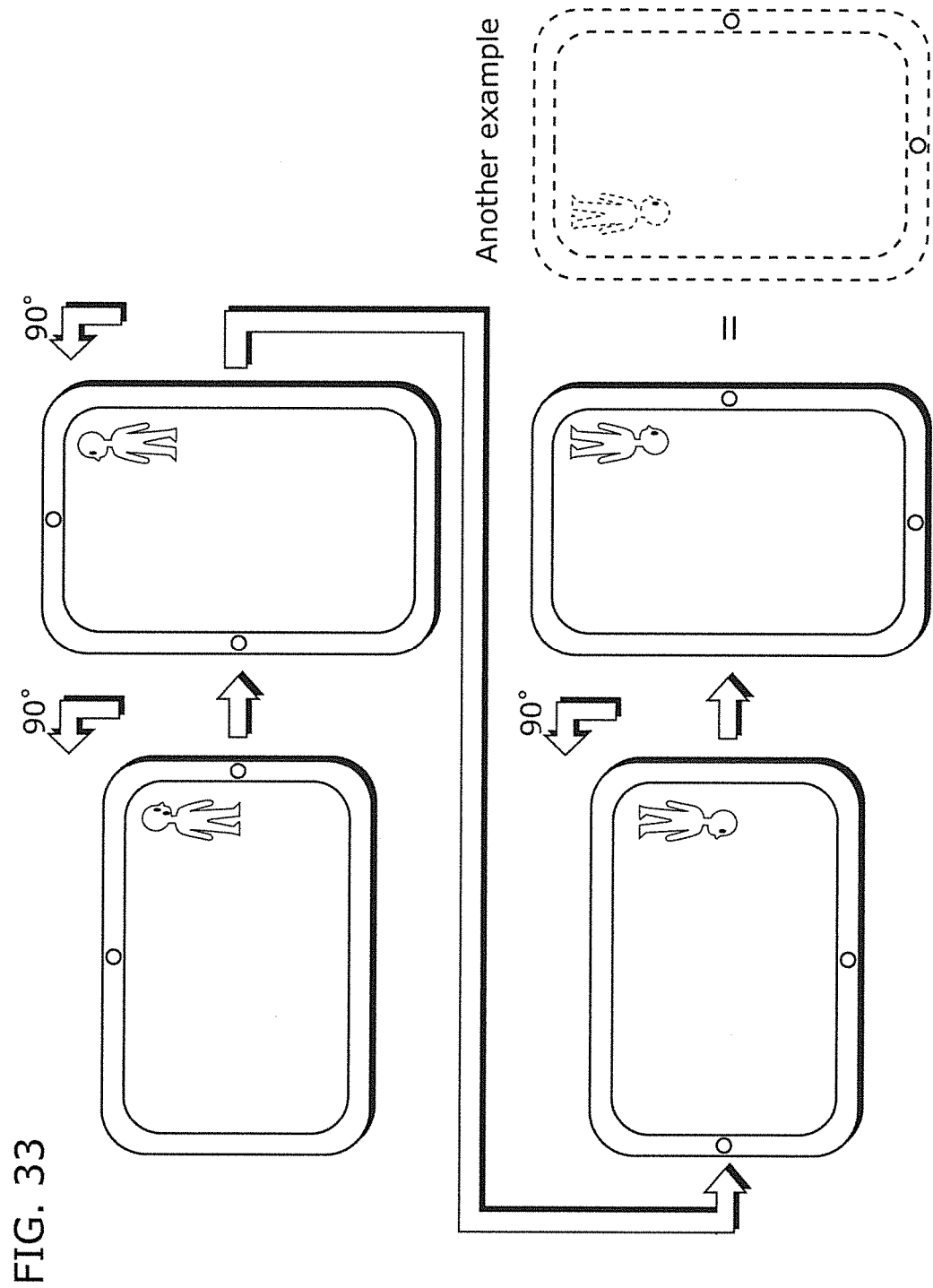
FIG. 33 is a diagram showing an icon for calling the user's attention to the normal position in the information display device in Embodiment 4 of the present invention.
Figure 34:
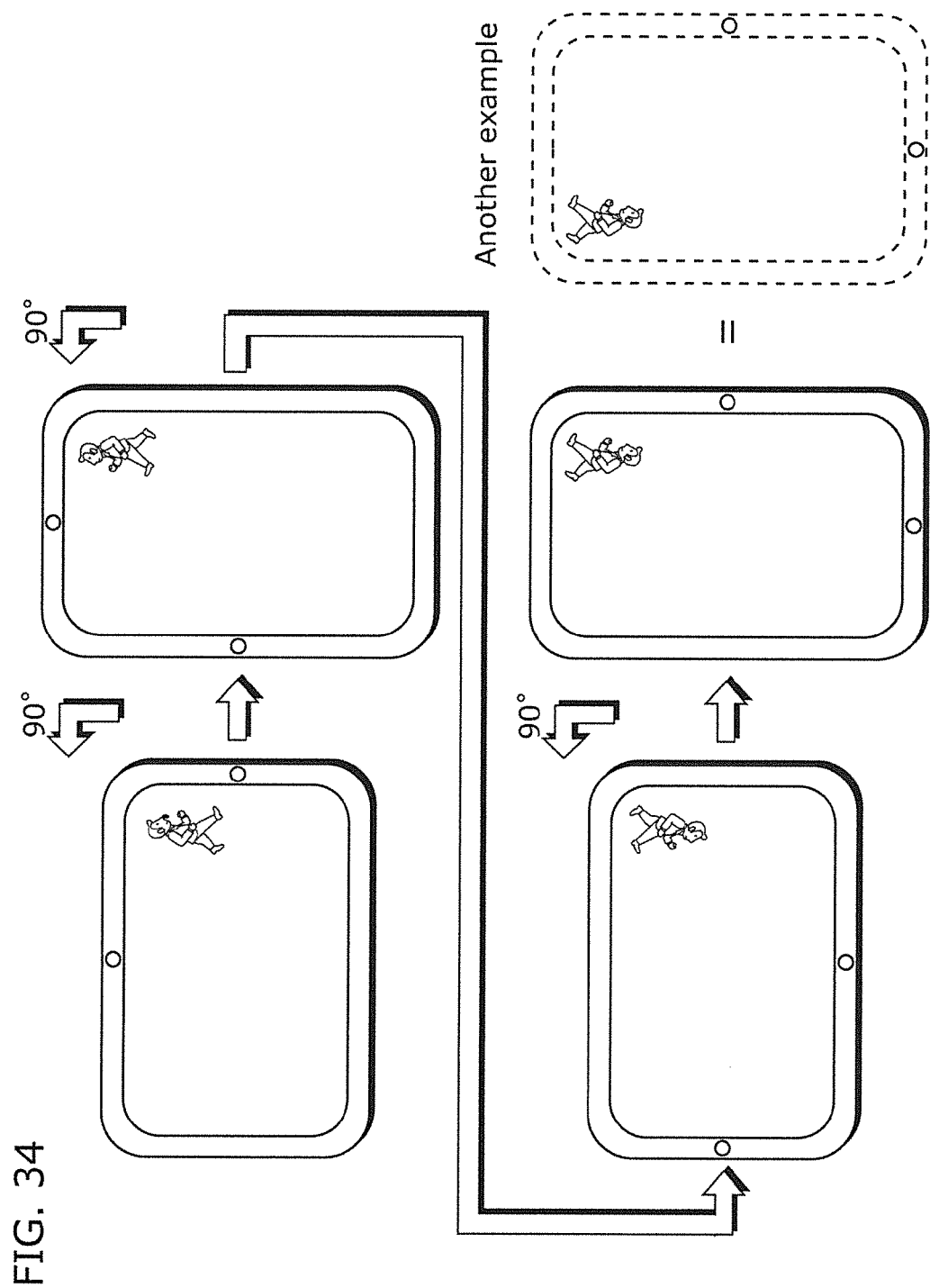
FIG. 34 is a diagram showing an icon for calling the user's attention to the normal position in the information display device in Embodiment 4 of the present invention.

For example, as shown in FIG. 28, the top direction of the icon corresponds to the direction of the normal position in the portrait orientation. When the posture of the mobile device is opposite to the normal position in the portrait orientation, the icon is upside down, which the user finds strange. This can prompt the user to set the mobile device in the normal position. FIGS. 29 to 34 each disclose an icon for calling the user's attention to the normal position, too. Another example shown in each drawing relates to an icon displayed in the top left corner.

Moreover, by using a left-right asymmetrical icon to assume directionality, it is possible to suggest to the user in which direction the terminal is to be rotated to attain the normal position from the current position. For example, as shown in FIG. 28, the icon of the eye looking to the right indicates that the terminal can be in the normal position by setting the right side of the terminal at the top. In each of FIGS. 29 to 34, too, the orientation of the face, the finger, or the body of the icon indicates the direction of the normal position.

FIG. 26 shows an icon that appears as different pictures in the portrait orientation and the landscape orientation. An icon appearing to be a bird in the landscape orientation appears to be a rabbit in the portrait orientation. Likewise, an icon appearing to be a penguin in the landscape orientation appears to be a sunfish in the portrait orientation. This allows the user to feel that the housing is not properly oriented when the picture appears to be strange.

Thus, the display of such an icon that prompts the user to correct the orientation is possible. Here, a module for displaying an icon recognizes the top direction of the screen beforehand and displays the icon according to the landscape orientation or the portrait orientation with respect to the top of the GUI.

Embodiment 5

Figure 35:
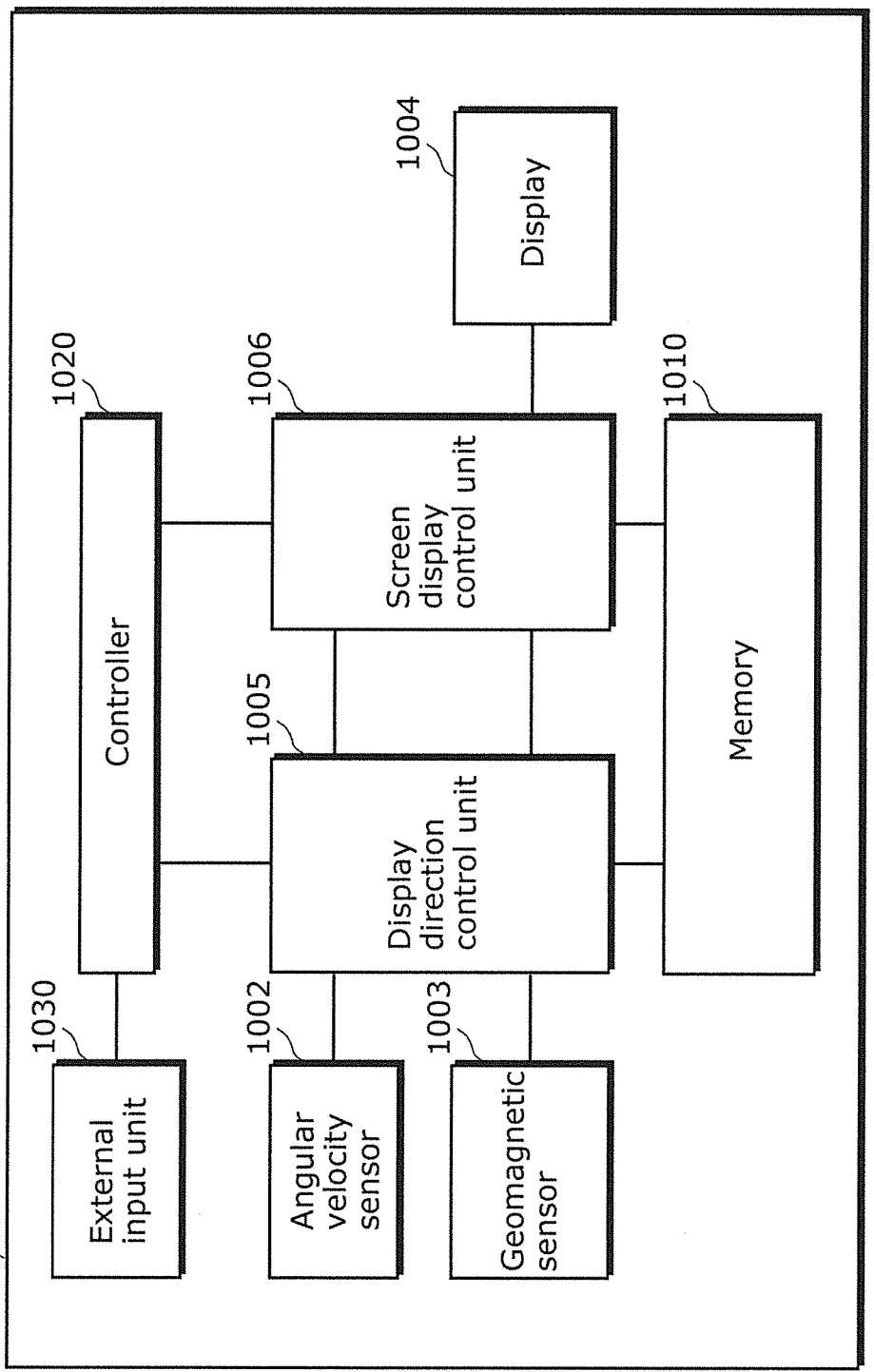
FIG. 35 is a diagram showing a structure of a mobile terminal which is one aspect of an information display device in Embodiment 5 of the present invention.

This embodiment describes an electrical structure of a mobile terminal such as a digital camera as one aspect of an information display device, with reference to FIG. 35. FIG. 35 is a diagram showing a structure of a mobile terminal which is one aspect of an information display device in Embodiment 5 of the present invention.

[1-1. Overview]

A mobile terminal 5000 in this embodiment is a multifunctional mobile terminal that includes an external input unit such as a touch panel and a display and is capable of internet browsing, video viewing, listening to music, TV and other household product operation, and the like. The mobile terminal 5000 in this embodiment is assumed to be rotated in portrait or landscape orientation, for its intended use. By rotating a screen in a direction of a user and displaying the screen, the screen can always be displayed in an easy-to-view direction in whichever way the user rotates the mobile terminal 500.

[1-2. Structure]

[1-2-1. Electrical Structure]

The mobile terminal 5000 shown in FIG. 35 includes an angular velocity sensor 1002 and a geomagnetic sensor 1003. Through the use of the inputs of these sensors, a display direction control unit 1005 detects from which direction the user currently holds the mobile terminal 5000, and determines a display direction. The display direction control unit 1005 notifies the determined display direction to a screen display control unit 1006. The screen display control unit 1006 generates information to be actually outputted to a display 1004 in the mobile terminal 5000 based on the information from the display direction control unit 1005, and provides the information to the display 1004. The display 1004 displays the received information on a display screen. The following describes the structure of the mobile terminal 5000 in detail.

An external input unit 1030 is made up of a touch panel, a hardware key, and the like. The external input unit 1030 receives user operations, thereby receiving various inputs for operating the mobile terminal 5000. In the case where the display 1004 is equipped with a touch panel to receive external operations, the display 1004 may also be used as the external input unit 1030.

A controller 1020 is a control means for controlling the entire mobile terminal 5000. The controller 1020 can be implemented by a semiconductor device and the like. The controller 1020 may be made up of hardware only, or made up of a combination of hardware and software. The controller 1020 may be implemented by a microcomputer and the like. The controller 1020 is capable of controlling a screen display direction for high user friendliness based on a direction or a vertical tilt of the mobile terminal 5000 detected by the angular velocity sensor 1002, the geomagnetic sensor 1003, and the like, and displaying the screen (described in detail later).

The angular velocity sensor 1002 is a sensor for detecting an angular velocity of the mobile terminal 5000, and is capable of detecting angular velocities in directions of a plurality of axes.

The geomagnetic sensor 1003 is a sensor for detecting direction information of the mobile terminal 5000 in the horizontal direction, and is capable of obtaining the direction information.

The display direction control unit 1005 controls the display direction of the mobile terminal 5000 based on the information from the angular velocity sensor 1002 and the geomagnetic sensor 1003. For example, in the case of detecting that the mobile terminal 5000 is rotated 90° clockwise in the horizontal direction, it can be assumed that the user rotates the mobile terminal 5000 from the long side direction to the short side direction. The display direction control unit 1005 can accordingly exercise such control that instructs to rotate the display screen 90° counterclockwise. At which timing and to what extent the rotation is performed will be described later.

The screen display control unit 1006 actually generates a UI screen to be provided to the display 1004, based on the information from the display direction control unit 1005. The screen display control unit 1006 may be implemented by software, or implemented by a hybrid of hardware and software where, for example, a high-load process is implemented by hardware.

The display 1004 is capable of displaying the UI screen received from the screen display control unit 1006. The display 1004 is capable of displaying information read from a memory 1010. The display 1004 is also capable of displaying various menu screens for various settings of the mobile terminal 5000 and the like.

The memory 1010 is made up of a flash memory, a ferroelectric memory, and the like. The memory 1010 stores a control program for controlling the entire mobile terminal 5000, button and icon information for generating typical menu screens, video and music information, text information, information such as threshold information for changing the display direction of the mobile terminal 5000, and so on. In this embodiment, the memory 1010 particularly stores an initial display direction which is information for determining whether or not to switch the display direction, horizontal rotation threshold information, vertical rotation threshold information, display menu information to be switched, and library information for rotating a current menu screen.

[1-2-2. Correspondence of Terms]

The angular velocity sensor 1002 is an example of an information obtainment unit that detects a posture of the mobile terminal 5000. The geomagnetic sensor 1003 is an example of a unit that detects a horizontal orientation, i.e. direction information, and a horizontal rotation of the mobile terminal 5000.

The controller 1020 is an example of an information obtainment unit, a rotation determination unit, a rotation detection unit, and a control unit. The internal memory 1010 is an example of a storage unit. The display 1004 is an example of a display unit.

[1-3-1. Use Case]

An example of a use case assumed in this embodiment is described below, with reference to FIGS. 36 and 37.

Figure 36:
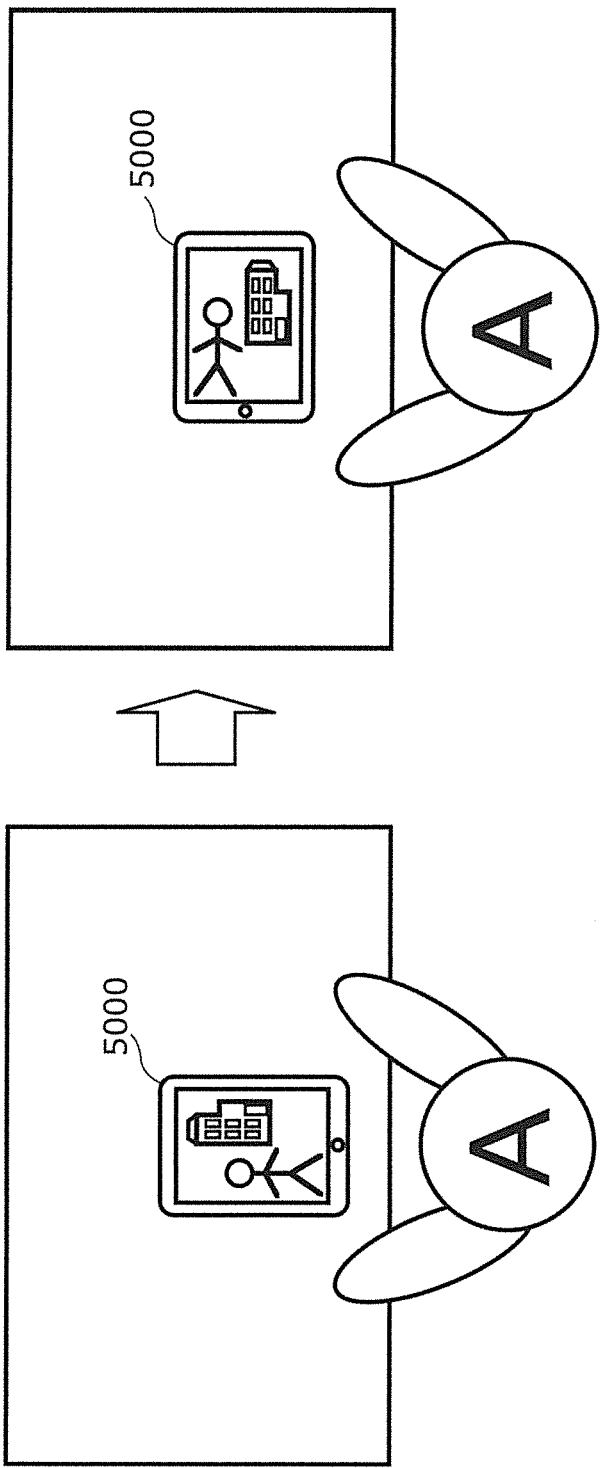
FIG. 36 is a diagram showing a use case example in Embodiment 5 of the present invention.

As shown in FIG. 36, suppose a user A is operating the mobile terminal 5000 with its short side facing the user A (referred to as portrait holding in this embodiment). Even in the case where it is preferable that the long side faces the user A (referred to as landscape holding in this embodiment) such as when the user A views video, the screen does not rotate as shown in the right part of FIG. 36. Accordingly, when the user A switches from the portrait holding to the landscape holding, an operation of rotating the screen needs to be performed separately.

Figure 37:
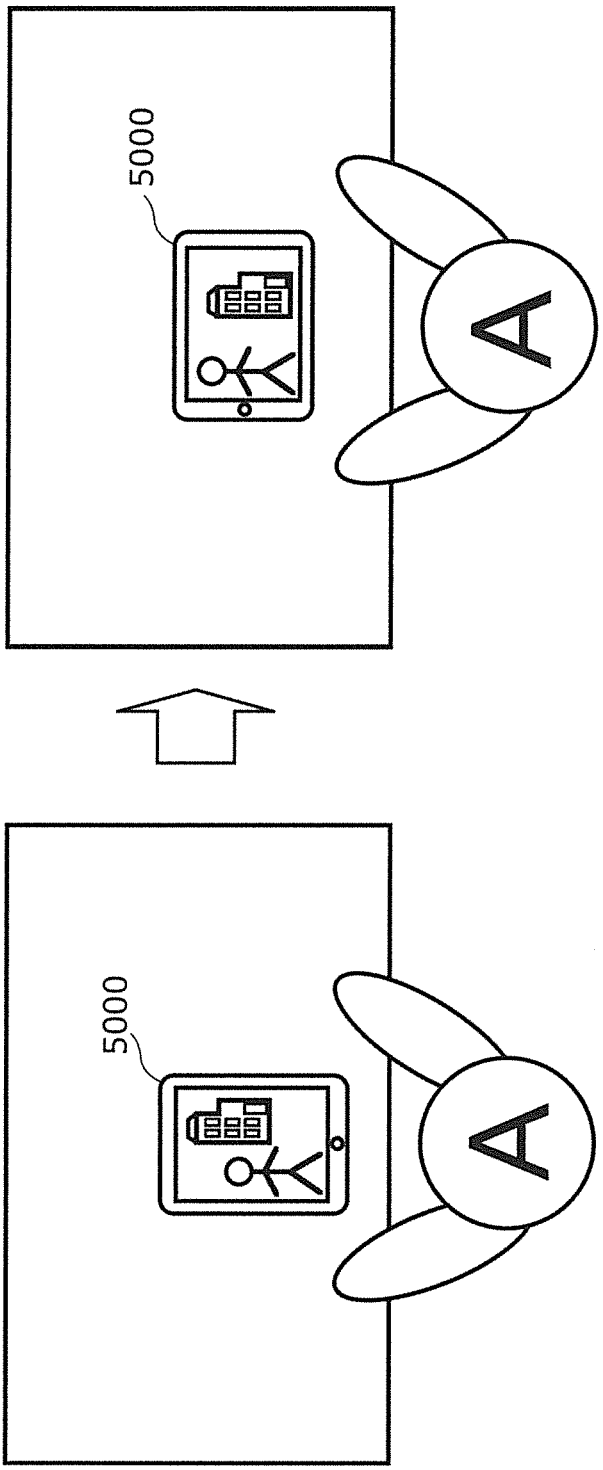
FIG. 37 is a diagram showing a use case example in Embodiment 5 of the present invention.

In this embodiment, however, in the case where the user A switches from the portrait holding as shown in the left part of FIG. 37 to the landscape holding as shown in the right part of FIG. 37, the screen is automatically rotated in the direction easily viewable by the user A.

[1-3-2. Display Screen Rotation Control (Overall)]

To describe a series of operations of the mobile terminal 5000 in this embodiment, the use case is separated between a normal case and a special case for convenience' sake.

Figure 38:
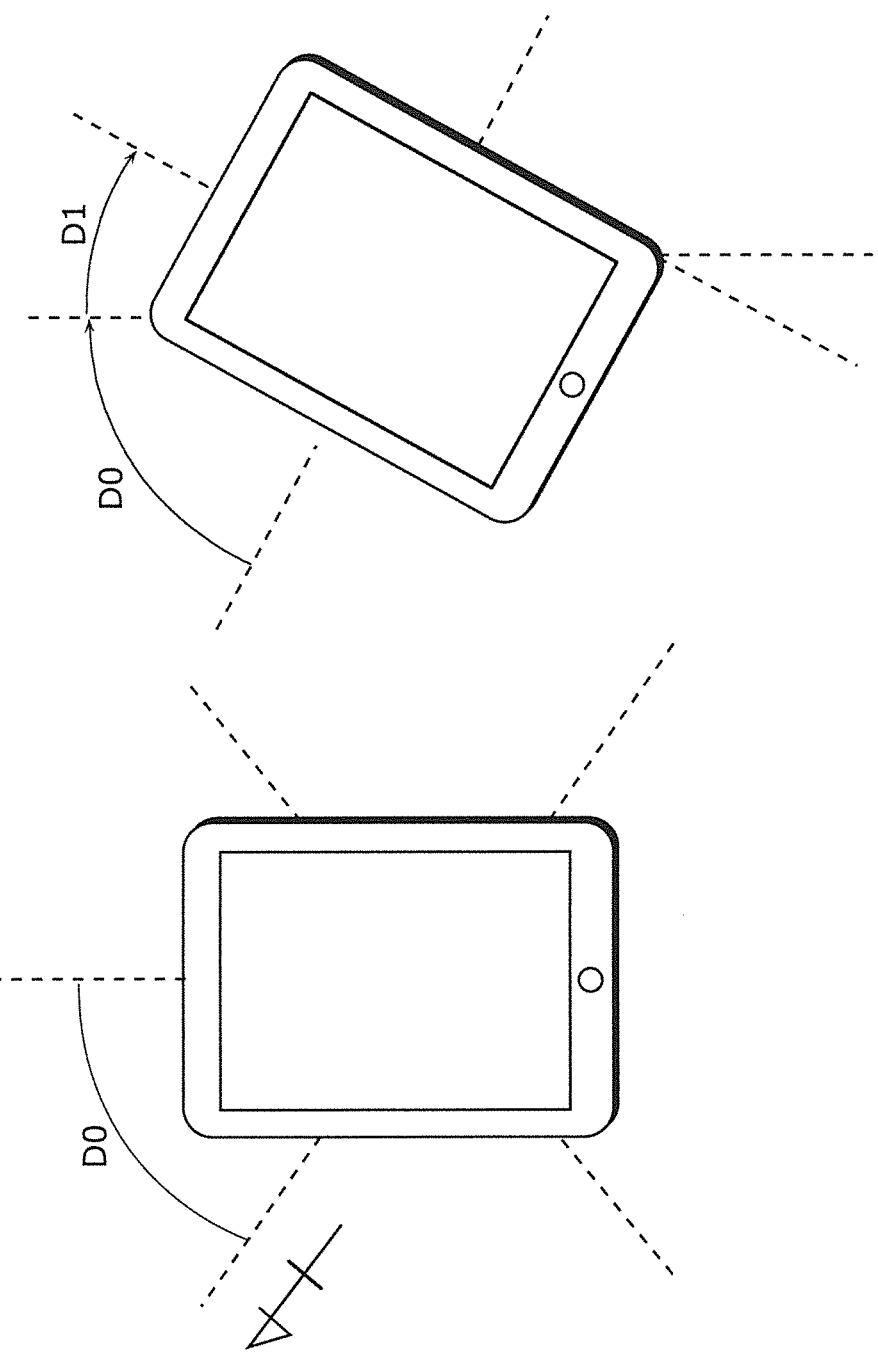
FIG. 38 is a diagram showing definitions of variables relating to horizontal and vertical postures of a mobile terminal, which are used in description of Embodiment 5 of the present invention.
Figure 39:
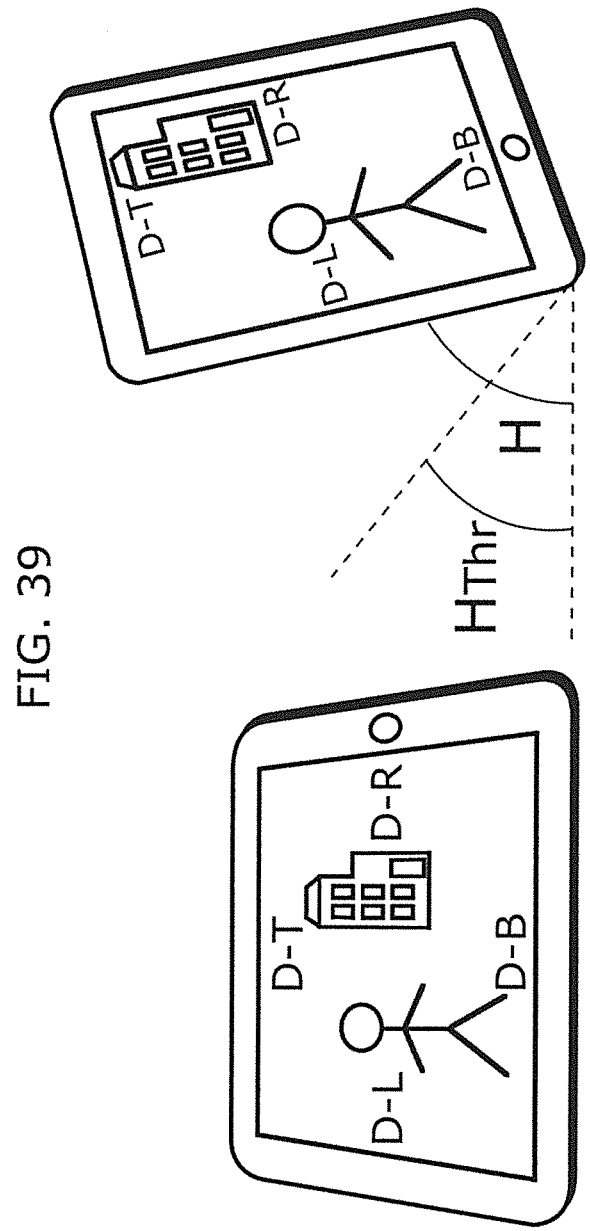
FIG. 39 is a diagram showing definitions of variables relating to horizontal and vertical postures of a mobile terminal, which are used in description of Embodiment 5 of the present invention.

FIGS. 38 and 39 are each a diagram showing definitions of variables relating to horizontal and vertical postures of the mobile terminal 5000, which are used in the description of this embodiment.

Variables relating to a horizontal direction of the mobile terminal 5000 are defined with reference to FIG. 38. A direction of the mobile terminal 5000 in an initial state of the mobile terminal 5000 is defined as D0. A current direction of the mobile terminal 5000 as a result of horizontal rotation is defined as D1.

Though this embodiment describes the direction information using D0 and D1, any information for detecting the horizontal rotation of the mobile terminal 5000 may be used as D0 and D1. For example, a relative direction of the mobile terminal 5000 may be detected by accumulating horizontal acceleration using a gyroscope.

Next, variables relating to a vertical tilt of the mobile terminal 5000 are defined with reference to FIG. 39. Suppose a tilt when the mobile terminal 5000 is oriented horizontally is 0°, and a tilt when the mobile terminal 5000 is erected vertically is 90°. A current tilt of the mobile terminal 5000 is defined as H. HThr is a vertical tilt threshold for display rotation described later.

Figure 40:
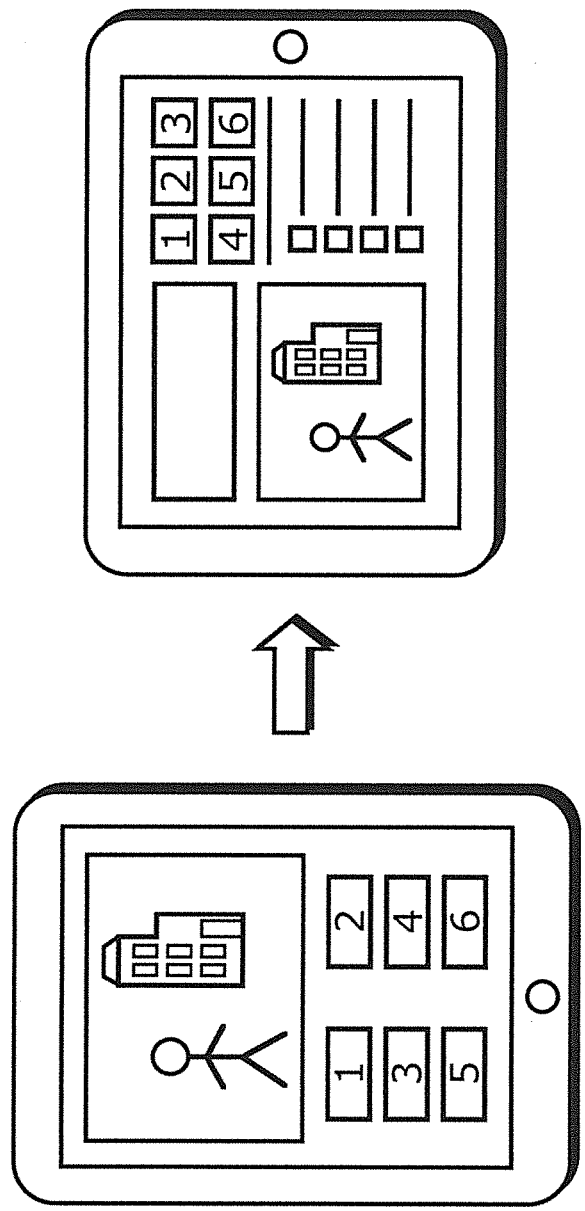
FIG. 40 is a diagram showing an example of a menu screen in the case of operating a mobile terminal in Embodiment 5 of the present invention as a TV remote control.
Figure 45:
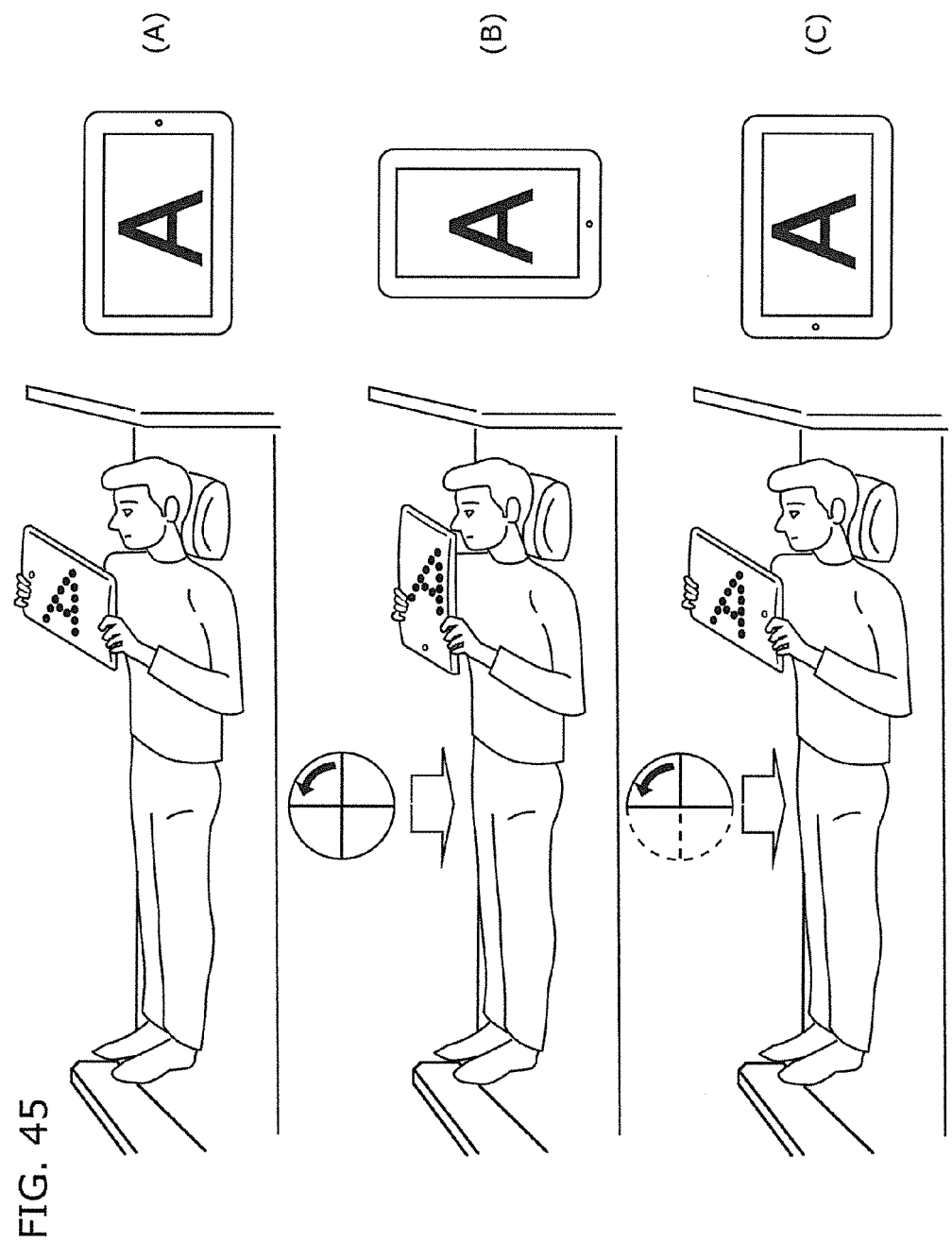
FIG. 45 is a diagram showing a use case example of another operation of the mobile terminal in Embodiment 5 of the present invention.
Figure 46:
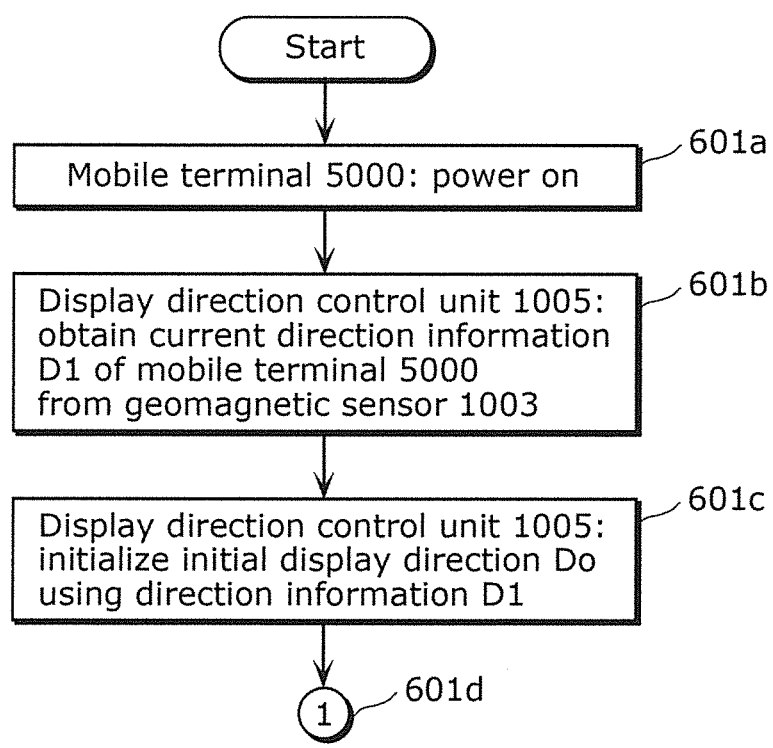
FIG. 46 is a diagram showing control flow of the mobile terminal in Embodiment 5 of the present invention.

FIG. 40 is a diagram showing an example of a menu screen in the case where the mobile terminal 5000 is operated as a TV remote control. Portrait display of the mobile terminal 5000 is shown in the left part of FIG. 40, whereas landscape display of the mobile terminal 5000 is shown in the right part of FIG. 40. In the case of the portrait display, channel buttons are displayed in a larger size. In the case of the landscape display, accompanying information about programs and the like are displayed, too. Changing the display contents between the portrait display and the landscape display in this manner allows the user to easily access desired information. FIGS. 41 to 44 are each a diagram showing an example of a use case where the mobile terminal 5000 is operated as a TV remote control. FIG. 45 is a diagram showing an example of a use case of another operation of the mobile terminal 5000.

The following describes control flow of the mobile terminal 5000 in this embodiment, with reference to FIGS. 46 to 51. FIGS. 46 to 51 are each a diagram showing control flow of the mobile terminal 5000 in Embodiment 5 of the present invention.

First, in Step 601a, the mobile terminal 5000 is powered on.

Next, in Step 601b, the display direction control unit 1005 obtains the current direction information D1 of the mobile terminal 5000 from the geomagnetic sensor 1003.

Next, in Step 601c, the display direction control unit 1005 initializes the initial display direction Do using the direction information D1.

Next, in Step 601e, the display direction control unit 1005 detects whether or not horizontal rotation is permitted. In the case where the determination results in No, the process goes to Step 601h. In the case where the determination results in Yes, the process goes to Step 601f.

Figure 41:
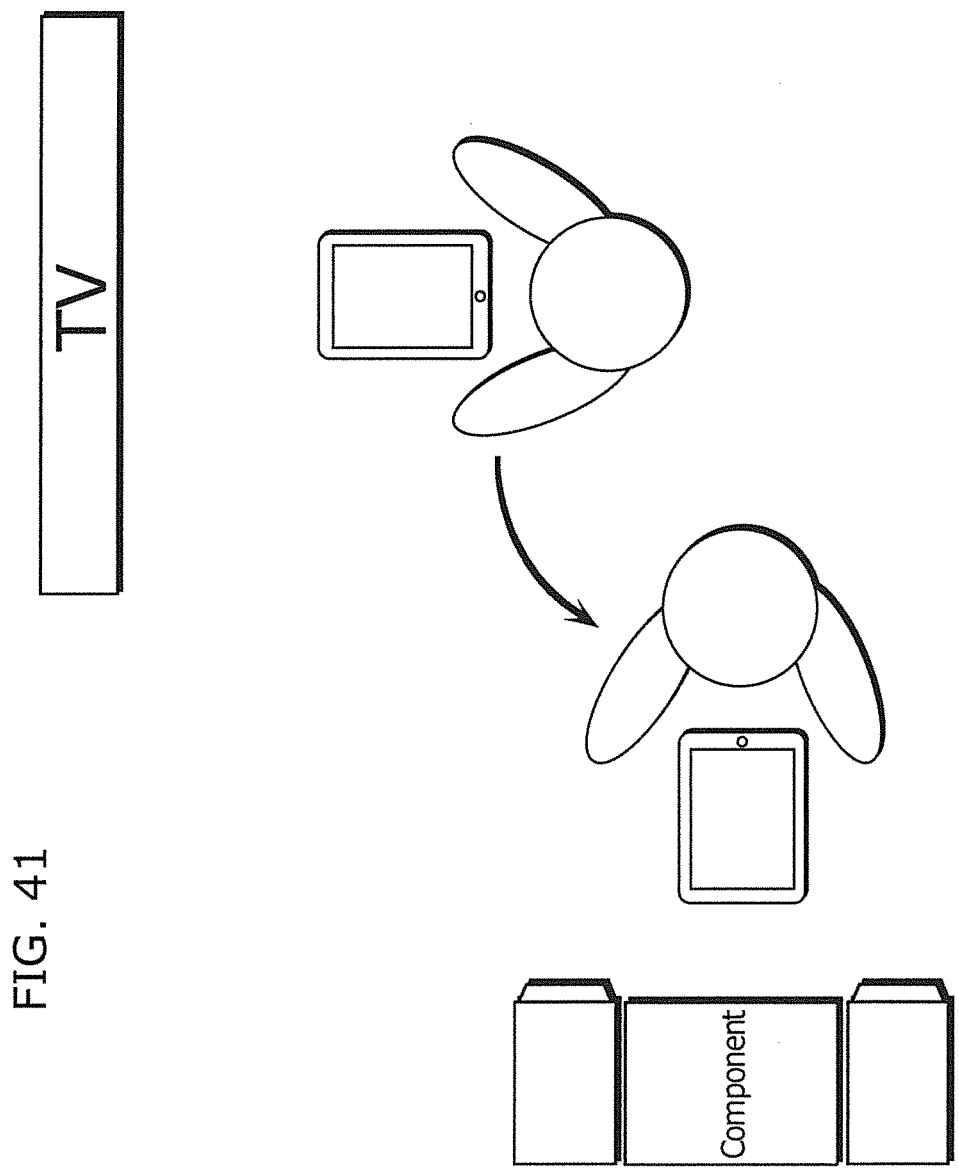
FIG. 41 is a diagram showing a use case example in the case of operating the mobile terminal in Embodiment 5 of the present invention as a TV remote control.

Regarding whether or not horizontal rotation is permitted, the status of whether or not to permit rotation for the mobile terminal 5000 can be set by a user operation. In the case where the mobile terminal 5000 is operated as a remote control as shown in FIG. 41, there is an instance where the display is not rotated even when the rotation of the mobile terminal 5000 is detected. Accordingly, any unintended screen rotation can be prevented by providing the function of permitting or not permitting horizontal display rotation.

Next, in Step 601f, the display direction control unit 1005 obtains the current initial direction information D0 of the mobile terminal 5000 and the horizontal rotation threshold DThr from the memory 1010.

Next, in Step 601g, the display direction control unit 1005 obtains the current direction information D1 of the mobile terminal 5000 from the geomagnetic sensor 1003.

Next, in Step 601h, the display direction control unit 1005 determines whether or not the detected direction information D1 changes from the initial direction information D0 by DThr or more. In the case where the determination results in No, the process goes to Step 601d. In the case where the determination results in Yes, the process goes to Step 601j.

Next, in Step 601j, the display direction control unit 1005 records a rotation detection start time for the first time only.

Next, in Step 601k, the display direction control unit 1005 detects whether or not a predetermined time period has elapsed from the rotation detection time.

In the case where the determination results in No, the process goes to Step 601m to wait for a fixed time period, and then goes to Step 601g. In the case where the determination results in Yes, the process goes to Step 601n.

The reason for providing the fixed time period for detecting the amount of rotation in Steps 601j to 601n is to enable smooth rotation of the mobile terminal 5000 in the case where the user rotates the mobile terminal 5000 by at least twice the rotation threshold such as when rotating the mobile terminal 5000 180°. This is also intended to prevent a situation where, for example when the mobile terminal 5000 is rotated once by at least the rotation threshold and then immediately rotated in the opposite direction, opposite rotation continuously occurs and causes the user to experience flickering vision.

Next, in Step 601n, the display direction control unit 1005 detects whether the display plane of the mobile terminal 5000 faces upward or downward in the vertical direction.

Next, in Step 601o, the display direction control unit 1005 notifies the screen display control unit 1006 of an instruction to rotate the screen so that the D0 direction corresponds to the top of the display screen.

Steps 601n and 601o are performed because, for example in the case where the user lying on his/her back operates the mobile terminal 5000 as shown in FIG. 45, the direction in which the screen is rotated for correction when the mobile terminal 5000 is set in the D1 direction is different between when the display 1004 of the mobile terminal 5000 faces downward in the vertical direction and when the display 1004 of the mobile terminal 5000 faces upward in the vertical direction.

Next, in Step 601p, the display direction control unit 1005 performs a screen rotation flicker and threshold control process.

Next, in Step 601r, the screen display control unit 1006 determines whether or not new screen generation is possible. In the case where the determination results in No, the process goes to Step 601s to wait for a fixed time period, and then goes to Step 601q. In the case where the determination results in Yes, the process goes to Step 601t.

This step corresponds to a process of, for example in the case where software in a user interface layer of the mobile terminal 5000 is engaged in another process (e.g. screen scroll) of higher priority, waiting for the higher-priority process to complete.

Next, in Step 601t, the screen display control unit 1006 determines whether or not to newly generate a rotation target screen.

In the case where the determination results in No, the process goes to Step 601x to rotate the previous display screen and render the screen on the display 1004. In the case where the determination results in Yes, the process goes to Step 601u.

The reason for newly generating the rotation target screen in Step 601*t* is as follows.

The mobile terminal 5000 is assumed to be put to various uses such as a video player and a TV remote control, as mentioned earlier. Accordingly, depending on the function used by the mobile terminal 5000, there are an instance (e.g. video player) where it is preferable to simply rotate the display direction and an instance (e.g. remote control) where it is preferable to change the display contents between the portrait display and the landscape display. Step 601*t* is intended to further improve user friendliness when the user rotates the mobile terminal 5000.

Next, in Step 601*u*, the screen display control unit 1006 generates a new screen.

Next, in Step 601*v*, the display 1004 renders the generated new screen.

Next, in Step 602*a*, the display direction control unit 1005 obtains current elevation angle information H1 of the mobile terminal 5000 from the angular velocity sensor 1002.

Next, in Step 602*b*, the display direction control unit 1005 determines whether or not the absolute value of the detected elevation angle information H1 is more than a vertical rotation threshold HThr2.

In the case where the determination results in No, the process goes to Step 601*w*. In the case where the determination results in Yes, the process goes to Step 602*c*.

Next, in Step 602*c*, the display direction control unit 1005 notifies the screen display control unit 1006 of an instruction to rotate the screen so that a higher side of the screen corresponds to the top of the display screen.

Next, in Step 602*d*, the screen display control unit 1006 determines whether or not to newly generate a rotation target screen.

In the case where the determination results in No, the process goes to Step 602*g* to rotate the previous display screen and render the screen on the display 1004. In the case where the determination results in Yes, the process goes to Step 602*e*.

Next, in Step 602*e*, the screen display control unit 1006 generates a new screen.

Next, in Step 602*f*, the display 1004 renders the generated new screen.

Next, in Step 602*j*, the display direction control unit 1005 obtains the current elevation angle information H1 of the mobile terminal 5000 from the angular velocity sensor 1002.

Next, in Step 602*k*, the display direction control unit 1005 determines whether or not the absolute value of the detected elevation angle information H1 is less than a vertical rotation threshold HThr1.

In the case where the determination results in No, the process goes to Step 602*h*. In the case where the determination results in Yes, the process goes to Step 602*m*.

Next, in Step 602*k*, the display direction control unit 1005 sets the current direction D1 as D0.

In Steps 602*j* to 602*m*, the current direction of the mobile terminal 5000 when the user returns the mobile terminal 5000 in the horizontal direction after tilting it in the vertical direction is set as the initial direction D0, thus enabling the rotation direction to be reset or corrected.

Figure 51:
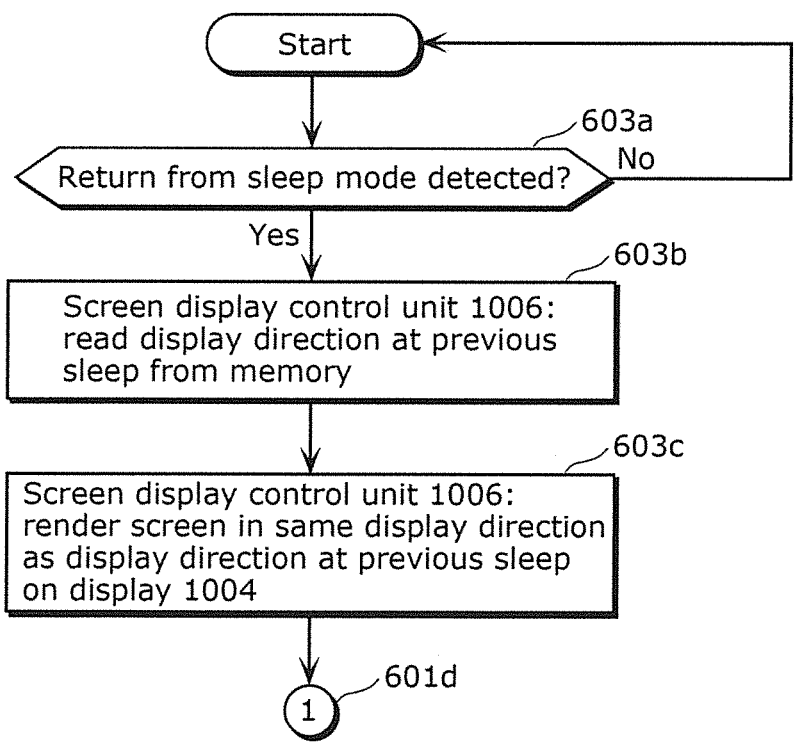
FIG. 51 is a diagram showing control flow of the mobile terminal in Embodiment 5 of the present invention.
Figure 52:
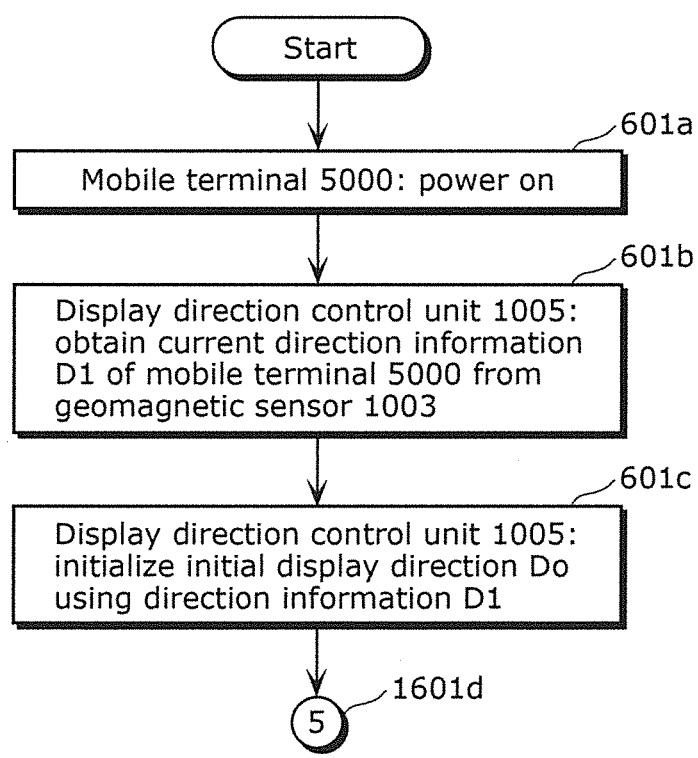
FIG. 52 is a diagram showing another control flow of the mobile terminal in Embodiment 5 of the present invention.
Figure 53:
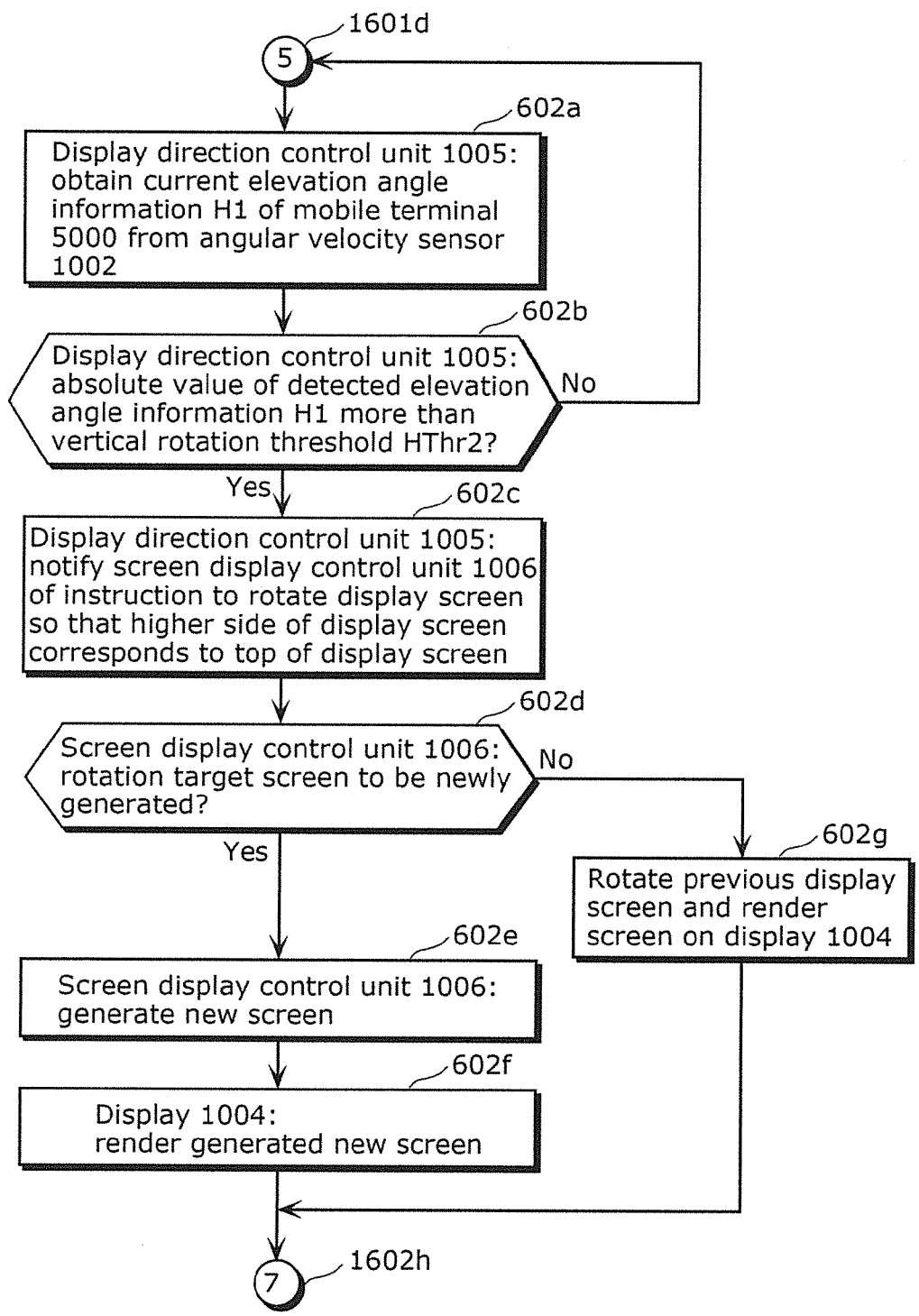
FIG. 53 is a diagram showing another control flow of the mobile terminal in Embodiment 5 of the present invention.
Figure 54:
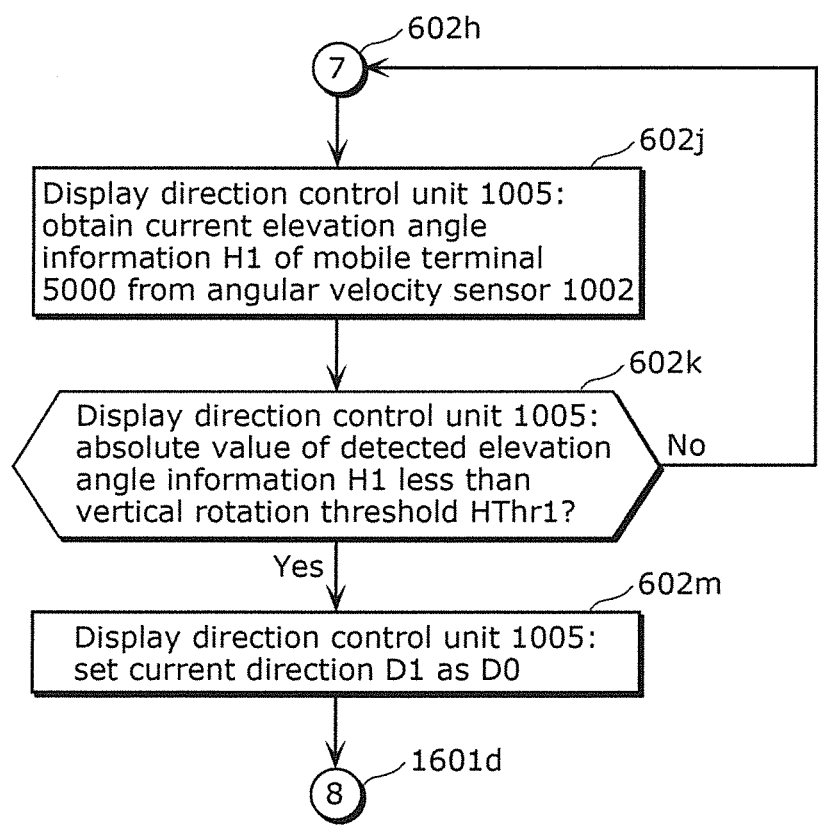
FIG. 54 is a diagram showing another control flow of the mobile terminal in Embodiment 5 of the present invention.
Figure 55:
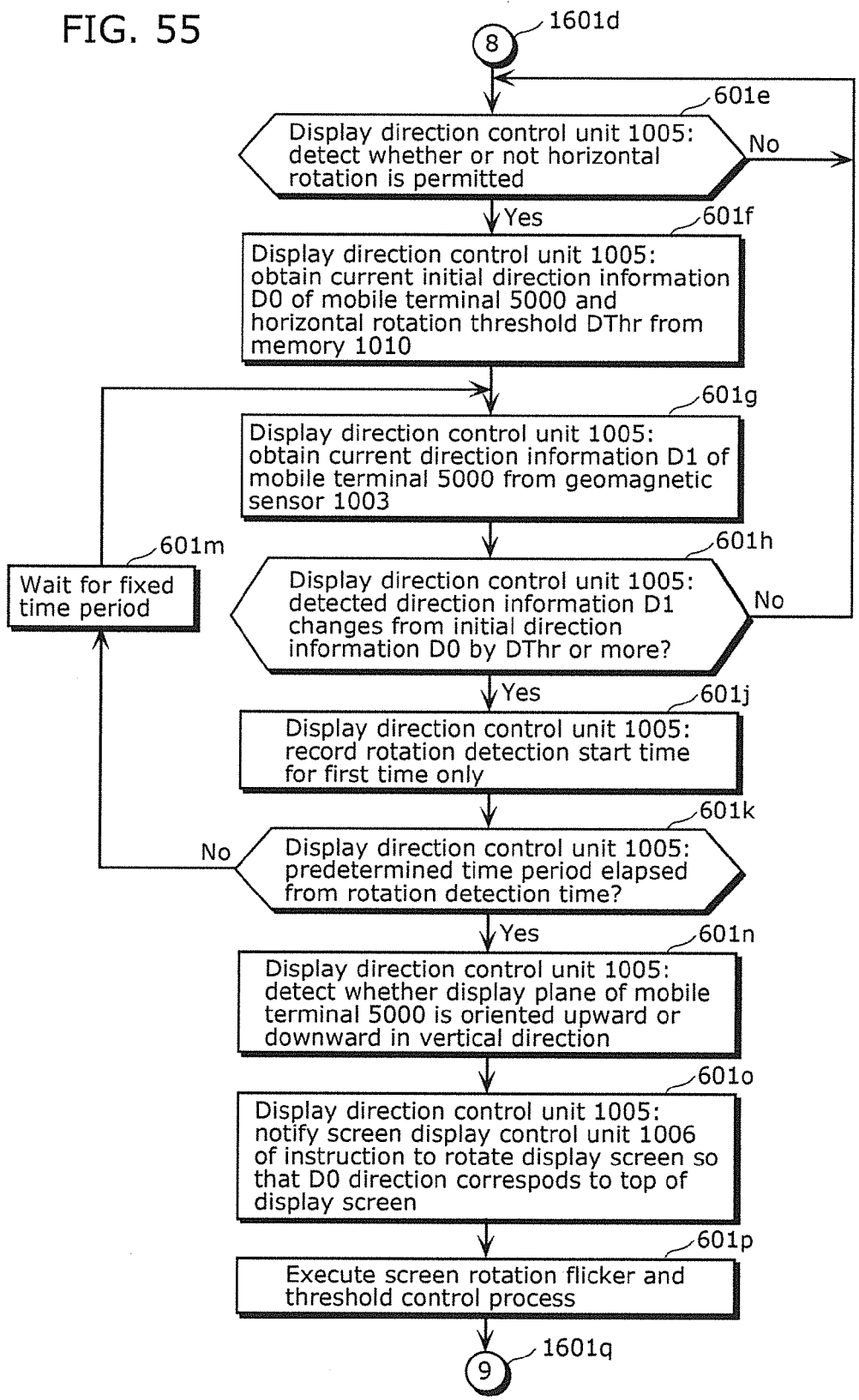
FIG. 55 is a diagram showing another control flow of the mobile terminal in Embodiment 5 of the present invention.
Figure 56:
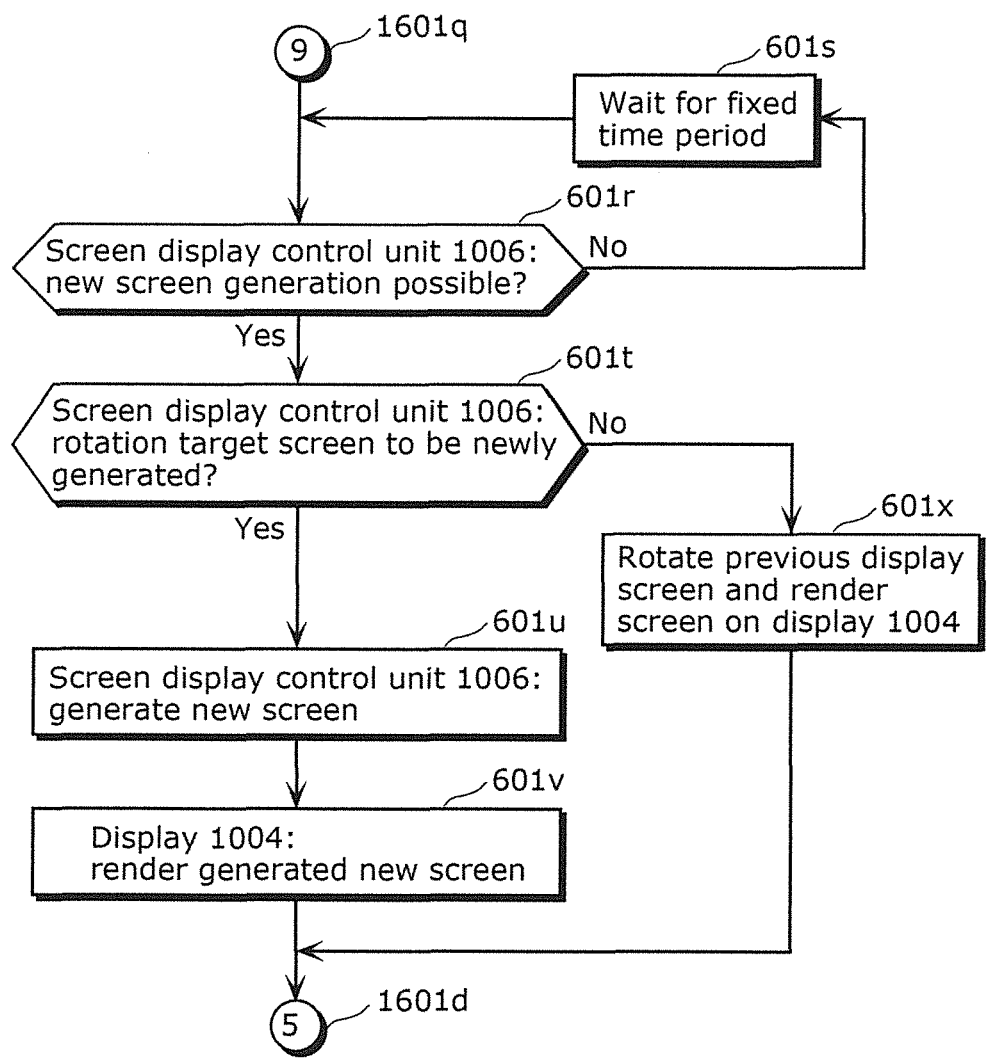
FIG. 56 is a diagram showing another control flow of the mobile terminal in Embodiment 5 of the present invention.

The following describes operations when the mobile terminal 5000 returns from a sleep state, with reference to FIG. 51.

First, in Step 603*a*, the mobile terminal 5000 detects return from a sleep state.

Upon detection of the return from the sleep state, the process goes to Step 603*b*.

Next, in Step 603*b*, the screen display control unit 1006 reads a display direction at previous sleep from the memory.

Next, in Step 603*c*, the screen display control unit 1006 renders the screen in the same display direction as the display direction at the previous sleep, on the display 1004.

The process then goes to Step 601*d*.

Though this embodiment describes the case where horizontal rotation is performed after initialization (or return from sleep), a process of performing vertical rotation may be executed as in FIGS. 52 to 56. FIGS. 52 to 56 are diagrams showing another control flow of the mobile terminal 5000 in Embodiment 5 of the present invention.

There is a possibility that, upon initialization or return from sleep, the initial direction D0 in the horizontal direction or the current direction information D1 in the horizontal direction of the mobile terminal 5000 do not match the actual values. Accordingly, the vertical rotation determination is performed immediately after such initialization or return from sleep, with it being possible to rotate the display screen more precisely.

[1-3-3. Display Screen Rotation Control (Detail)]

Figure 43:
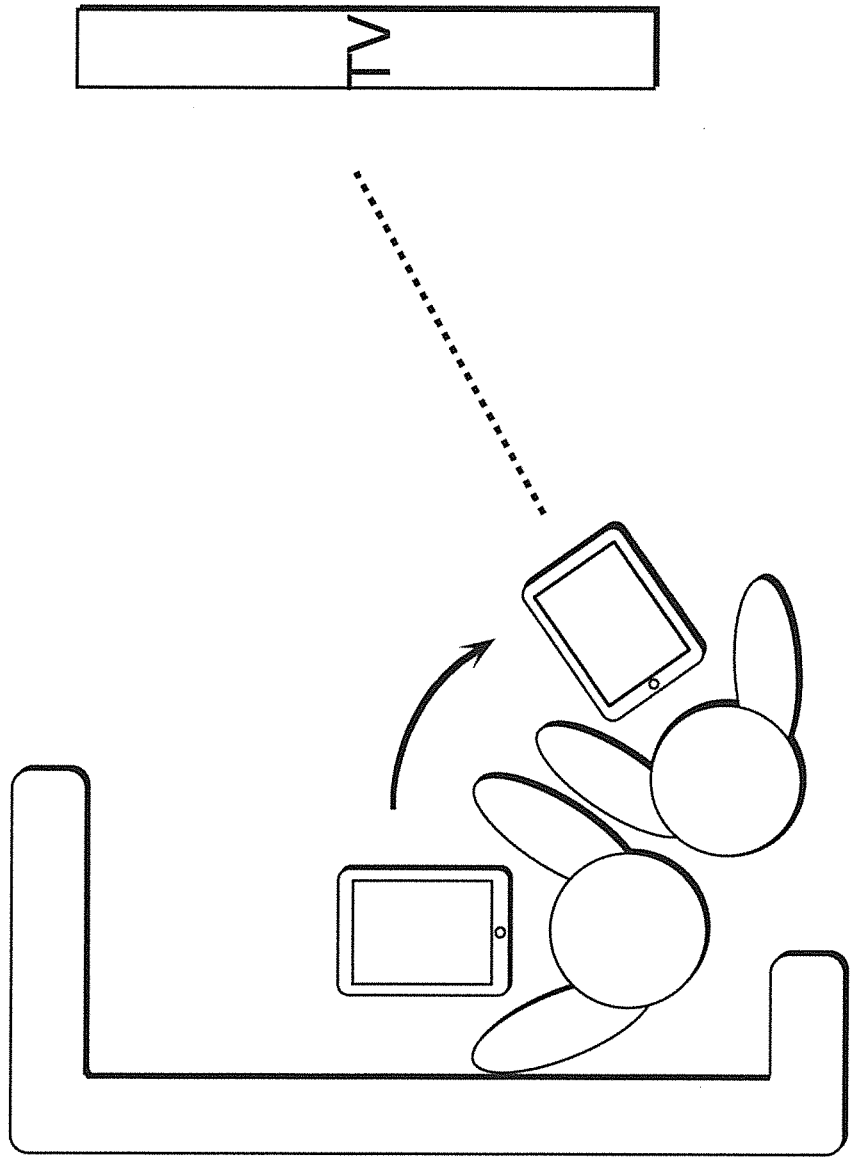
FIG. 43 is a diagram showing a use case example in the case of operating the mobile terminal in Embodiment 5 of the present invention as a TV remote control.
Figure 44:
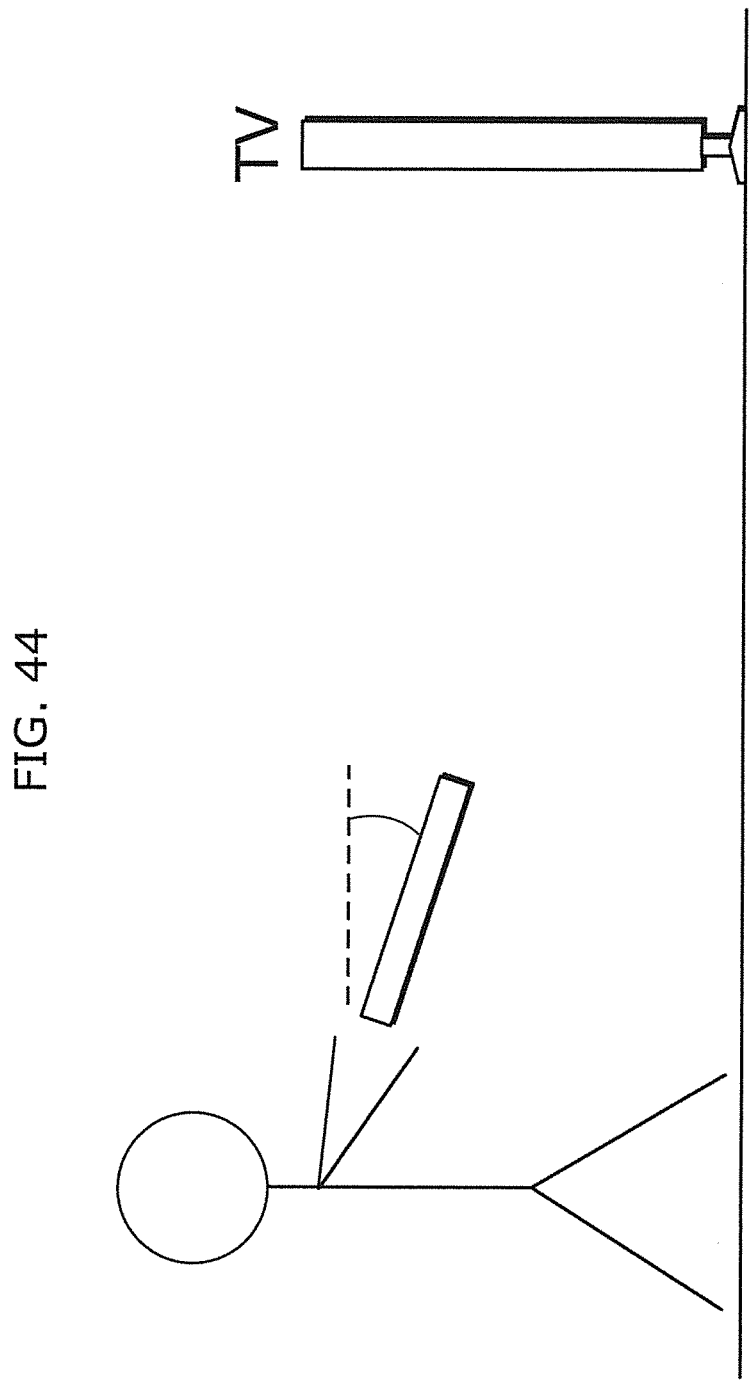
FIG. 44 is a diagram showing a use case example in the case of operating the mobile terminal in Embodiment 5 of the present invention as a TV remote control.
Figure 47:
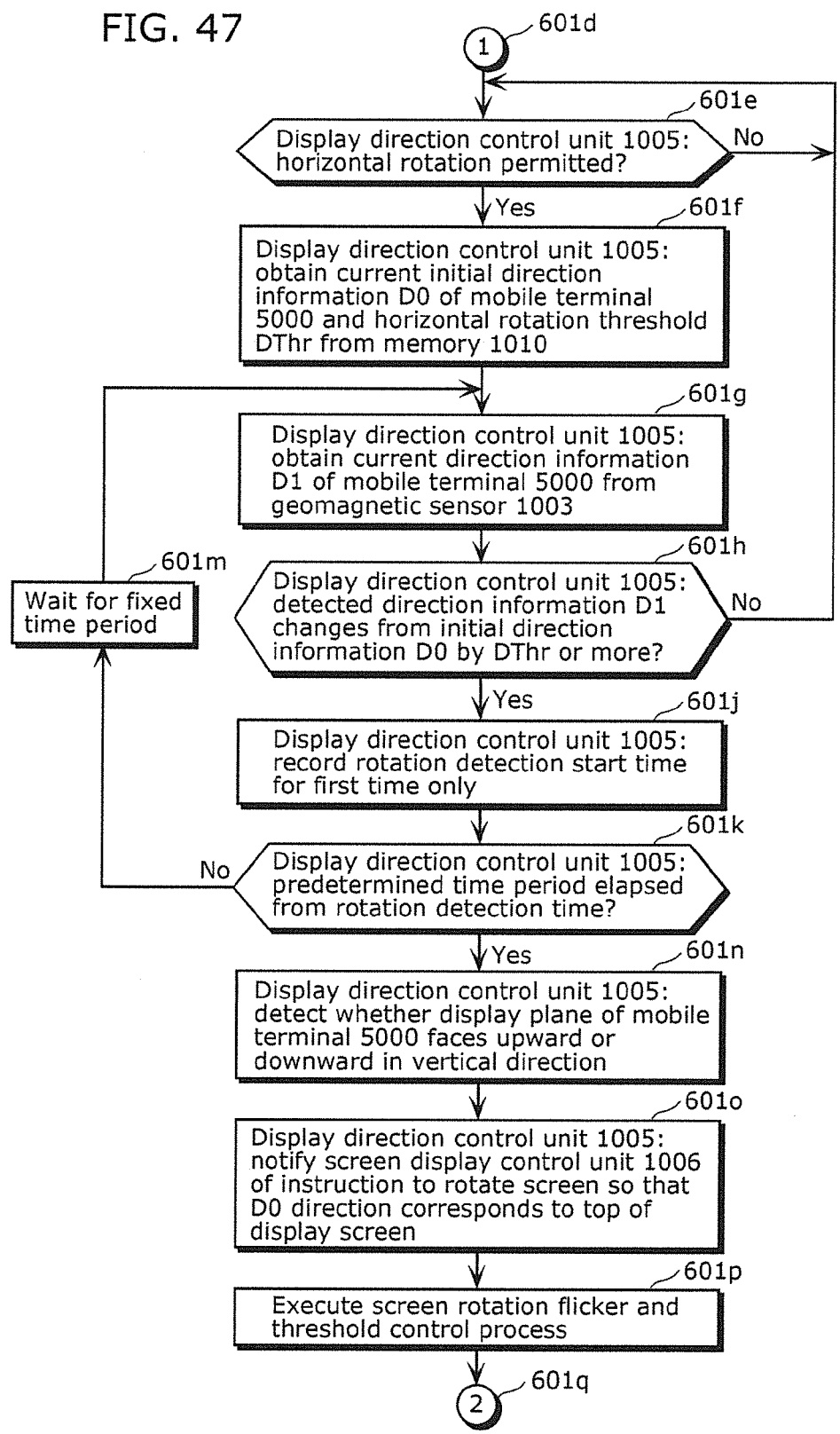
FIG. 47 is a diagram showing control flow of the mobile terminal in Embodiment 5 of the present invention.
Figure 48:
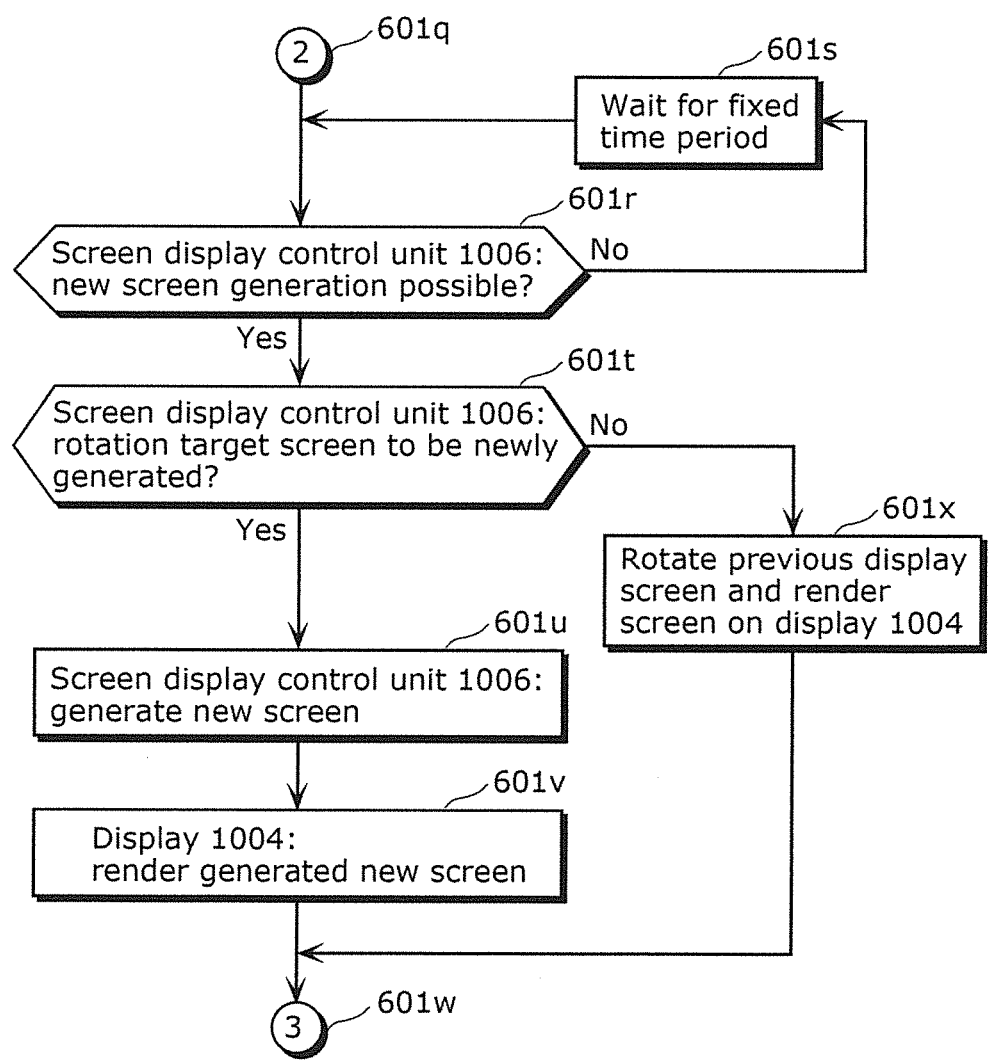
FIG. 48 is a diagram showing control flow of the mobile terminal in Embodiment 5 of the present invention.
Figure 49:
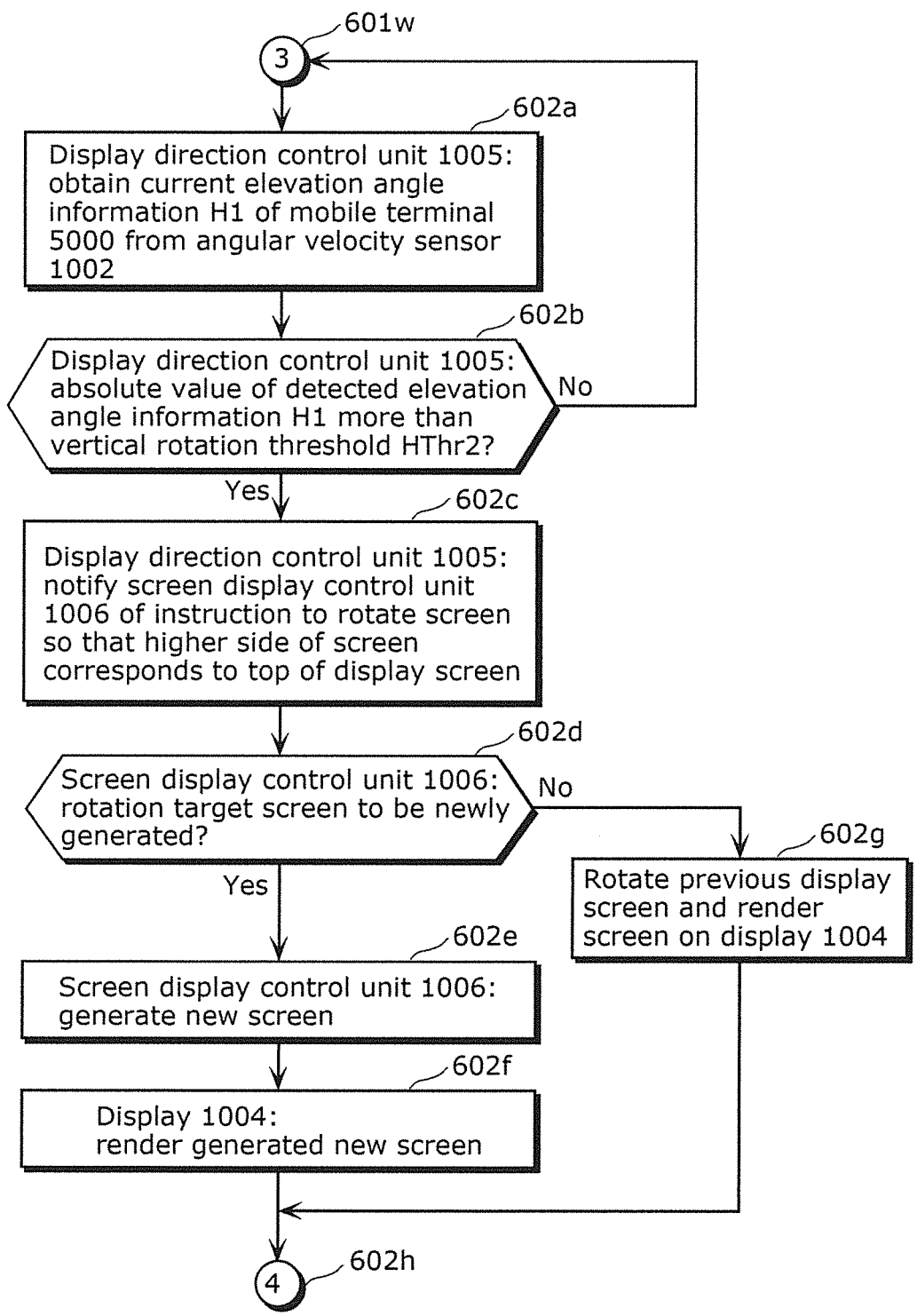
FIG. 49 is a diagram showing control flow of the mobile terminal in Embodiment 5 of the present invention.
Figure 50:
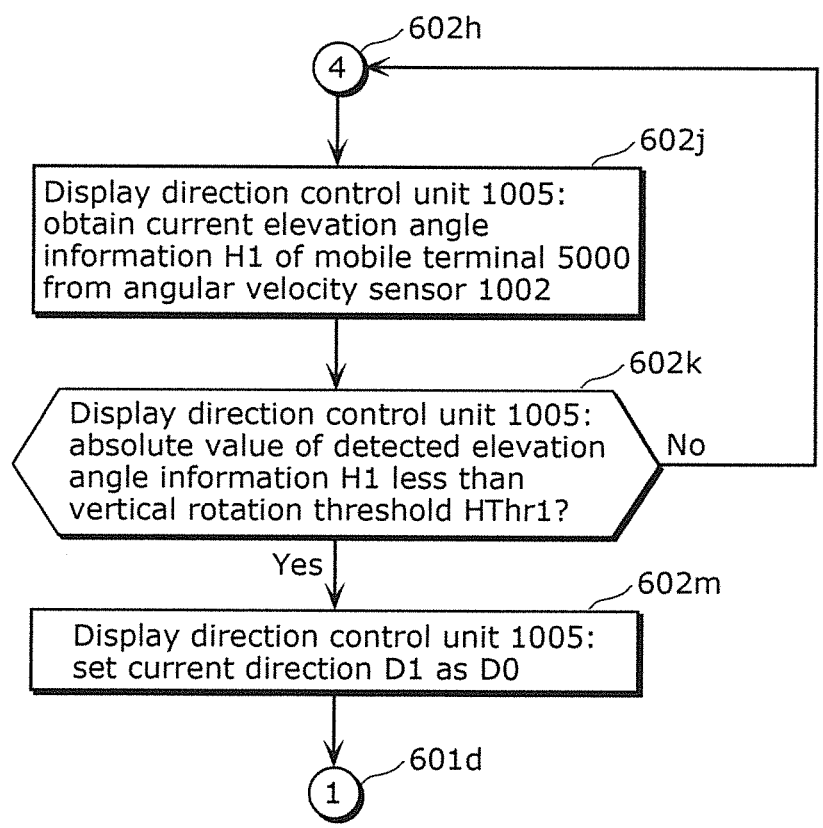
FIG. 50 is a diagram showing control flow of the mobile terminal in Embodiment 5 of the present invention.

Step 601*e* in FIG. 47 is described in detail below, with reference to FIGS. 41, 42, and 43. The mobile terminal 5000 has many functions such as a general-purpose remote control function, as mentioned earlier. For example, in the case where, when operating the mobile terminal 5000 in a general-purpose remote control mode, the user rotates while holding the remote control in order to operate a component located at 90° from a TV, the display direction is rotated too, which impairs user friendliness. The same applies to the case where the user who is surfing the Internet or the like using the mobile terminal 5000 switches the mobile terminal 5000 to the remote control mode and points the mobile terminal 5000 at the TV in order to operate the TV, as shown in FIG. 43. It is therefore preferable that the mobile terminal 5000 has, for each operation mode, rotation determination of whether or not rotation such as vertical rotation or horizontal rotation is performed. This can prevent any screen rotation unintended by the user, contributing to improved operability.

In this embodiment, for example when operating a TV placed on a floor using the mobile terminal 5000, if the mobile terminal 5000 is tilted more than the vertical rotation threshold HThr2, the screen is rotated, which impairs user friendliness. It is therefore desirable that the vertical rotation threshold and the horizontal rotation threshold of the mobile terminal 5000 are variable according to the operation mode.

Moreover, since the TV is typically operated by infrared radiation, in such a case where a plane from which infrared radiation is transmitted faces downward in the mobile terminal 5000 in the remote control mode, user operability can be improved by, for example, increasing the vertical rotation threshold HThr2 or suppressing vertical rotation.

Embodiment 6

This embodiment describes operations when the user uses a mobile device while standing the mobile device on a desk or laying and rotating the mobile device on the desk, with reference to FIGS. 57 to 67.

Figure 57:
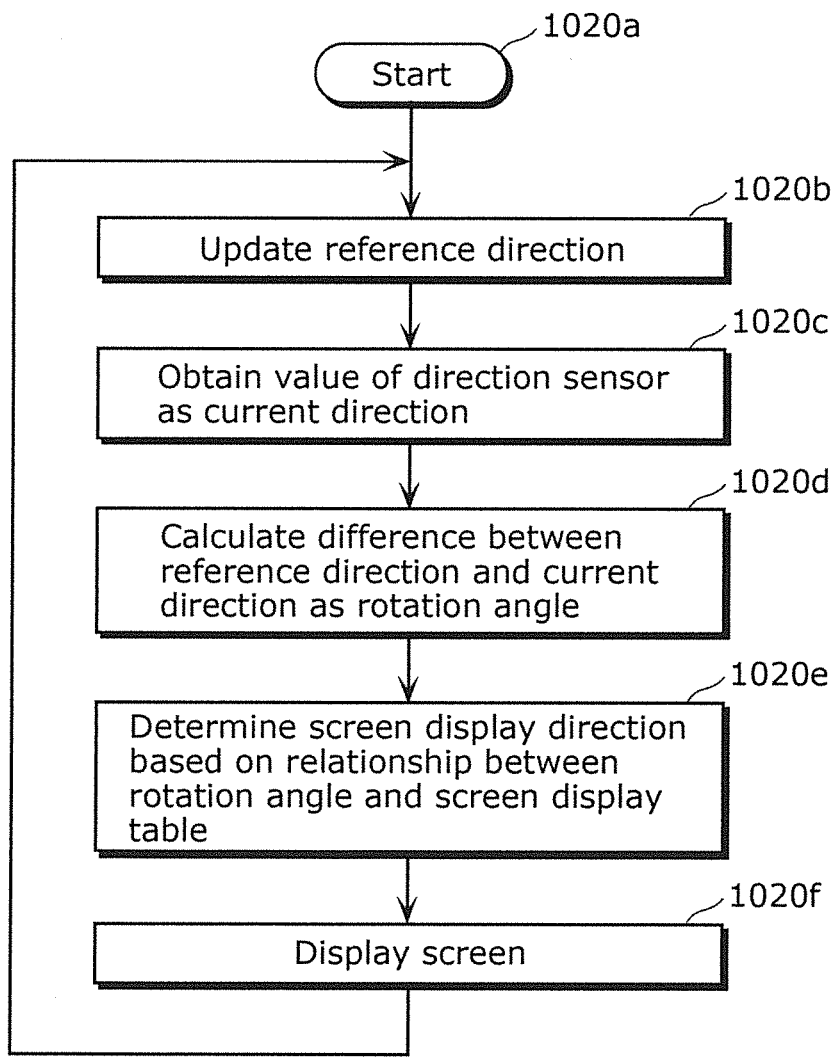
FIG. 57 is a diagram showing an operation in the case of using the mobile device in Embodiment 5 of the present invention.

The following describes process flow shown in FIG. 57.

First, in Step 1020*a*, the process starts. Next, in Step 1020*b*, a direction in which the mobile device is oriented when the mobile device is laid horizontally is set as a reference direction, and an orientation of a screen of the mobile device when the mobile device is laid horizontally is set as a screen display direction optimal for a user. A method of updating the reference direction will be described in detail later with reference to FIG. 58.

Next, in Step 1020c, a value of a direction sensor is obtained as a current direction.

Next, in Step 1020d, a difference between the reference direction and the current direction is calculated as a rotation angle.

Next, in Step 1020e, the screen display direction is determined based on a relationship between the rotation angle and a screen display table. A method of determining the screen display direction will be described in detail later with reference to FIGS. 64 to 66.

Next, in Step 1020f, the screen is displayed. The process then returns to Step 1020b.

Figure 58:
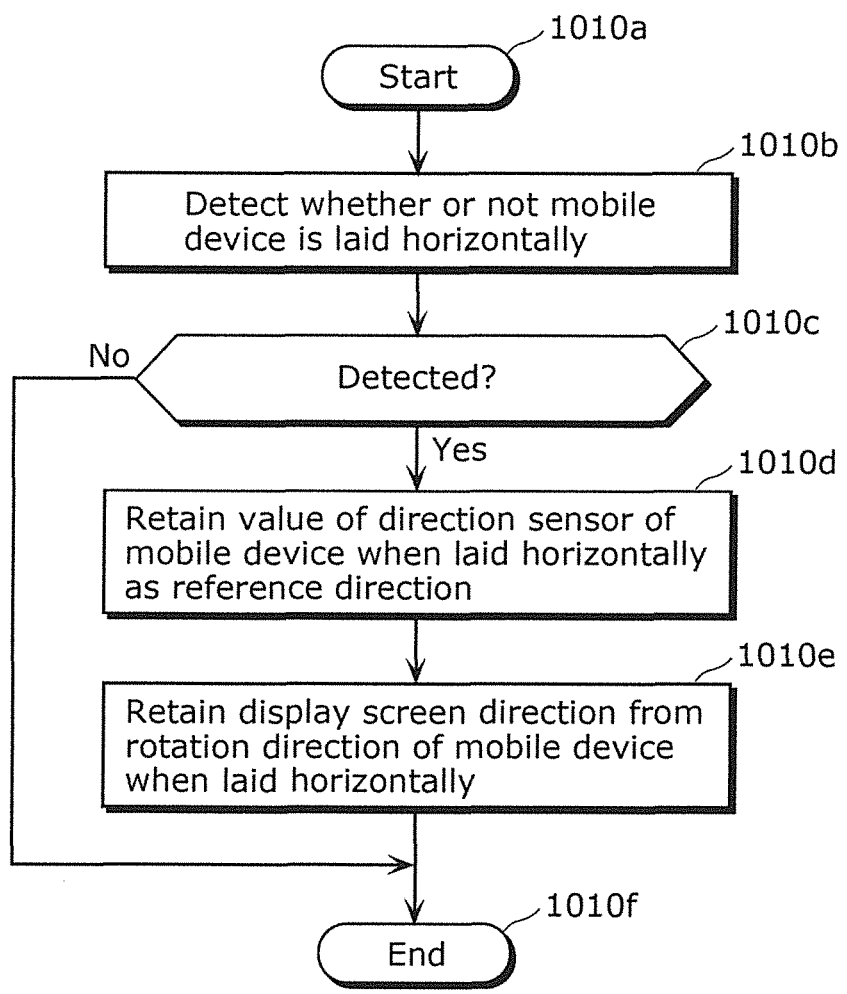
FIG. 58 is a flow diagram showing a method of updating a reference direction of the mobile device in Embodiment 5 of the present invention.

FIG. 58 is a flow diagram showing the reference direction update method (Step 1020b). The following describes process flow shown in FIG. 58.

First, in Step 1010a, the process starts. Next, in Step 1010b, whether or not the mobile device is laid horizontally is detected. A method of detecting whether or not the mobile device is laid horizontally will be described in detail later with reference to FIGS. 59 to 61.

Next, in Step 1010c, whether or not the horizontal laying of the mobile device is detected is determined.

In the case where the determination results in No, the process goes to Step 1010f to end. In the case where the determination results in Yes, the process goes to Step 1010d to retain the value of the direction sensor of the mobile device when laid horizontally as the reference direction, and Step 1010e to retain the display screen direction from the rotation direction of the mobile device when laid horizontally. A method of determining the display screen direction will be described in detail later with reference to FIGS. 62 and 63.

In Step 1010f, the process ends.

Figure 59:
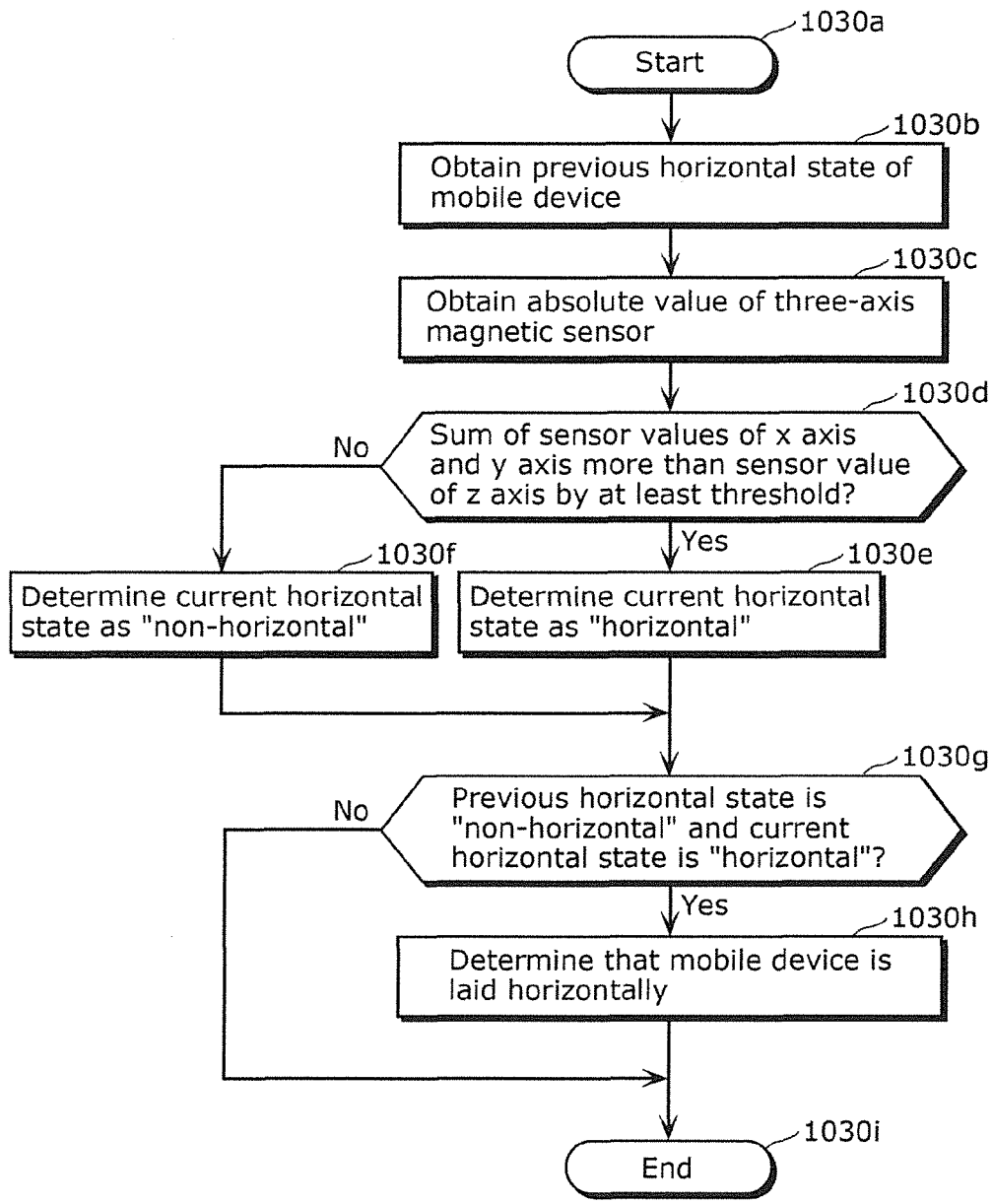
FIG. 59 is a flow diagram showing a method of detecting horizontal laying of the mobile device in Embodiment 5 of the present invention.

FIG. 59 is a flow diagram showing the method of detecting the horizontal laying of the mobile device (1010b) in FIG. 58.

The following describes process flow shown in FIG. 59.

First, in Step 1030a, the process starts.

Next, in Step 1030b, the previous horizontal state of the mobile device is obtained.

Figure 60:
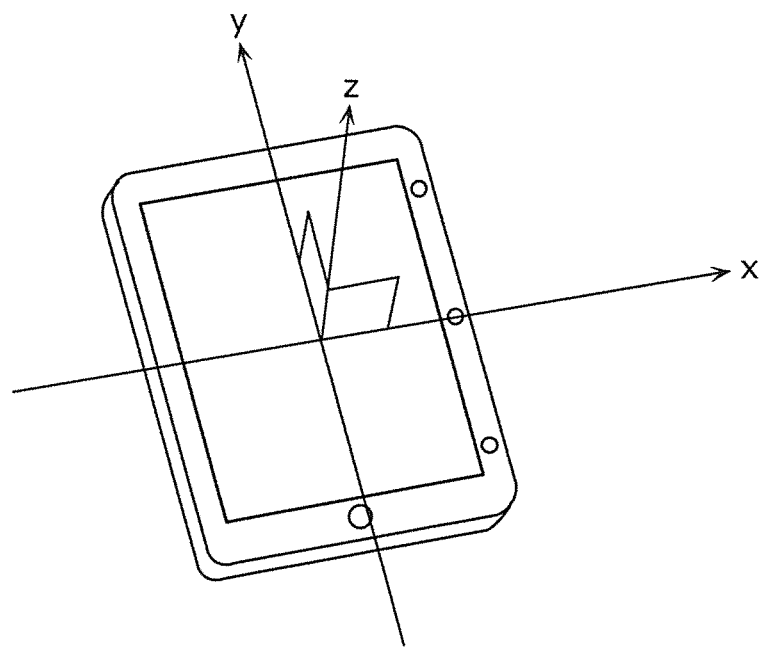
FIG. 60 is a diagram showing an example of directions of three axes of a magnetic sensor of the mobile device in Embodiment 5 of the present invention.
Figure 61:
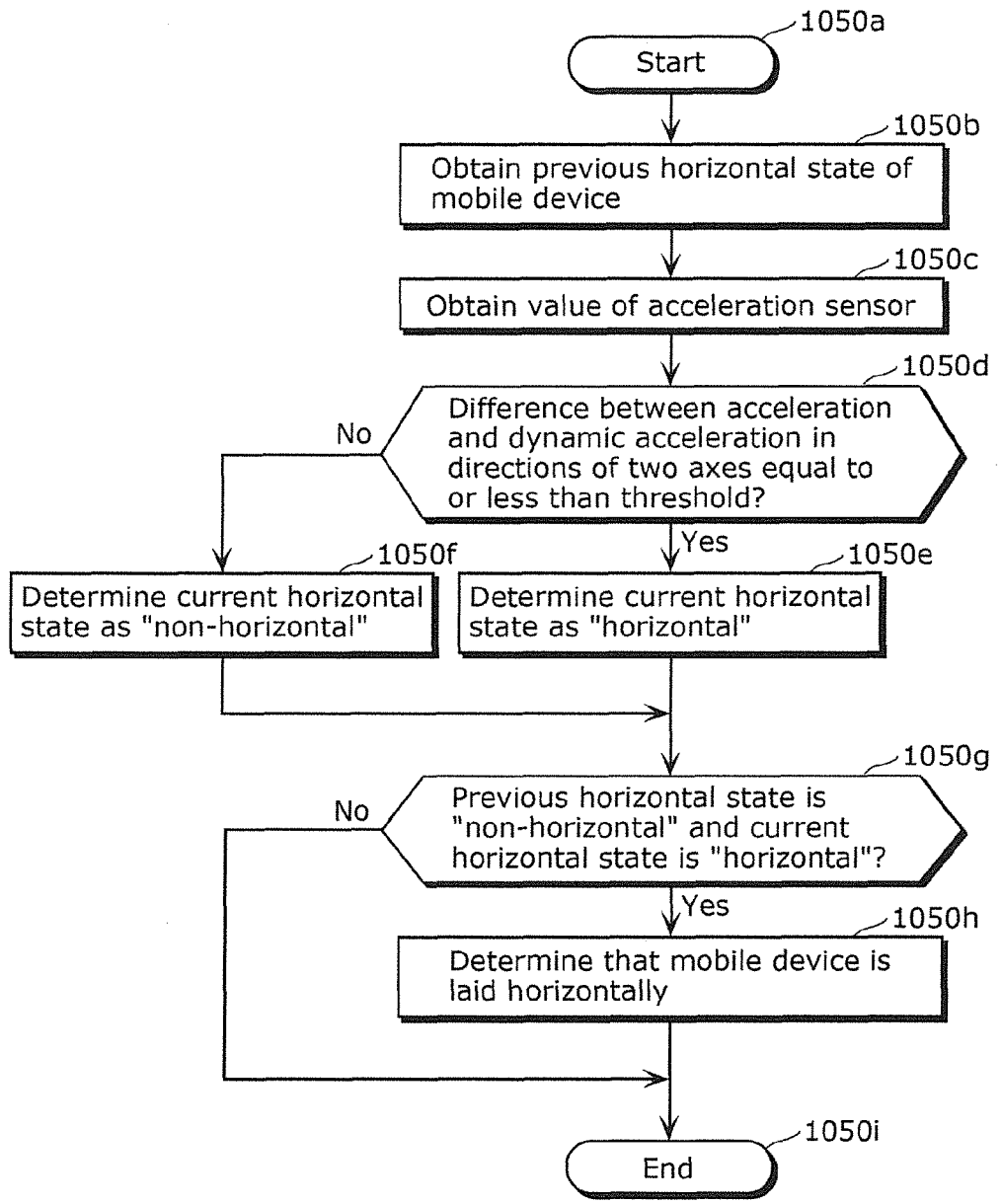
FIG. 61 is a diagram showing a method of detecting horizontal laying of the mobile device using an acceleration sensor in Embodiment 5 of the present invention.

Next, in Step 1030c, an absolute value of a three-axis magnetic sensor is obtained. FIG. 60 is a diagram showing an example of directions of three axes of the magnetic sensor of the mobile device.

Next, in Step 1030d, whether or not a sum of sensor values of the x axis and the y axis is more than a sensor value of the z axis by at least a threshold is determined.

In the case where the determination in Step 1030d results in Yes, the process goes to Step 1030e to determine the current horizontal state as "horizontal".

Next, in Step 1030g, whether or not the previous horizontal state is "non-horizontal" and the current horizontal state is "horizontal" is determined.

In the case where the determination in Step 1030g results in Yes, the process goes to Step 1030h to determine that the mobile device is laid horizontally. The process then ends in Step 1030i.

In the case where the determination in Step 1030d results in No, the process goes to Step 1030f to determine the current horizontal state as "non-horizontal". The process then goes to Step 1030g. In the case where the determination in Step 1030g results in No, the process goes to Step 1030i to end.

Figure 62:
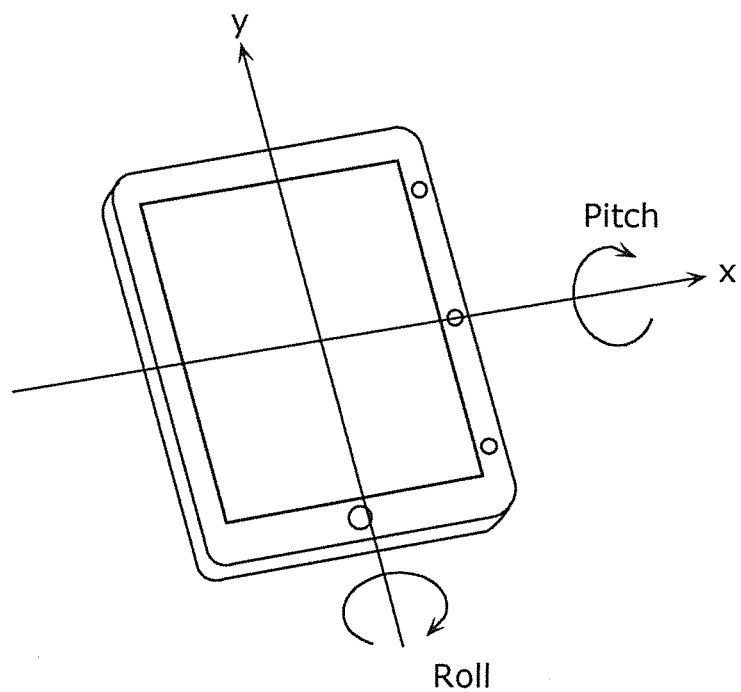
FIG. 62 is a diagram showing an example of directions of three axes of the magnetic sensor of the mobile device in Embodiment 5 of the present invention.
Figure 63:
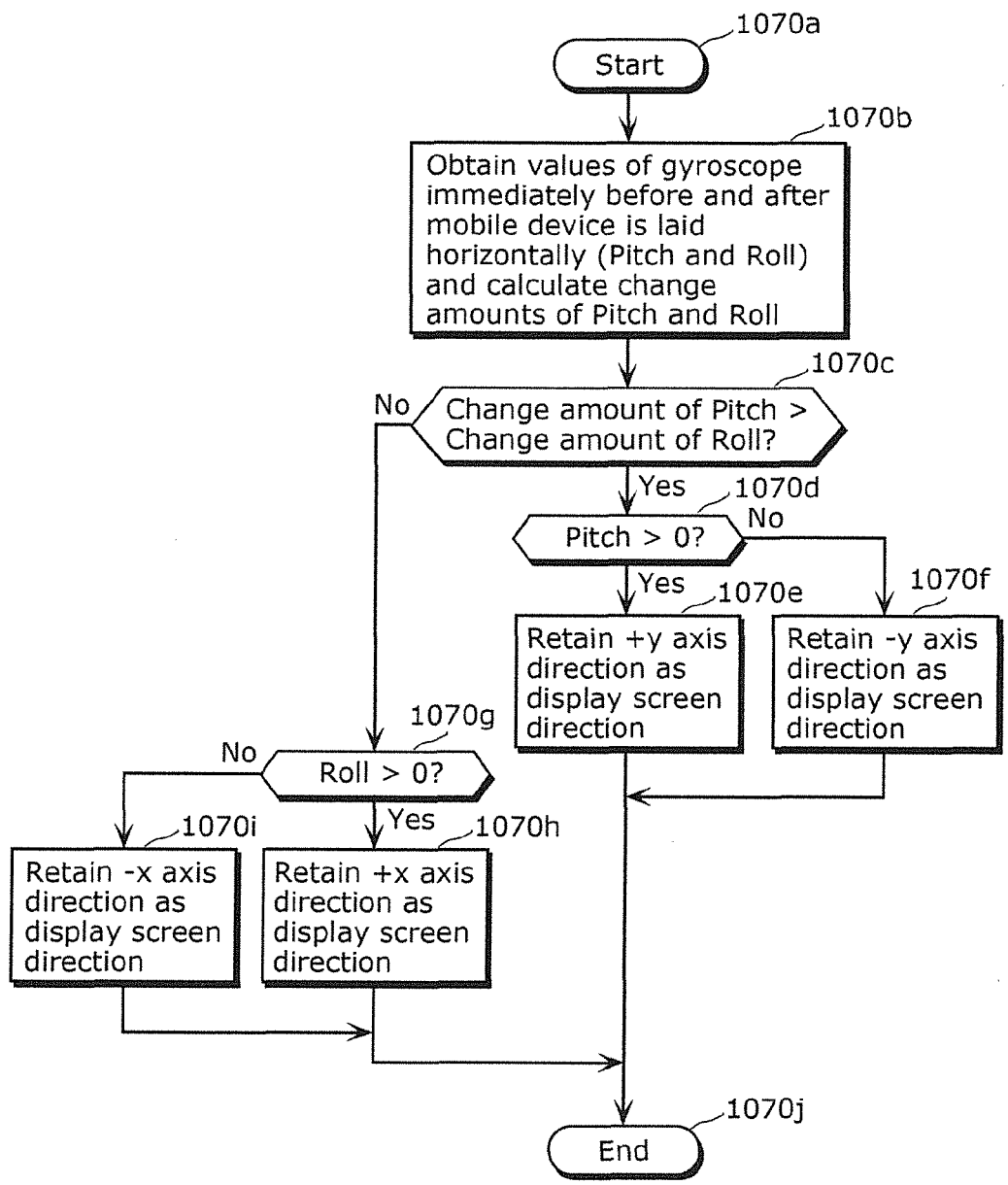
FIG. 63 is a diagram showing a screen display direction of the mobile device in Embodiment 5 of the present invention.

The following describes the method of detecting the display screen direction (1010e) in FIG. 58, with reference to FIGS. 62 and 63. First, in Step 1070a, the process starts. Next, in Step 1070b, values of a gyroscope immediately before and after the mobile device is laid horizontally (Pitch and Roll) are obtained, and change amounts of Pitch and Roll is calculated. Pitch and Roll of the mobile device mentioned here are respectively rotation angles in the x axis and the y axis in FIG. 62.

Next, in Step 1070c, whether or not the change amount of Pitch is more than the change amount of Roll is determined.

In the case where the determination results in Yes, the process goes to Step 1070d to determine whether or not Pitch>0. In the case where the determination results in Yes, the process goes to Step 1070e to retain the +y axis direction as the display screen direction. The process then ends in Step 1070j. In the case where the determination in Step 1070d results in No, on the other hand, the process goes to Step 1070f to retain the −y axis direction as the display screen direction. The process then ends in Step 1070j.

In the case where the determination in Step 1070c results in No, the process goes to Step 1070g to determine whether or not Roll>0. In the case where the determination results in Yes, the process goes to Step 1070h to retain the +x axis direction as the display screen direction. The process then ends in Step 1070j.

In the case where the determination in Step 1070g results in No, the process goes to Step 1070i to retain the −x axis direction as the display screen direction. The process then ends in Step 1070j.

The screen display direction in FIG. 58 is described below, with reference to FIGS. 64 to 66.

Figure 66:
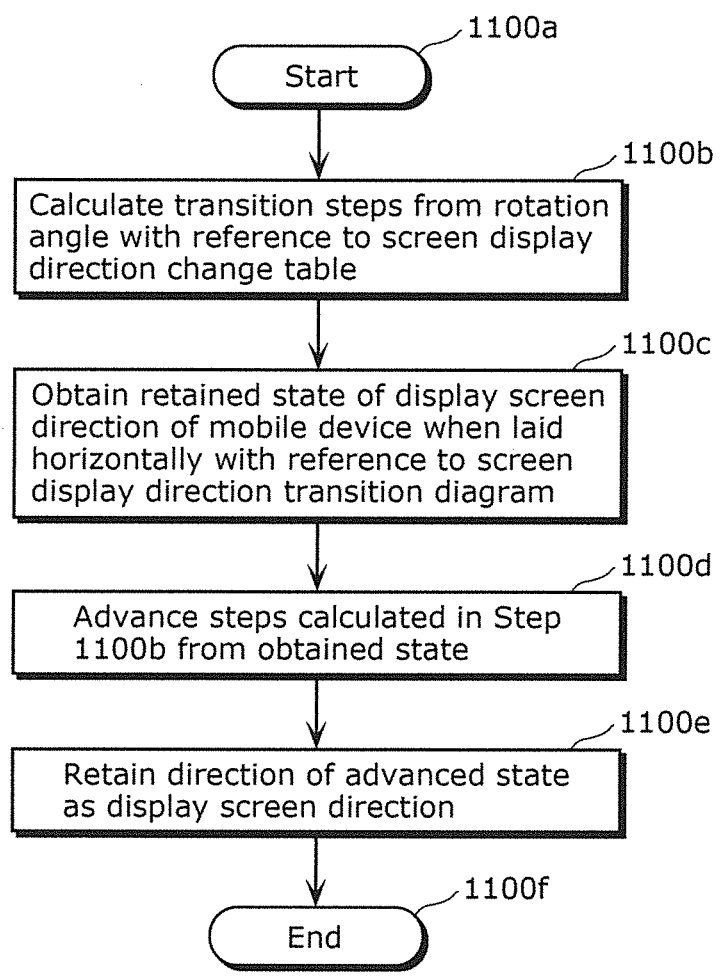
FIG. 66 is a diagram showing a screen display direction of the mobile device in Embodiment 5 of the present invention.

The following describes process flow shown in FIG. 66.

First, in Step 1100a, the process starts. Next, in Step 1100b, transition steps are calculated from a rotation angle with reference to a screen display direction change table shown in FIG. 64.

Figure 65:
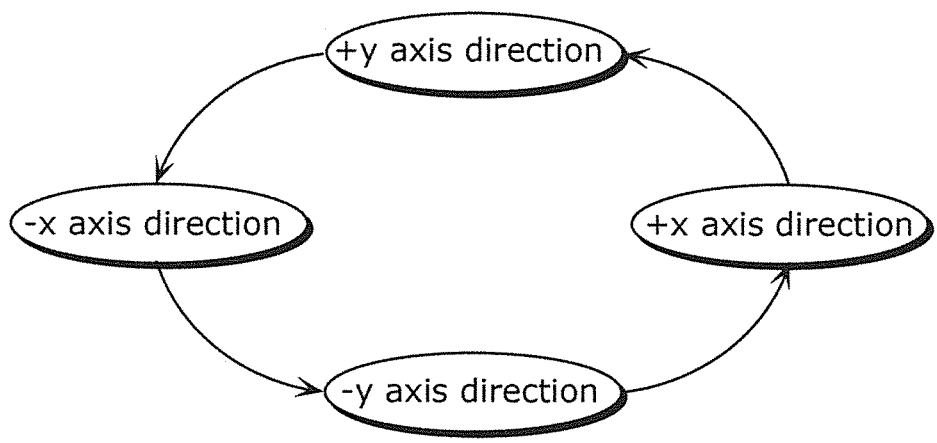
FIG. 65 is a diagram showing screen display direction transitions of the mobile device in Embodiment 5 of the present invention.

Next, in Step 1100c, the retained state of the display screen direction of the mobile device when laid horizontally is obtained with reference to a screen display direction transition diagram shown in FIG. 65.

Next, in Step 1100d, the step is advanced from the state obtained in Step 1100c, by the steps calculated in Step 1100b.

Next, the direction of the state advanced in Step 1100e is retained as the display screen direction. The process then ends in Step 1100f.

According to this method, it is possible to achieve an advantageous effect of displaying the screen of the mobile device always in the direction suitable for the user even in the case where the user uses the horizontally laid mobile device while repeatedly rotating it.

For example, suppose the mobile device in the state of FIG. 1(B) is laid horizontally on the desk as in the state of FIG. 1(C), and then rotated 90° counterclockwise as in the state of FIG. 1(D). It is desirable for the user that the screen display is always made in his/her direction.

Here, according to the flow in FIG. 63, the side of 001-a shown in FIG. 1 is regarded as the rotation angle, and the +y axis direction is retained as the display screen direction. An example of rotation in this case is described below, with reference to FIG. 67. In FIG. 67(A), the direction of the mobile device is 270°. Since 270° is the direction when the mobile device is laid horizontally, the reference direction of 270° is retained. In FIG. 67(B), the direction of the mobile device when the user rotates the mobile device is 230°. In this case, the rotation angle is 230−270=−40°. With reference to the screen display direction change table in FIG. 64, −40° corresponds to the rotation display direction transition of 0 step, so that the screen display direction remains to be the +y direction. Following this, in the case where the user rotates the mobile device to the state of FIG. 67(C), the current direction of the mobile device is 180°. At this time, the rotation angle is 180−270=−90°. With reference to the screen display direction change table in FIG. 64, −90° corresponds to three steps. Since the current direction is the +y axis direction in the screen display direction transition diagram in FIG. 65, the +x axis direction as a result of advancing three steps is the new screen display direction.

Though the method using the magnetic sensor in FIG. 59 is described as the method of detecting whether or not the mobile device is laid horizontally (Step 1010*b*) in FIG. 66, a detection method using an acceleration sensor may instead be employed. The detection method using the acceleration sensor is described below, with reference to FIG. 61.

First, in Step 1050*a*, the process starts. Next, in Step 1050*b*, the previous horizontal state of the mobile device is obtained.

Next, in Step 1050*c*, the value of the acceleration sensor is obtained.

Next, in Step 1050*d*, whether or not a difference between acceleration and dynamic acceleration in the directions of the two axes is equal to or less than a threshold is determined.

In the case where the determination results in Yes, the process goes to Step 1050*e* to determine the current horizontal state as "horizontal".

Next, in Step 1050*g*, whether or not the previous horizontal state is "non-horizontal" and the current horizontal state is "horizontal" is determined.

In the case where the determination results in Yes, the process goes to Step 1050*h* to determine that the mobile device is laid horizontally. The process then ends in Step 1050*i*.

In the case where the determination in Step 1050*d* results in No, the process goes to Step 1050*f* to determine the current horizontal state as "non-horizontal". The process then goes to Step 1050*g*. In the case where the determination in Step 1050*g* results in No, the process goes to Step 1030*i* to end.

Instead of using the direction sensor, a gyroscope may be used to detect the rotation of the device so that the display screen is changed according to the rotation of the device. In this method, though a cumulative error occurs at each rotation as compared with the direction sensor, there is an advantageous effect of displaying the screen in an appropriate orientation according to the rotation of the device even when the device includes no direction sensor.

In Embodiment 5 of the present invention, the mobile terminal 5000 may be equipped with a proximity sensor, a contact sensor, or the like so that a start screen upon return from sleep is directed to the user. In this way, the screen can be automatically rotated in the direction easily viewable by the user, in whichever position relationship between the mobile terminal 5000 and the user upon return from sleep or power on.

FIG. 67 is a diagram showing the direction of the mobile device in the case of rotating the mobile device in Embodiment 5 of the present invention. An example of the direction of the mobile device when executing the above-mentioned flow in FIG. 63 is shown in FIG. 67. Each arrow in FIG. 67 indicates the screen orientation of the mobile device.

Figure 69:
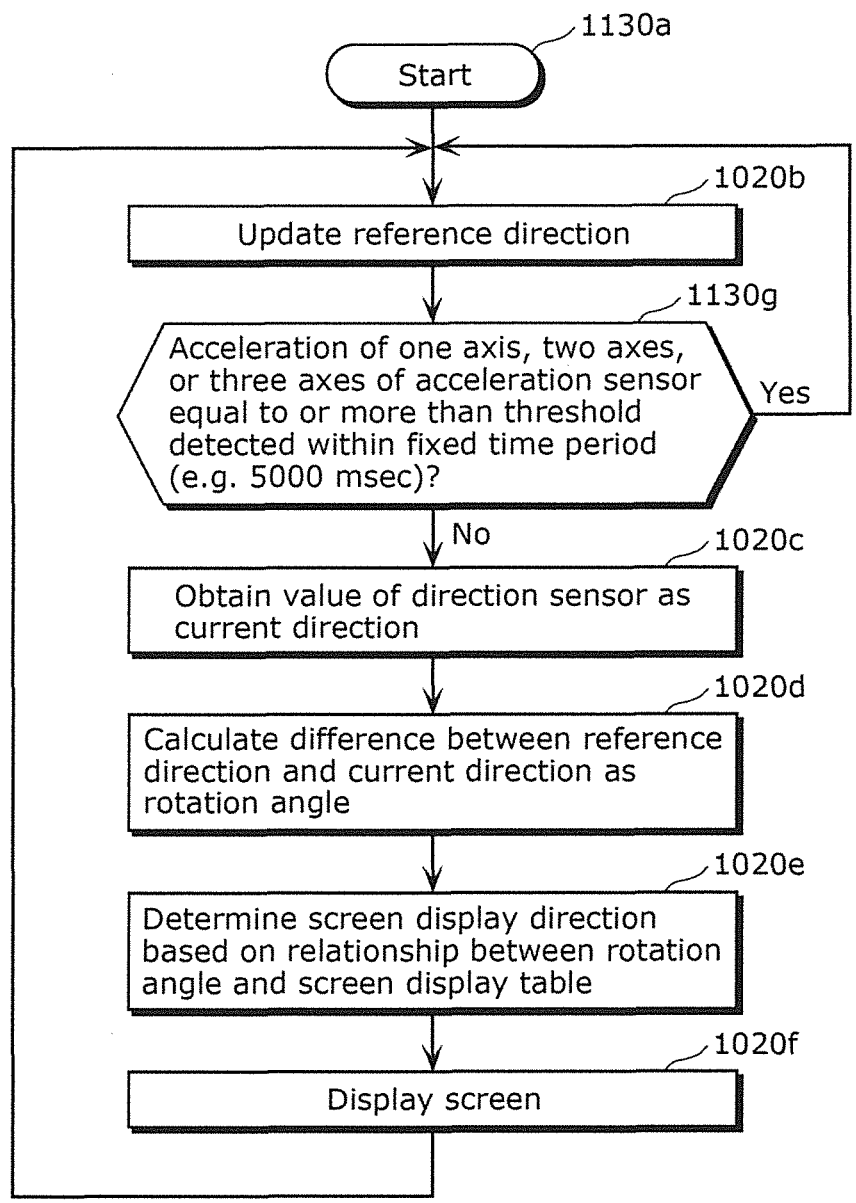
FIG. 69 is a diagram showing flow in the case where a person rotates while holding a tablet which is one aspect of the mobile device in Embodiment 5 of the present invention.
Figure 70:
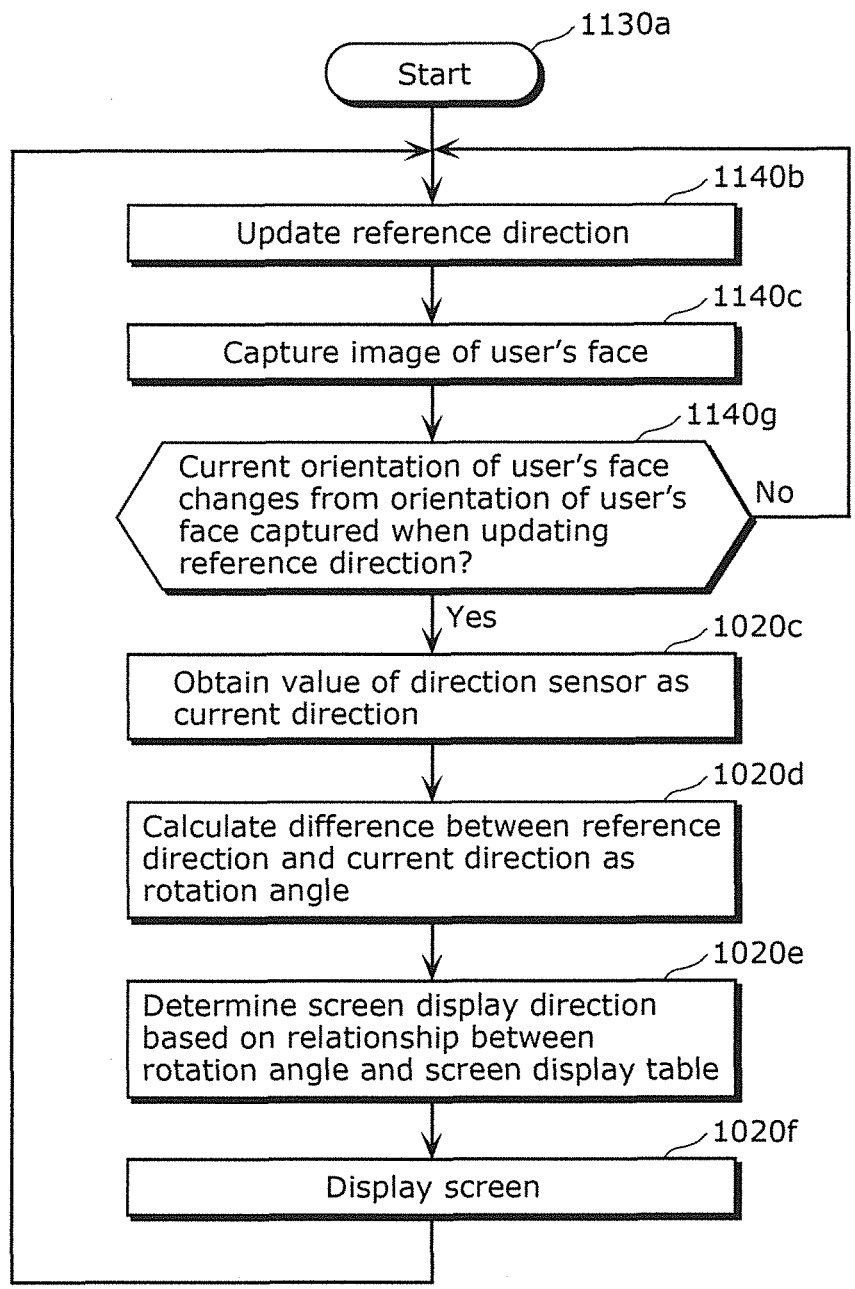
FIG. 70 is a diagram showing flow in the case where a person rotates while holding a tablet which is one aspect of the mobile device in Embodiment 5 of the present invention.

FIG. 68 is a diagram showing another example of automatically rotating the screen in the direction easily viewable by the user. In detail, FIG. 68 is a diagram showing the display of the mobile device in the case where the user views the mobile device in Embodiment 5 of the present invention. FIGS. 69 and 70 are each a diagram showing process flow in the case where a person rotates while holding a tablet which is one aspect of the mobile device in Embodiment 5 of the present invention. The following describes process flow shown in FIG. 69.

First, in Step 1130*a*, the process starts.

Next, in Step 1020*b*, the reference direction is updated.

Next, in Step 1130*g*, whether or not acceleration of one axis, two axes, or three axes of the acceleration sensor equal to or more than a threshold is detected within a fixed time period (e.g. 500 msec) is determined.

In the case where the determination results in No (Step 1130*g*: No), the process goes to Step 1020*c* to obtain the value of the direction sensor as the current direction.

Next, in Step 1020*d*, a difference between the reference direction and the current direction is calculated as a rotation angle.

Next, in Step 1020*e*, the screen display direction is determined based on the relationship between the rotation angle and the screen display table.

Next, in Step 1020*f*, the screen is displayed. The process then returns to Step 1020*b*.

In the case where the determination in Step 1130*g* results in Yes (Step 1130*g*: Yes), the process returns to Step 1020*b*.

The following describes process flow shown in FIG. 70.

First, in Step 1130*a*, the process starts.

Next, in Step 1140*b*, the reference direction is updated.

Next, in Step 1140*c*, the image of the user's face is captured.

Next, in Step 1140*g*, whether or not the current orientation of the user's face changes from the orientation of the user's face captured when updating the reference direction is determined.

In the case where the determination results in Yes, i.e. in the case where the current orientation of the user's face changes (Step 1140*g*: Yes), the process goes to Step 1020*c* to obtain the value of the direction sensor as the current direction.

The process from Step 1020*d* has been described with reference to FIG. 69, and so its description is omitted here.

The reference direction update method is described below, with reference to FIG. 71.

Figure 71:
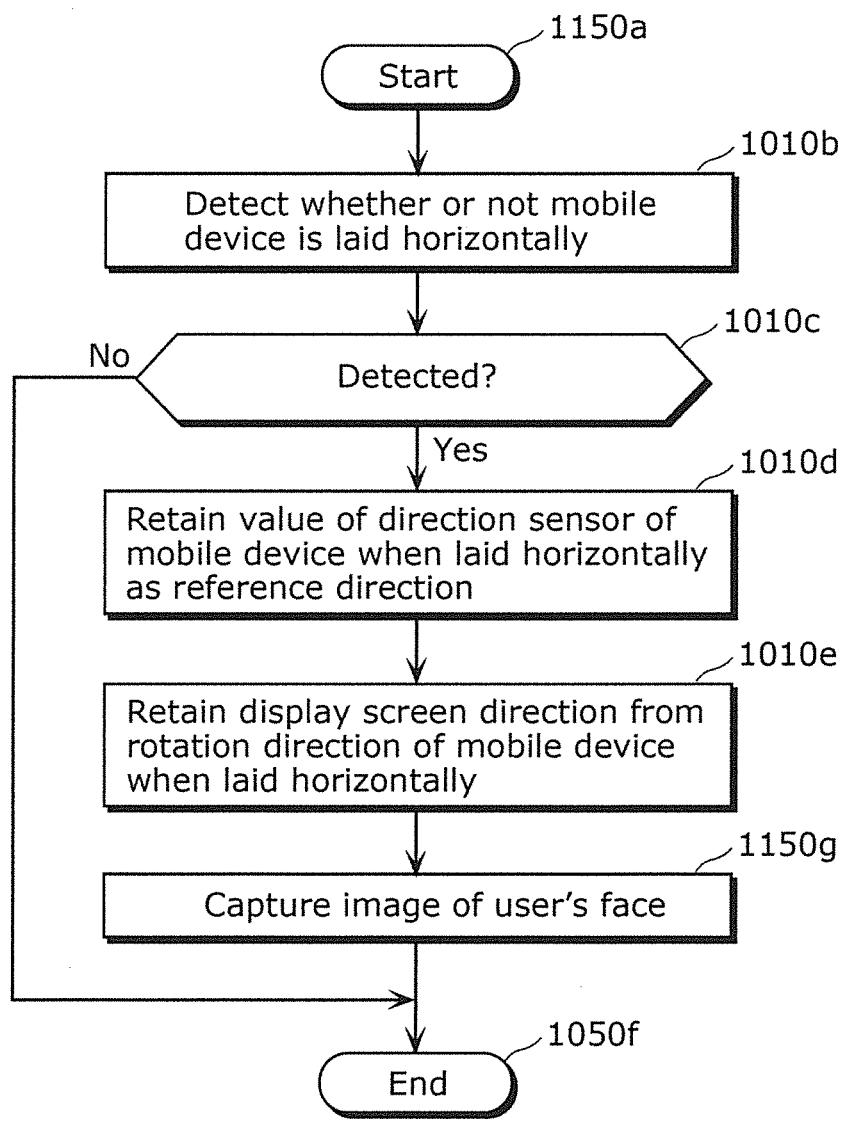
FIG. 71 is a flow diagram showing a method of updating a reference direction of the mobile device in Embodiment 5 of the present invention.

FIG. 71 is a diagram showing process flow of the reference direction update method of the mobile device in Embodiment 5 of the present invention.

First, in Step 1150*a*, the process starts.

Next, in Step 1010*b*, whether or not the mobile device is laid horizontally is detected.

Next, in Step 1010*c*, whether or not the horizontal laying of the mobile device is detected is determined.

In the case where the horizontal laying of the mobile device is detected (Step 1010*c*: Yes), the process goes to Step 1010*d* to retain the value of the direction sensor of the mobile device when laid horizontally as the reference direction, and Step 1010*e* to retain the display screen direction from the rotation direction of the mobile device when laid horizontally.

Next, in Step 1150*g*, the image of the user's face is captured. The process then goes to Step 1050*f* to end.

In the case where the horizontal laying of the mobile device is not detected (Step 1010*c*: No), the process goes to Step 1050*f* to end.

According to Embodiment 5 of the present invention, the screen can be automatically rotated in the direction easily viewable by the user, in whichever position relationship between the mobile terminal and the user.

Figure 72:
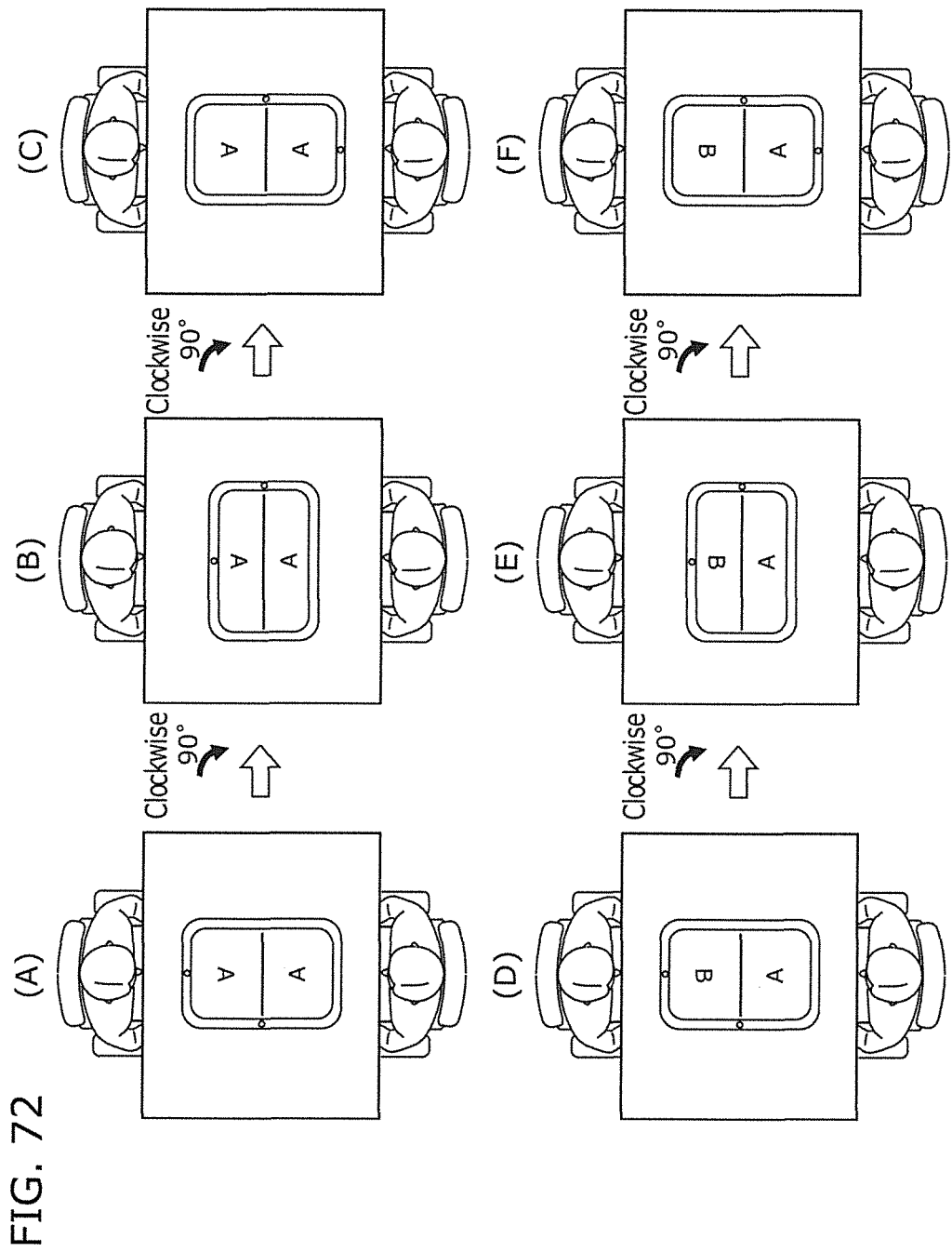
FIG. 72 is a diagram showing display of the mobile device in the case where persons facing each other view the mobile device in Embodiment 5 of the present invention.

Though the above describes the case where one user uses the mobile terminal, the present invention is not limited to such. For example, two persons facing each other may use the mobile device as shown in FIG. 72. FIG. 72 is a diagram showing the display of the mobile device in the case where two person facing each other view the mobile device in Embodiment 5 of the present invention.

In Embodiment 5 of the present invention, control may be exercised to suppress rotation of the mobile terminal 5000 while the mobile terminal 5000 is in a moving car. In detail, rotation control may be exercised in conjunction with an in-car mode and, in the case where a movement velocity is equal to or more than a threshold according to a GPS or acceleration information, screen rotation may be suppressed based on determination that the mobile terminal 5000 is in a moving car or other transportation means. This improves user friendliness.

As described above, according to the present invention, the screen can be automatically rotated in the direction easily viewable by the user, in whichever position relationship between the information display device and the user.

In detail, an information display device according to one aspect of the present invention includes: a display unit that displays an image according to an orientation of a display screen of the information display device; a posture detection unit that detects a posture of the information display device based on information obtained by an acceleration sensor, an angular velocity sensor, and a geomagnetic sensor; and a determination unit that determines whether or not the posture of the information display device changes, and determines the orientation of the display screen, wherein the determination unit, in the case where the display screen is in a substantially horizontal state and the determination unit determines that the posture of the information display device changes, determines the orientation of the display screen so that, when the information display device moves by a predetermined angle or more with respect to a reference orientation which is the orientation of the display screen before the determination unit determines that the posture of the information display device changes, a side of the information display device in a direction of the predetermined angle or more from the reference orientation corresponds to a top of the display screen, and the display unit displays the image according to the orientation of the display screen determined by the determination unit.

Here, the determination unit may, in the case where the display screen is not in the substantially horizontal state and the determination unit determines that the posture of the information display device changes, determine the orientation of the display screen so that a side of the information display device uppermost in a vertical direction corresponds to the top of the display screen, wherein the display unit displays the image according to the orientation of the display screen determined by the determination unit.

The posture of the information display device mentioned here is an external appearance of the information display device when the information display device performs some kind of static or dynamic operation or when some kind of operation is performed on the information display device, and is indicated by a direction and a tilt from a ground plane. "To display the image according to the orientation of the display screen" means that, for example in the case of displaying a whole image of a building, the top floor of the building is displayed in the direction (top) in which the display screen is oriented whereas the basement floor of the building is displayed in the direction (bottom) opposite to the direction in which the display screen is oriented. The side of the information display device corresponds to, for example, one of four sides in the case where the information display device has an external shape of a rectangle.

According to this structure, the screen can be automatically rotated in the direction easily viewable by the user, in whichever position relationship between the information display device and the user.

Moreover, the information display device according to one aspect of the present invention may further include a centrifugal force direction detection unit that detects a centrifugal force direction based on information obtained by the acceleration sensor, wherein the determination unit, in the case where the display screen is in the substantially horizontal state, the centrifugal force direction detection unit detects the centrifugal force direction, and the determination unit determines that the posture of the information display device changes, determines the orientation of the display screen so that a side of the information display device farthest in the centrifugal force direction detected by the centrifugal force direction detection unit corresponds to the top of the display screen, and the display unit displays the image according to the orientation of the display screen determined by the determination unit.

Moreover, the information display device according to one aspect of the present invention may further include a shaking detection unit that detects shaking of at least one side of the information display device based on information obtained by at least one of the acceleration sensor and the angular velocity sensor, wherein the determination unit, in the case where the display screen is in the substantially horizontal state, the shaking detection unit detects the shaking of the at least one side of an amplitude equal to or more than a threshold, and the determination unit determines that the posture of the information display device changes, determines the orientation of the display screen so that a side of the information display device having a largest amplitude of shaking detected by the shaking detection unit corresponds to the top of the display screen, and the display unit displays the image according to the orientation of the display screen determined by the determination unit.

Moreover, the information display device according to one aspect of the present invention may further include a coordinate estimation unit that estimates a current position of the information display device by autonomous navigation using information obtained by the acceleration sensor and at least one of the angular velocity sensor and the geomagnetic sensor, wherein the determination unit, from the posture of the information display device and the orientation of the display screen at the current position, estimates that a position of a user using the information display device is opposite to the orientation of the display screen with respect to the information display device, and determines the orientation of the display screen so that the estimated position of the user corresponds to a bottom of the display screen in the case where the display screen rotates in the current position while remaining in the substantially horizontal state, and the display unit displays the image according to the orientation of the display screen determined by the determination unit.

For example, the determination unit may, when the information display device is moving, estimate from a movement direction of the information display device that a position of a user is opposite to the movement direction with respect to the information display device, and determine the orientation of the display screen so that the estimated position of the user corresponds to a bottom of the display screen, wherein the display unit displays the image according to the orientation of the display screen determined by the determination unit.

Moreover, the display unit may further display an icon indicating a normal position of the information display device to a user, at a position that is in a part of the display screen and is set based on the orientation of the display screen.

Though the information display device according to one or more aspects of the present invention has been described by way of the embodiments above, the present invention is not limited to these embodiments. Modifications obtained by applying various changes conceivable by those skilled in the art to the embodiments and any combinations of components in different embodiments are also included in the scope of one or more aspects of the present invention without departing from the scope of the present invention.

In each of the embodiments, each component may be realized by dedicated hardware or execution of a suitable software program. Each component may also be realized by a program execution unit such as a CPU or a processor reading and executing a software program recorded on a recording medium such as a hard disk or a semiconductor memory. Software for implementing the information display device and the like in each of the embodiments is the following program.

The program may cause a computer to execute: displaying an image according to an orientation of a display screen of an information display device; detecting a posture of the information display device based on information obtained by an acceleration sensor, an angular velocity sensor, and a geomagnetic sensor; and determining whether or not the posture of the information display device changes, and determining the orientation of the display screen, wherein the determining includes, in the case where the display screen is in a substantially horizontal state and the determining determines that the posture of the information display device changes, determining the orientation of the display screen so that, when the information display device moves by a predetermined angle or more with respect to a reference orientation which is the orientation of the display screen before the determining determines that the posture of the information display device changes, a side of the information display device in a direction of the predetermined angle or more from the reference orientation corresponds to a top of the display screen, and the displaying includes displaying the image according to the orientation of the display screen determined in the determining.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The information display device according to the present invention is particularly useful for provision of a user interface of a high-performance mobile information display terminal such as a smartphone and a tablet.

The invention claimed is:

1. An information display device comprising:
a processor; and
a non-transitory memory having stored thereon executable instructions, which when executed, cause the processor to perform:
   displaying an image according to an orientation of a display screen of the information display device, the display screen having a plurality of sides constituting edges of the display screen, the orientation being an orientation where a first side of the display screen among the plurality of sides corresponds to a top of the display screen;
   detecting a posture of the information display device based on information obtained by an acceleration sensor, an angular velocity sensor, and a geomagnetic sensor;
   detecting a centrifugal force direction based on information obtained by the acceleration sensor; and
   determining whether or not the posture of the information display device changes, and determining the orientation of the display screen,
wherein in the case where (i) the display screen is in a substantially horizontal state, (ii) the posture of the information display device is determined to have changed, and (iii) the information display device moves by a predetermined angle or more with respect to a reference orientation which is the orientation of the display screen before the posture of the information display device is determined to have changed, the orientation of the display screen is determined so that a side of the information display device corresponds to the top of the display screen, the side of the information display device corresponding to a second side of the display screen different from the first side of the display screen in a direction of the predetermined angle or more from the reference orientation,
wherein in the case where (i) the display screen is in the substantially horizontal state, (ii) the centrifugal force direction is detected, and (iii) the posture of the information display device is determined to have changed, the orientation of the display screen is determined so that a side of the information display device farthest in the detected centrifugal force direction corresponds to the top of the display screen, and
wherein the image is displayed according to the determined orientation of the display screen such that a top of the image corresponds to the top of the display screen.

2. The information display device according to claim 1, wherein in the case where (i) the display screen is not in the substantially horizontal state and (ii) the posture of the information display device is determined to have changed, the orientation of the display screen is determined so that a side of the information display device uppermost in a vertical direction corresponds to the top of the display screen.

3. The information display device according to claim 1, wherein the executable instructions, when executed by the processor, cause the processor to perform
   detecting shaking of at least one side of the information display device based on information obtained by at least one of the acceleration sensor and the angular velocity sensor, and
wherein in the case where (i) the display screen is in the substantially horizontal state, (ii) shaking of the at least one side of an amplitude equal to or more than a threshold is detected, and (iii) the posture of the information display device changes is determined to have changed, the orientation of the display screen is determined so that a side of the information display device having the largest amplitude of shaking corresponds to the top of the display screen.

4. The information display device according to claim 1, wherein the executable instructions, when executed by the processor, cause the processor to perform:
   estimating a current position of the information display device by autonomous navigation using information obtained by the acceleration sensor and at least one of the angular velocity sensor and the geomagnetic sensor; and estimating, from the posture of the information display device and the orientation of the display screen at the current position, that a position of a user using the information display device is opposite to the orientation of the display screen with respect to the information display device, and wherein the orientation of the display screen is determined so that the estimated position of the user corresponds to a bottom of the display screen in the case where the display screen rotates in the current position while remaining in the substantially horizontal state.

5. The information display device according to claim 1, wherein the executable instructions, when executed by the processor, cause the processor to perform when the information display device is moving, estimating from a movement direction of the information display device that a position of a user is opposite to the movement direction with respect to the information display device, and wherein the orientation of the display screen is determined so that the estimated position of the user corresponds to a bottom of the display screen.

6. The information display device according to claim 1, wherein the executable instructions, when executed by the processor, cause the processor to perform displaying an icon indicating a normal position of the information display device to a user, at a position that is in a part of the display screen and is set based on the orientation of the display screen.

7. An information display method comprising:

displaying an image according to an orientation of a display screen of an information display device, the display screen having a plurality of sides constituting edges of the display screen, the orientation being an orientation where a first side of the display screen among the plurality of sides corresponds to a top of the display screen;

detecting a posture of the information display device based on information obtained by an acceleration sensor, an angular velocity sensor, and a geomagnetic sensor;

detecting a centrifugal force direction based on information obtained by the acceleration sensor; and determining whether or not the posture of the information display device changes, and determining the orientation of the display screen, wherein in the case where (i) the display screen is in a substantially horizontal state, (ii) the posture of the information display device is determined to have changed, and (iii) the information display device moves by a predetermined angle or more with respect to a reference orientation which is the orientation of the display screen before the posture of the information display device is determined to have changed, the orientation of the display screen is determined so that a side of the information display device corresponds to the top of the display screen, the side of the information display device corresponding to a second side of the display screen different from the first side of the display screen in a direction of the predetermined angle or more from the reference orientation, wherein in the case where (i) the display screen is in the substantially horizontal state, (ii) the centrifugal force direction is detected, and (iii) the posture of the information display device is determined to have changed, the orientation of the display screen is determined so that a side of the information display device farthest in the detected centrifugal force direction corresponds to the top of the display screen, and wherein the image is displayed according to the determined orientation of the display screen such that a top of the image corresponds to the top of the display screen.

8. A non-transitory computer-readable recording medium for use in a computer, the recording medium having a computer program recorded thereon for causing the computer to execute:

displaying an image according to an orientation of a display screen of an information display device, the display screen having a plurality of sides constituting edges of the display screen, the orientation being an orientation where a first side of the display screen among the plurality of sides corresponds to a top of the display screen;

detecting a posture of the information display device based on information obtained by an acceleration sensor, an angular velocity sensor, and a geomagnetic sensor;

detecting a centrifugal force direction based on information obtained by the acceleration sensor; and determining whether or not the posture of the information display device changes, and determining the orientation of the display screen, wherein in the case where (i) the display screen is in a substantially horizontal state, (ii) the posture of the information display device is determined to have changed, and (iii) the information display device moves by a predetermined angle or more with respect to a reference orientation which is the orientation of the display screen before the posture of the information display device is determined to have changed, the orientation of the display screen is determined so that a side of the information display device corresponds to the top of the display screen, the side of the information display device corresponding to a second side of the display screen different from the first side of the display screen in a direction of the predetermined angle or more from the reference orientation, wherein in the case where (i) the display screen is in the substantially horizontal state, (ii) the centrifugal force direction is detected, and (iii) the posture of the information display device is determined to have changed, the orientation of the display screen is determined so that a side of the information display device farthest in the detected centrifugal force direction corresponds to the top of the display screen, and wherein the image is displayed according to the determined orientation of the display screen such that a top of the image corresponds to the top of the display screen.

9. An integrated circuit included in an information display device, the integrated circuit comprising:

a processor; and a non-transitory memory having stored thereon executable instructions, which when executed, cause the processor to perform:

displaying an image according to an orientation of a display screen of the information display device, the display screen having a plurality of sides constituting edges of the display screen, the orientation being an orientation where a first side of the display screen among the plurality of sides corresponds to a top of the display screen;

detecting a posture of the information display device based on information obtained by an acceleration sensor, an angular velocity sensor, and a geomagnetic sensor;

detecting a centrifugal force direction based on information obtained by the acceleration sensor; and determining whether or not the posture of the information display device changes, and determining the orientation of the display screen, wherein in the case where (i) the display screen is in a substantially horizontal state, (ii) the posture of the information display device is determined to have changed, and (iii) the information display device moves by a predetermined angle or more with respect to a reference orientation which is the orientation of the display screen the posture of the information display device is determined to have changed, the orientation of the display screen is determined so that a side of the information display device corresponds to the top of the display screen, the side of the information display device corresponding to a second side of the display screen different from the first side of the display screen in a direction of the predetermined angle or more from the reference orientation, and wherein in the case where (i) the display screen is in the substantially horizontal state, (ii) the centrifugal force direction is detected, and (iii) the posture of the information display device is determined to have changed, the orientation of the display screen is determined so that a side of the information display device farthest in the detected centrifugal force direction corresponds to the top of the display screen, and wherein the image is displayed according to the determined orientation of the display screen such that a top of the image corresponds to the top of the display screen.

* * * * *